(12) United States Patent
Sakamoto et al.

(10) Patent No.: US 8,188,167 B2
(45) Date of Patent: May 29, 2012

(54) POLYALKYLENE GLYCOL CHAIN-CONTAINING THIOL POLYMER, THIOL-MODIFIED MONOMER, MIXTURE THEREOF, AND ADMIXTURE FOR CEMENT

(75) Inventors: Noboru Sakamoto, Takatsuki (JP); Tsutomu Yuasa, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 51 days.

(21) Appl. No.: 12/532,618

(22) PCT Filed: Mar. 21, 2008

(86) PCT No.: PCT/JP2008/055995
§ 371 (c)(1),
(2), (4) Date: Oct. 2, 2009

(87) PCT Pub. No.: WO2008/123389
PCT Pub. Date: Oct. 16, 2008

(65) Prior Publication Data
US 2010/0105810 A1    Apr. 29, 2010

(30) Foreign Application Priority Data

Mar. 23, 2007 (JP) ................. 2007-077938
Mar. 23, 2007 (JP) ................. 2007-077984
Mar. 23, 2007 (JP) ................. 2007-077985

(51) Int. Cl.
*C04B 24/16* (2006.01)
*C08F 28/02* (2006.01)
*C08L 33/14* (2006.01)

(52) U.S. Cl. ............... 524/3; 526/286; 525/212
(58) Field of Classification Search .......... 524/5, 3; 526/289, 286; 525/212
See application file for complete search history.

(56) References Cited

U.S. PATENT DOCUMENTS
2003/0125492 A1   7/2003 Yamamoto et al.
2004/0225093 A1  11/2004 Tomita et al.
2007/0142505 A1   6/2007 Ueta et al.

FOREIGN PATENT DOCUMENTS

| JP | 9-41292 | 2/1977 |
|---|---|---|
| JP | 7-013141 A | 1/1995 |
| JP | 7-109487 A | 4/1995 |
| JP | 2001-220417 | 8/2001 |
| JP | 2002-128889 | 5/2002 |
| JP | 2004-154774 | 6/2004 |
| JP | 2004-182583 | 7/2004 |
| JP | 2004-331489 | 11/2004 |
| JP | 2006-036623 | 2/2006 |
| JP | 2006-096884 | 4/2006 |
| JP | 2006-232615 | 9/2006 |

OTHER PUBLICATIONS

Machine translation of JP 2002-128889. May 2002.*

* cited by examiner

*Primary Examiner* — Milton I Cano
*Assistant Examiner* — John Uselding
(74) *Attorney, Agent, or Firm* — Connolly Bove Lodge & Hutz LLP

(57) ABSTRACT

To provide a polyalkylene glycol chain-containing thiol polymer which is excellent in various performances, particularly significantly excellent in cement dispersibility, and useful in various applications such as an admixture for cement; a thiol-modified monomer or a mixture thereof, which can produce such a polymer; production methods of the polymer and the monomer; and a dispersant and an admixture for cement, each including the polymer. The polyalkylene glycol chain-containing thiol polymer of the present invention is a polyalkylene glycol chain-containing thiol polymer, wherein the polymer comprises a polyalkylene glycol chain and a polymer segment bonded to at least one end of the polyalkylene glycol chain with a sulfur atom-containing group therebetween, the polymer segment includes a constitutional unit derived from an unsaturated monomer component, and the unsaturated monomer component includes an unsaturated carboxylic acid monomer and an unsaturated polyalkylene glycol monomer.

18 Claims, No Drawings

United States Patent US 8,188,167 B2

POLYALKYLENE GLYCOL CHAIN-CONTAINING THIOL POLYMER, THIOL-MODIFIED MONOMER, MIXTURE THEREOF, AND ADMIXTURE FOR CEMENT

CROSS REFERENCE TO RELATED APPLICATIONS

This application is a National Phase filing under 35 U.S.C. §371 of PCT/JP2008/055995 filed Mar. 21, 2008, which claims priority to Japanese Patent Application No. 2007-077938, filed on Mar. 23, 2007, Japanese Patent Application No. 2007-077984, filed on Mar. 23, 2007, and Japanese Patent Application No. 2007-077985, filed on Mar. 23, 2007. The entire contents of each of the above-applications are incorporated herein by reference.

TECHNICAL FIELD

The present invention relates to a polyalkylene glycol chain-containing thiol polymer, a thiol-modified monomer, a mixture thereof, and an admixture for cement.

BACKGROUND ART

A polyalkylene glycol chain-containing polymer is provided with characteristics such as hydrophilicity, hydrophobicity, and steric repulsion by appropriately adjusting the chain length or alkylene oxides constituting the chain. Such a polymer has been widely used as a soft segment in various applications such as an adhesive or sealing agent application, a flexibility-giving component application, and a detergent builder application.

Recently, an admixture for cement which is added to a cement composition (for example, cement past prepared by adding water to cement, mortar prepared by mixing sand that is a fine aggregate with cement past, concrete prepared by mixing gravel that is a coarse aggregate with mortar) has been investigated as an application of such a polymer. Such an admixture for cement is generally used as a water-reducing agent and the like and expected to exhibit the following functions: the fluidity of the cement composition is improved and thereby the cement composition is water-reduced, and as a result, a strength, a durability, and the like of a cured product of the cement composition are improved.

With respect to a conventional admixture for cement, a naphthalene admixture for cement and a polycarboxylic acid admixture for cement have been known, for example, Japanese Kokai Publication No. 2001-220417 discloses a copolymer for admixtures for cement, obtained by copolymerizing an unsaturated carboxylic acid monomer with an unsaturated polyalkylene glycol ether monomer.

This copolymer for admixtures for cement can provide an admixture for cement which exhibits dispersibility at a certain high level. This is because a carboxyl group derived from the unsaturated carboxylic acid monomer serves as an adsorptive group which adsorbs to cement particles and a polyalkylene glycol chain derived from the unsaturated polyalkylene glycol ether monomer serves as a dispersion group which disperses the cement particles, and further because a steric repulsion of the polyalkylene glycol chain is generated.

However, development of an admixture for cement which can exhibit higher dispersibility has been needed for further reduction in the use amount of the admixture for cement.

Mercapto groups (in other words, a thiol group or a SH group) are functional groups useful for organic synthesis because such groups have a peculiar reactivity. Therefore, a thiol compound containing at least one mercapto group in a molecule has been used in various applications utilizing the peculiar reactivity attributed to the mercapto group. For example, the conventional application fields of the polyalkylene glycol which has been useful as a soft segment in an adhesive or sealing agent application, an application of a component which provides various polymers with flexibility, and the like, are extended. As a result, a thiol-modified polyalkylene glycol obtained by introducing a mercapto group into polyalkylene glycol has been noted.

With respect to a conventional thiol-modified polyalkylene glycol, Japanese Kokoku Publication No. Hei-07-13141 discloses a polyether containing a mercapto group at one or both ends, obtained by adding thiocarboxylic acid to polyether containing a double bond at one or both ends and then decomposing the generated thioester group. Further, Japanese Kokai Publication No. Hei-07-109487 discloses, as a biodegradable water-soluble polymer used in a detergent builder, a polymer obtained by a block or graft polymerization of a monoethylenically unsaturated monomer component with a modified polyether compound obtained by introducing a mercapto group-containing compound into a polyether compound by an esterification reaction.

However, these polymers are not enough to exhibit extremely high cement dispersibility (which is also called as water-reducing property) which has been recently needed. Accordingly, such polymers have room for improvement in order to be preferably used in an application of an admixture for cement and thereby to be useful in much more fields.

SUMMARY OF THE INVENTION

The present invention has been made of the above-mentioned state of the art. The present invention has an object to provide: a polyalkylene glycol chain-containing thiol polymer which is excellent in various performances, particularly significantly excellent in dispersibility, and useful in various applications such as an admixture for cement; a thiol-modified monomer or a mixture thereof which can produce such a polyalkylene glycol chain-containing thiol polymer; a production method of the polyalkylene glycol chain-containing thiol polymer or the thiol-modified monomer; and a dispersant and an admixture for cement, each containing the polyalkylene glycol chain-containing thiol polymer.

The present inventors made various investigations on polymers containing polyalkylene glycol chain. The inventors first noted that a polymer obtainable using a unsaturated monomer component including an unsaturated carboxylic acid monomer and an unsaturated polyalkylene glycol ether monomer can exhibit dispersibility at a certain high level because a carboxyl group derived from the unsaturated carboxylic acid monomer serves as an adsorptive group which adsorbs to cement particles and a polyalkylene glycol chain derived from the unsaturated polyalkylene glycol ether monomer serves as a dispersion group which disperses the cement particles. Further, the inventors found that if such a polymer includes a polyalkylene glycol chain and the above-mentioned polymer segment (that is, the polymer segment constituted by a unsaturated monomer component containing an unsaturated carboxylic acid monomer and an unsaturated polyalkylene glycol ether monomer) at least one end of the polyalkylene glycol chain with a sulfur atom-containing group therebetween, such a polymer is a novel polymer and it can exhibit extremely high dispersibility. The inventors also found that such a polymer is particularly excellent in cement dispersibility and that if such a polymer is used as an admixture for cement to prepare a cement composition, the mixing amount of the admixture for cement can be significantly reduced. As a result, the above-mentioned problems can be admirably solved.

In addition, the present applicant filed the application, Japanese Application No. 2006-256292, relating to the following polymer: the polymer contains a polyalkylene glycol chain and a polymer segment bonded to at least one end of the polyalkylene glycol chain; the polymer segment contains a constitutional unit derived from an unsaturated monomer; at least one species of the unsaturated monomer constituting the polymer segment is an unsaturated carboxylic acid monomer or an unsaturated polyalkylene glycol monomer. However, the polymer of the present invention is further limited. The polymer of the present invention more effectively exhibits advantageous effects mentioned in the present description, in comparison to the prior invention.

The present inventors also made various investigations on components used to produce polymers containing a polyalkylene glycol chain. The inventors found that a thiol-modified monomer with a specific structure containing a polyalkylene glycol chain and at least one mercapto group, and a mixture of such a thiol-modified monomer with a polymeric product thereof are also novel compounds. The inventors further found that the monomer or the monomer mixture itself can exhibit high dispersibility. Then, the inventors found that a polyalkylene glycol chain-containing thiol polymer obtainable by polymerizing a unsaturated monomer component including an unsaturated carboxylic acid monomer and/or an unsaturated polyalkylene glycol ether monomer in the presence of such compounds can exhibit extremely high dispersibility (particularly, cement dispersibility) due to a steric repulsion of an oxyalkylene group derived from the thiol-modified monomer with the specific structure, and that such a polymer is also particularly useful as an admixture for cement. As a result, the above-mentioned problems had been admirably solved, leading to completion of the present invention.

That is, the present invention relates to a polyalkylene glycol chain-containing thiol polymer, a mixture thereof, and a production method thereof; a thiol-modified monomer and a production method thereof; a thiol-modified monomer mixture; a polyalkylene glycol chain-containing thiol polymer; a dispersant; an admixture for cement; and a cement composition, each shown in the following (A) to (K).

(A) A polyalkylene glycol chain-containing thiol polymer, wherein the polymer includes a polyalkylene glycol chain and a polymer segment bonded to at least one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer.

(B) A production method of the above-mentioned (A) polyalkylene glycol chain-containing thiol polymer,
including a step of polymerizing an unsaturated monomer component including an unsaturated carboxylic acid monomer and an unsaturated polyalkylene glycol monomer in the presence of a compound including a polyalkylene glycol chain and a mercapto group and/or a disulfide bond in one molecule.

(C) A polymer mixture including the above-mentioned (A) polyalkylene glycol chain-containing thiol polymer,
wherein the polymer mixture includes any two or more of the following polymers (i) to (iv):
a polymer (i),
wherein the polymer includes a polyalkylene glycol chain and a polymer segment bonded to one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer;

a polymer (ii),
wherein the polymer includes repeating polymer units added in block,
the polymer units each includes a polyalkylene glycol chain and a polymer segment bonded to one end of the polyalkylene glycol chain with a sulfur atom-containing group therebetween,
the polymer segment includes a constitutional unit derived from an unsaturated monomer component, and the unsaturated monomer component includes an unsaturated carboxylic acid monomer and an unsaturated polyalkylene glycol monomer;

a polymer (iii),
wherein the polymer includes a polyalkylene glycol chain and polymer segments bonded to both ends of the polyalkylene glycol chain, one segment to each end, with a sulfur-containing group therebetween,
the polymer segment includes a constitutional unit derived from an unsaturated monomer component, and
the unsaturated monomer component includes an unsaturated carboxylic acid monomer and an unsaturated polyalkylene glycol monomer; and a polymer (iv),
wherein the polymer includes two polyalkylene glycol chains and a polymer segment connecting the two polyalkylene glycol chains to each other with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer.

(D) A thiol-modified monomer having a structure represented by the following formula (1) or (2):

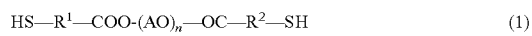

$$\text{HS}-R^1-\text{COO-(AO)}_n-\text{OC}-R^2-\text{SH} \quad (1)$$

$$\text{HS}-R^1-\text{COO-(AO)}_n-R^3 \quad (2)$$

in the formula,
$R^1$ and $R^2$ being the same or different and each representing an organic residue;
AO being the same or different and each representing one or more different oxyalkylene groups containing 2 to 18 carbon atoms;
n representing an average number of moles of oxyalkylene group and being an integer of 80 to 500; and
$R^3$ representing a hydrogen atom or an organic residue.

(E) A production method of the above-mentioned (D) thiol-modified monomer, including a step of esterifying a compound including a carboxyl group and a mercapto group in one molecule with a polyalkylene glycol.

(F) A thiol-modified monomer mixture including:
a thiol-modified monomer having a structure represented by the following formula (3) and/or (4); and
a polymeric product of the thiol-modified monomer.

$$\text{HS}-R^1-\text{CO-(AG)-OC}-R^2-\text{SH} \quad (3)$$

$$\text{HS}-R^1-\text{CO-(AG)}-R^3 \quad (4)$$

in the formula,
$R^1$ and $R^2$ being the same or different and each representing an organic residue, AG representing an organic residue including at least one alkylene glycol group containing 2 to 18 carbon atoms, and R³ representing a hydrogen atom or an organic residue.

(G) A polyalkylene glycol chain-containing thiol polymer obtainable by polymerizing an unsaturated monomer component including an unsaturated carboxylic acid monomer and/or an unsaturated polyalkylene glycol monomer in the presence of the above-mentioned (D) thiol-modified monomer or the above-mentioned (F) thiol-modified monomer mixture.

(H) A dispersant including the above-mentioned (A) or (G) polyalkylene glycol chain-containing thiol polymer, or the above-mentioned (C) polyalkylene glycol chain-containing thiol polymer mixture.

(I) An admixture for cement, including the above-mentioned (A) or (G) polyalkylene glycol chain-containing thiol polymer, or the above-mentioned (C) polyalkylene glycol chain-containing thiol polymer mixture.

(J) An admixture for cement, including the above-mentioned (D) thiol-modified monomer or the above-mentioned (F) thiol-modified monomer mixture.

(K) A cement composition including: cement; and the above-mentioned (A) or (G) polyalkylene glycol chain-containing thiol polymer, or the above-mentioned (C) polyalkylene glycol chain-containing thiol polymer mixture.

DETAILED DESCRIPTION OF THE INVENTION

The present invention is described in more detail below.

<(A) Polyalkylene Glycol Chain-Containing Thiol Polymer>

The polyalkylene glycol chain-containing thiol polymer of the present invention includes a polyalkylene glycol chain and a polymer segment bonded to at least one end of the polyalkylene glycol chain with a sulfur atom-containing group therebetween. The polymer segment includes a constitutional unit derived from an unsaturated monomer component. The relationship between the polyalkylene glycol chain and the polymer segment can be schematically shown by the following formula (5):

(PAG)-Z-(BL)            (5)

in the formula, PAG representing a polyalkylene glycol chain; BL representing a polymer segment including a constitutional unit derived from an unsaturated monomer component containing an unsaturated carboxylic acid monomer and an unsaturated polyalkylene glycol monomer; and Z representing a sulfur atom-containing group. Hereinafter, PAG, BL, and Z represent the same, respectively.

The following polymers (i) to (iv) may be mentioned as preferable embodiments of the above-mentioned polyalkylene glycol chain-containing thiol polymer. The present invention also includes a polyalkylene glycol chain-containing thiol polymer mixture (C) including any two or more of the polymers (i) to (iv).

A polymer (i): a polymer represented by the above formula (5), i.e., the polymer includes a polyalkylene glycol chain and a polymer segment bonded to one end of the polyalkylene glycol chain with a sulfur atom-containing group therebetween; the polymer segment includes a constitutional unit derived from an unsaturated monomer component; and the unsaturated monomer component includes an unsaturated carboxylic acid monomer and an unsaturated polyalkylene glycol monomer.

A polymer (ii): a polymer represented by the following formula (6):

-[(PAG)-Z-(BL)]-            (6)

i.e., the polymer includes repeating polymer units added in block, the polymer units each includes a polyalkylene glycol chain and a polymer segment bonded to one end of the polyalkylene glycol chain with a sulfur atom-containing group therebetween; the polymer segment includes a constitutional unit derived from an unsaturated monomer component; and the unsaturated monomer component includes an unsaturated carboxylic acid monomer and an unsaturated polyalkylene glycol monomer.

A polymer (iii): a polymer represented by the following formula (7):

(BL)-Z-(PAG)-Z-(BL)            (7)

i.e., the polymer includes a polyalkylene glycol chain and polymer segments bonded to both ends of the polyalkylene glycol chain, one segment to each end, with a sulfur-containing group therebetween; the polymer segment includes a constitutional unit derived from an unsaturated monomer component; and the unsaturated monomer component includes an unsaturated carboxylic acid monomer and an unsaturated polyalkylene glycol monomer.

A polymer (iv): a polymer represented by the following formula (8):

(PAG)-Z-(BL)-Z-(PAG)            (8)

i.e., the polymer includes two polyalkylene glycol chains and a polymer segment connecting the two polyalkylene glycol chains to each other with a sulfur atom-containing group therebetween; the polymer segment includes a constitutional unit derived from an unsaturated monomer component; and the unsaturated monomer component includes an unsaturated carboxylic acid monomer and an unsaturated polyalkylene glycol monomer.

Hereinafter, in the above-mentioned formulae (5) to (8), the polyalkylene glycol chain represented by "PAG" is also referred to as a "polyalkylene glycol chain (1)", and the polyalkylene glycol chain derived from the unsaturated polyalkylene glycol monomer constituting the polymer segment represented by "BL" is also referred to as a "polyalkylene glycol chain (2)". It is preferable that each of the polyalkylene glycol chains (1) and (2) is a substantially straight chain.

It is preferable that the above-mentioned polyalkylene glycol chain-containing thiol polymer has a weight average molecular weight of 10000 or more, and more preferably 20000 or more, and still more preferably 30000 or more, and particularly preferably 40000 or more. Further, the weight average molecular weight is preferably 300000 or less, and more preferably 200000 or less, and still more preferably 150000 or less, and particularly preferably 100000 or less.

The weight average molecular weight can be measured by a method shown in Examples mentioned below.

With respect to the above-mentioned polyalkylene glycol chain-containing thiol polymer, the length of the polyalkylene glycol chain is not especially limited because it depends on the species of a polymer initiator or polymer chain transfer agent to be used, and the like. For example, it is preferable that the average number of moles of alkylene oxide added is 10 or more in order to more effectively disperse cement particles when the polymer is mixed with an admixture for cement. The average number of moles of alkylene oxide added is more preferably 20 or more, and still more preferably 45 or more, and still more preferably 70 or more, and still more preferably 80 or more, and still more preferably 90 or more, and still more preferably 100 or more, and still more preferably 110 or more, and particularly preferably 120 or more, and most preferably 140 or more. Further, it is preferable that the average number of moles of alkylene oxide added is 500 or less. It is more preferably 400 or less, and still more preferably 350 or less, and still more preferably 300 or less, and still more preferably 280 or less, and still more preferably 250 or less, and particularly preferably 220 or less, and most preferably 200 or less.

As shown in Examples mentioned below, the polyalkylene glycol chain (1) seems to have a large steric repulsion if it is a moderately long. On the other hand, a sufficient steric repulsion is not obtained if the polyalkylene glycol chain (1) is too short, and as a result, the polymer including such a polyalkylene glycol chain (1) might show almost the same dispersibility as in conventional polymers used in an admixture for cement.

The alkylene glycol constituting the above-mentioned polyalkylene glycol chain (1) is an alkylene glycol containing 2 to 18 carbon atoms. For example, an alkylene glycol containing 2 to 4 carbon atoms is preferable in order to more improve dispersibility or hydrophilicity of cement particles when such a polymer is mixed with an admixture for cement. It is particularly preferable that the alkylene glycol is mainly constituted by an ethylene glycol unit containing 2 carbon atoms because the cement particles can be provided with a higher hydrophilicity. In this case, the proportion of the ethylene glycol unit in the polyalkylene glycol chain (1) is preferably 50% by mole or more, and more preferably 70% by mole or more, and still more preferably 90% by mole or more, and particularly preferably 100% by mole, relative to 100% by mole of the entire alkylene glycol constituting the polyalkylene glycol chain (1).

Herein, the polyalkylene glycol chain (1) represented by "PAG" and the polymer segment represented by "BL" might be separated from each other by hydrolysis, depending on the structure of the sulfur atom-containing group represented by "Z". It is preferable that an oxyalkylene group containing 3 or more carbon atoms is introduced into the end of the polyalkylene glycol chain (1) if the resistance to hydrolysis needs to be improved.

Examples of the above-mentioned oxyalkylene group containing 3 or more carbon atoms include an oxypropylene group, an oxybutylene group, an oxystyrene group, and an alkyl glycidyl ether residue. Among these, an oxypropylene group and an oxybutylene group are preferable because of easiness of the production.

The amount of the above-mentioned oxyalkylene group containing 3 or more carbon atoms to be introduced is preferably 50% or more relative to both ends of the polyalkylene glycol chain (1), although it depends on the needed resistance to hydrolysis. It is more preferably 100% or more, and still more preferably 150% or more, and particularly preferably 200% or more.

In order to improve the resistance to hydrolysis, it is preferable that the end of the polyalkylene glycol chain (1) is a secondary alcohol residue. A publicly known method may be used to introduce a secondary alcohol group into the end of the polyalkylene glycol chain (1). For example, an alkylene oxide containing 3 or more carbon atoms is added to a polyalkylene glycol that is a starting material for the polyalkylene glycol chain (1). In order to increase the introduction rate of the secondary alcohol group, it is preferable that at least one compound selected from the group consisting of alkali metals, alkali earth metals, and oxides or hydroxides thereof is used as a catalyst in this addition reaction. Sodium hydroxide, potassium hydroxide, magnesium hydroxide, and calcium hydroxide are more preferable. Sodium hydroxide and potassium hydroxide are most preferable.

It is preferable that the reaction temperature during the addition reaction is 50 to 200° C. in order to increase the introduction rate of the secondary alcohol group. The reaction temperature is more preferably 70 to 170° C. and still more preferably 90 to 150° C., and particularly preferably 100 to 130° C.

It is preferable that also the above-mentioned polyalkylene glycol chain (2) contains an ethylene glycol unit as a main constitutional unit. The proportion of the ethylene glycol unit is preferably 50% by mole or more relative to 100% by mole of the entire alkylene glycol constituting the polyalkylene glycol chain (2). The proportion thereof is more preferably 70% by mole or more, and still more preferably 90% by mole or more, and particularly preferably 100% by mole.

According to preferable embodiments of the above-mentioned polyalkylene glycol chains (1) and (2), examples of other constitutional units include a propylene glycol unit and a butylene glycol unit. The proportion of these constitutional units is preferably less than 50% by mole relative to 100% by mole of the entire alkylene glycol constituting the polyalkylene glycol chain (1) or (2). The proportion thereof is more preferably less than 30% by mole, and still more preferably less than 20% by mole, and particularly preferably less than 10% by mole.

In the above-mentioned polyalkylene glycol chain-containing thiol polymer, the polymer segment bonded to the polyalkylene glycol chain (1) with a sulfur atom-containing group therebetween is constituted by a plurality of unsaturated monomer residues. As at least two of the unsaturated monomer residues, an unsaturated carboxylic acid monomer and an unsaturated polyalkylene glycol monomer are included. Usable unsaturated carboxylic acid monomers and unsaturated polyalkylene glycol monomers are as mentioned below.

Thus, the above-mentioned polyalkylene glycol chain-containing thiol polymer includes, at the polymer segment, a carboxyl group derived from the unsaturated carboxylic acid monomer and the polyalkylene glycol chain (2) derived from the unsaturated polyalkylene glycol monomer. Therefore, due to these synergistic effects such a polymer seems to extremely effectively disperse cement particles.

That is, specifically, the reason why the cement particles are dispersed seems to be because of the following: the above-mentioned polyalkylene glycol chain-containing thiol polymer includes a carboxyl group derived from the unsaturated carboxylic acid monomer at one or both ends of the polyalkylene glycol chain (1) (with a sulfur atom-containing group therebetween), and therefore, for example, the carboxyl group adsorbs to a cement particle, and also due to a steric repulsion of the polyalkylene glycol chain (1), the polymer can effectively disperse the cement particle. Further, the reason why the ability of dispersing the cement particle is dramatically improved seems to be because of the following: the polymer further includes the polyalkylene glycol chain (2) derived from the unsaturated polyalkylene glycol monomer at one or both ends of the polyalkylene glycol chain (1) (with a sulfur atom-containing group therebetween), and therefore, due to synergistic effects of a steric repulsion of the polyalkylene glycol chain (2) in addition to the steric repulsion of the polyalkylene glycol chain (1), the polymer can dramatically improve its ability of dispersing the cement particle.

The number of the carboxyl group at the above-mentioned polymer segment, and the length and number of the polyalkylene glycol chain (2) are not especially limited because they depend on the species or amount of the unsaturated carboxylic acid monomer or the unsaturated polyalkylene glycol monomer to be used.

It is preferable that the above-mentioned polyalkylene glycol chain-containing thiol polymer is obtainable by polymerizing an unsaturated monomer component including an unsaturated carboxylic acid monomer (hereinafter, also referred to as a "monomer (a))" and an unsaturated polyalkylene glycol monomer (hereinafter, also referred to as a "monomer (b)") in the presence of a compound including a polyalkylene glycol chain and a mercapto group and/or a disulfide bond in one molecule. The present invention also includes a production method including such a polymerization step.

Due to the use of the monomer (a) in the above-mentioned polymerization reaction, the carboxyl group derived from the unsaturated carboxylic acid monomer is introduced into the above-mentioned polymer. Due to the use of the monomer (b) in the above-mentioned polymerization reaction, the polyalkylene glycol chain (2) derived from the unsaturated polyalkylene glycol monomer is introduced into the polymer.

In the above-mentioned polymerization step, preferable examples of the unsaturated carboxylic acid monomer (monomer (a)) include a compound represented by the following formula (9):

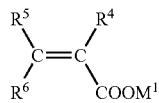
(9)

in the formula, $R^4$, $R^5$, and $R^6$ being the same or different and each representing a hydrogen atom, a methyl group, or $(CH_2)_x COOM^2$ (herein, $-(CH_2)_x COOM^2$ may form an anhydride with $-COOM^1$ or another $-(CH_2)_x COOM^2$;

x being an integer of 0 to 2; and $M^1$ and $M^2$ being the same or different and each representing a hydrogen atom, a monovalent metal, a divalent metal, a trivalent metal, a quaternary ammonium base, or an organic amine base.

Specific examples of the monomer (a) represented by the above formula (9) include: monocarboxylic acid monomers such as acrylic acid, methacrylic acid, and crotonic acid; dicarboxylic acid monomers such as maleic acid, itaconic acid, and fumaric acid; anhydrides or salts of these carboxylic acids (for example, an alkali metal salt, an alkali earth metal salt, a trivalent metal salt, an ammonium salt, and an organic amine salt). These monomers may be used singly or in combination of two or more species of them. Among these monomers, acrylic acid, methacrylic acid, maleic acid, maleic anhydride, and salts thereof are preferable, and acrylic acid, methacrylic acid, and salts thereof are more preferable in view of polymerizability.

Preferable examples of the above-mentioned unsaturated polyalkylene glycol monomer (monomer (b)) include a compound represented by the following formula (10):

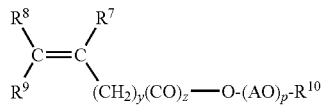
(10)

in the formula, $R^7$, $R^8$, and $R^9$ being the same or different and each representing a hydrogen atom or a methyl group;

$R^{10}$ representing a hydrogen atom or a hydrocarbon group containing 1 to 20 carbon atoms;

AO being the same or different and each representing one or more different oxyalkylene groups containing 2 to 18 carbon atoms (herein, the two or more different oxyalkylene groups may be introduced in block or randomly);

y being an integer of 0 to 2;

z being 0 or 1; and p representing the average number of moles of oxyalkylene group added and being an integer of 1 to 300.

In the above formula (10), $R^{10}$ represents a hydrogen atom or a hydrocarbon group containing 1 to 20 carbon atoms. Examples of the hydrocarbon group containing 1 to 20 carbon atoms include aliphatic alkyl groups containing 1 to 20 carbon atoms, alicyclic alkyl groups containing 3 to 20 carbon atoms, alkenyl groups containing 2 to 20 carbon atoms, alkyl groups containing 2 to 20 carbon atoms, and aryl groups containing 6 to 20 carbon atoms.

The above-mentioned $R^{10}$ is preferably a hydrophilic group in view of dispersibility for cement particles. Specifically, the $R^{10}$ is preferably a hydrogen atom or an alkyl group containing 1 to 10 carbon atoms. The $R^{10}$ is more preferably a hydrogen atom or an alkyl group containing 1 to 5 carbon atoms, and still more preferably a hydrogen atom or an alkyl group containing 1 to 3 carbon atoms.

In the above formula (10), the oxyalkylene chain represented by $-(AO)_p-$ corresponds to the above-mentioned polyalkylene glycol chain (2). It is preferable that the oxyalkylene group represented by AO has a higher hydrophilicity in order to effectively disperse cement particles when the polymer is mixed with an admixture for cement. It is preferable that an oxyalkylene group containing 2 carbon atoms is mainly included as AO. The proportion of the oxyalkylene group containing 2 carbon atoms in such an oxyalkylene chain (polyalkylene glycol chain (2)) is preferably 50% by mole or more, and more preferably 70% by mole or more, and still more preferably 90% by mole or more, and particularly preferably 100% by mole, relative to 100% by mole of the entire oxyalkylene group constituting the oxyalkylene chain.

In the above-mentioned oxyalkylene chain (polyalkylene glycol chain (2)), it is preferable that cement particles are provided with a slight structure (network) by introducing an oxyalkylene group containing 3 or more carbon atoms into the oxyalkylene chain and thereby providing the polymer with hydrophobicity to some extent in order to reduce viscosity or stiffness of concrete if the polymer is mixed with an admixture for cement to produce a concrete composition. However, if the oxyalkylene group containing 3 or more carbon atoms is introduced too much, the obtained polymer has a too high hydrophobicity and the ability of dispersing the cement particles might be insufficient.

In view of these, the proportion of the oxyalkylene group containing 3 or more carbon atoms in the above-mentioned oxyalkylene chain is preferably 1% by mole or more, and more preferably 3% by mole or more, and still more preferably 5% by mole or more, and particularly preferably 7% by mole or more relative to 100% by mole of the entire oxyalkylene group constituting the oxyalkylene chain. Further, the proportion thereof is preferably 50% by mole or less, and more preferably 30% by mole or less, and still more preferably 20% by mole or less, and particularly preferably 10% by mole or less.

The above-mentioned oxyalkylene groups containing 3 or more carbon atoms in the oxyalkylene chain may be introduced into the chain in block or randomly. It is preferable that the oxyalkylene groups are introduced in block, for example, an oxyalkylene chain constituted by oxyalkylene groups containing 2 or more carbon atoms—an oxyalkylene chain constituted by oxyalkylene groups containing 3 or more carbon atoms—an oxyalkylene chain constituted by oxyalkylene groups containing 2 or more oxyalkylene groups.

An oxyalkylene group containing 3 to 8 carbon atoms is preferable as the above-mentioned oxyalkylene group containing 3 or more carbon atoms in view of easiness of the introduction, compatibility with cement particles, and the like. An oxypropylene group containing 3 carbon atoms, an oxybutylene group containing 4 carbon atoms, and the like are more preferable.

In the above-mentioned oxyalkylene chain, the average number of moles of oxyalkylene group added, represented by p, is an integer of 1 to 300. It is preferably 4 or more, and more preferably 10 or more, and still more preferably 15 or more, and still more preferably 20 or more, and particularly preferably 25 or more, and most preferably 30 or more. Further, it is preferably 250 or less, and more preferably 200 or less, and still more preferably 150 or less, and still more preferably 125 or less, and particularly preferably 100 or less, and most preferably 75 or less.

The following compounds are mentioned as specific examples of the monomer (b) represented by the above formula (10).

Esterified products of (meth)acrylic acid or crotonic acid with an alkoxypolyalkylene glycol obtained by adding an alkylene oxide containing 2 to 18 carbon atoms with any of: a saturated aliphatic alcohol containing 1 to 20 carbon atoms such as methanol, ethanol, 1-propanol, 2-propanol, 1-butanol, 2-buthanol, 1-pentanol, 1-hexanol, octanol, 2-ethyl-1-hexanol, nonyl alcohol, lauryl alcohol, cetyl alcohol, stearyl alcohol; an unsaturated aliphatic alcohol containing 3 to 20 carbon atoms such as allyl alcohol, methallyl alcohol, crotyl alcohol, oleyl alcohol; an alicyclic alcohol containing 3 to 20 carbon atoms such as cyclohexanol; an aromatic alcohol containing 6 to 20 carbon atoms such as phenol, phenylmethanol (benzyl alcohol), methyl phenol (cresol), p-ethyl phenol, dimethylphenol (xylenol), nonyl phenol, dodecylphenol, phenylphenol, and naphthol.

Esterified products of (meth) acrylic acid or crotonic acid with a polyalkylene glycol produced by polymerizing alkylene oxides containing 2 to 18 carbon atoms.

These may be used singly or in combination of two or more species of them. Among these unsaturated esters, the esterified products of (meth) acrylic acid with an alkoxypolyalkylene glycol are preferable.

Specific examples of the above-mentioned monomer (b) include alkylene oxide 1 to 300 mole adducts of an unsaturated alcohol such as vinyl alcohol, allyl alcohol, methallyl alcohol, 3-butene-1-ol, 3-methyl-3-butene-1-ol, 3-methyl-2-butene-1-ol, 2-methyl-3-butene-2-ol, 2-methyl-2-butene-1-ol, 2-methyl-3-butene-1-ol, hydroxyethyl vinyl ether, hydroxypropyl vinyl ether, and hydroxybutyl vinyl ether. These may be used singly or in combination of two or more species of them. Among these unsaturated ethers, the compounds prepared using (meth)allyl alcohol and 3-methyl-3-butene-1-ol are preferable.

In this description, the term "(meth)allyl alcohol" means allyl alcohol and methallyl alcohol, and similarly, the term "(meth) acrylic acid" includes acrylic acid and methacrylic acid.

In the above-mentioned unsaturated esters and unsaturated ethers, one or more different alkylene oxides selected from alkylene oxides containing 2 to 18 carbon atoms such as an ethylene oxide, a propylene oxide, a butylene oxide, and a styrene oxide are preferably used as the alkylene oxide. If two or more different alkylene oxides are added, they may be added alternatively, randomly, or in block.

The unsaturated monomer component used in the above-mentioned polymerization step may further contain a copolymerizable monomer (hereinafter, also referred to as a "monomer (c)"), in addition to the above-mentioned monomers (a) and (b). One or more different compounds mentioned below may be used as the above-mentioned monomer (c).

Monoesters or diesters of an unsaturated dicarboxylic acid such as maleic acid, fumaric acid, itaconic acid, and citraconic acid with: an alkyl alcohol containing 1 to 20 carbon atoms; a glycol containing 2 to 18 carbon atoms or a polyalkylene glycol constituted by 2 to 300 mole of such a glycol containing 2 to 18 carbon atoms; or an alkylene oxide 2 to 300 mole adduct of alkoxypolyalkylene oxide, prepared by adding an alkylene oxide containing 2 to 18 carbon atoms to an alkyl alcohol containing 1 to 20 carbon atoms.

Monoamides or diamides of the above-mentioned unsaturated dicarboxylic acid with: an alkylamine containing 1 to 20 carbon atoms and a glycol containing 2 to 18 carbon atoms, having an aminated one end; or a polyalkylene glycol constituted by 2 to 300 mole of such a glycol containing 2 to 18 carbon atoms, having an aminated one end.

Esters of an unsaturated monocarboxylic acid such as acrylic acid, methacrylic acid, and crotonic acid with: an alkylene alcohol containing 1 to 20 carbon atoms; a glycol containing 2 to 10 carbon atoms or a polyalkylene glycol constituted by 2 to 300 mole of such a glycol containing 2 to 18 carbon atoms; or an alkylene oxide 2 to 300 mole adduct of alkoxypolyalkylene oxide, prepared by adding an alkylene oxide containing 2 to 18 carbon atoms to an alkyl alcohol containing 1 to 20 carbon atoms.

Amides of the above-mentioned monocarboxylic acid with: an alkylamine containing 1 to 20 carbon atoms and a glycol containing 2 to 18 carbon atoms, having an aminated one end; or a polyalkylene glycol constituted by 2 to 300 mole of such a glycol containing 2 to 18 carbon atoms, having an aminated one end.

Unsaturated sulfonic acids such as sulfoethyl acrylate, sulfoethyl methacrylate, acrylamide 2-methylpropane sulfonic acid, methacrylamide 2-methylpropane sulfonic acid, and styrene sulfonic acid, and monovalent metal salts thereof, divalent metal salts thereof, ammonium salts thereof, and organic amine salts thereof;

unsaturated amides such as acrylamide, methacryl amide, acrylalkyl amide, and methacryl alkyl amide;

unsaturated amino compounds such as dimethylaminoethyl acrylate and dimethylaminoethyl methacrylate;

vinyl esters such as vinyl acetate and vinyl propionate;

vinyl ethers, e.g., alkyl vinyl ethers containing 3 to 20 carbon atoms such as methyl vinyl ether, ethyl vinyl ether, propyl vinyl ether, and butyl vinyl ether; and aromatic vinyl compounds such as styrene.

The use amount of the monomers (a), (b) and (c) in the above-mentioned polymerization step is mentioned below. If the monomer (a) is a main component, the ratio (% by weight) of the monomer (a)/the monomer (b)/the monomer (c) is preferably 50 to 99/50 to 1/0 to 40, and more preferably 55 to 95/45 to 5/0 to 40, and still more preferably 60 to 90/40 to 10/0 to 40, and particularly preferably 65 to 85/35 to 15/0 to 40. If the monomer (b) is a main component, the ratio of the monomer (a)/the monomer (b)/the monomer (c) is preferably 1 to 50/99 to 50/0 to 40, and more preferably 2 to 40/98 to 60/0 to 40, and still more preferably 5 to 30/95 to 70/0 to 40, and particularly preferably 7.5 to 25/92.5 to 75/0 to 40.

The above-mentioned polymerization step is performed in the presence of a compound including a polyalkylene glycol chain, and a mercapto group and/or a disulfide bond in one molecule. Due to the use of this compound, the polyalkylene glycol chain (1) is introduced into the above-mentioned polymer.

In this case, the relationship between the amount of the polyalkylene glycol chain (1) and the use amount of the monomers (a), (b), and (c) is mentioned below. If the monomer (a) is a main component, the ratio (% by weight) of the polyalkylene glycol chain (1) to 100% of the total amount of the monomers (a), (b), and (c) is preferably 50 to 99, and more preferably 55 to 95, and still more preferably 60 to 90, and particularly preferably 65 to 85. If the monomer (b) is a main component, it is preferably 0.5 to 50, and more preferably 1 to 45, and still more preferably 2 to 40, and still more preferably 3 to 35, and particularly preferably 4 to 30, and most preferably 5 to 25.

Preferable examples of the above-mentioned compound including a polyalkylene glycol chain, and a mercapto group and/or a disulfide bond in one molecule include: a diester compound represented by the following formula (11); a monoester compound represented by the following formula (12); an x-mer of a diester compound represented by the following formula (13); and a dimer of a monoester represented by the following formula (14). Among these, the compound represented by the following formula (11) or (12), or a mixture containing such a compound is preferably used.

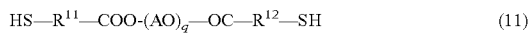

$$HS-R^{11}-COO\text{-}(AO)_q-OC-R^{12}-SH \quad (11)$$

$$HS-R^{11}-COO\text{-}(AO)_q-R^{13} \quad (12)$$

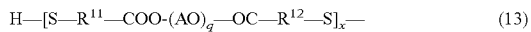

$$H-[S-R^{11}-COO\text{-}(AO)_q-OC-R^{12}-S]_x- \quad (13)$$

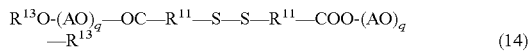

$$R^{13}O\text{-}(AO)_q-OC-R^{11}-S-S-R^{11}-COO\text{-}(AO)_q-R^{13} \quad (14)$$

In the above formulae (11) to (14), $R^{11}$ and $R^{12}$ are the same or different and each represent a divalent organic residue; $R^{13}$ represents a hydrogen atom or a hydrocarbon group containing 1 to 20 carbon atoms; AO are the same or different and each represent one or more different oxyalkylene groups containing 2 to 18 carbon atoms (herein, the two or more different oxyalkylene groups may be introduced into the chain randomly or in block); q represents the average number of moles of oxyalkylene group added and q is an integer of 10 to 500; and x represents an integer of 2 or more.

In the above formulae (11) to (14), preferable examples of the divalent organic residue represented by $R^{11}$ and $R^{12}$ include $C_{1-18}$ straight- or branched chain alkylene groups, phenyl groups, alkylphenyl groups, pyridinyl groups, and aromatic groups such as thiophene, pyrrole, furan, and thiazole. Among these, in view of reactivity, such groups preferably contain 1 to 8 carbon atoms, and more preferably 1 to 6 carbon atoms. Hydrocarbon groups containing 1 to 6 carbon atoms are still more preferably and straight- or branched chain alkylene groups containing 1 to 6 carbon atoms are particularly preferable. It is preferable that such groups contain 2 or more carbon atoms in view of resistance to hydrolysis. Straight- or branched chain alkylene groups containing 2 to 6 carbon atoms are most preferable. For example, a divalent organic residue derived from 3-mercaptopropionic acid or mercaptoisobutylic acid.

$R^{11}$ and $R^{12}$ may be partly substituted with a hydroxyl group, an amino group, an acetyl amino group, a cyano group, a carbonyl group, a carboxyl group, a halogen group, a sulfonyl group, a nitro group, a formyl group, and the like.

In the above formulae (11) to (14), the average number of moles of oxyalkylene group added, represented by q, is an integer of 10 to 500, and preferably 10 or more. It is more preferably 20 or more, and still more preferably 45 or more, and still more preferably 70 or more, and still more preferably 80 or more, and still more preferably 90 or more, and still more preferably 100 or more, and furthermore preferably 110 or more, and particularly preferably 120 or more, and most preferably 140 or more. Further, it is preferably 500 or less, and more preferably 400 or less, and still more preferably 350 or less, and still more preferably 300 or less, and still more preferably 280 or less, and furthermore preferably 250 or less, and particularly preferably 220 or less, and most preferably 200 or less.

In the above formulae (11) to (14), the oxyalkylene chain represented by $-(AO)_q-$ corresponds to the above-mentioned polyalkylene glycol chain (1). It is preferable that the oxyalkylene group represented by AO has a high hydrophilicity in order to effectively disperse cement particles when the polymer is mixed with an admixture for cement. It is preferable that an oxyalkylene group containing 2 carbon atoms is mainly contained as AO. The proportion of such an oxyalkylene group containing 2 carbon atoms in the oxyalkylene chain (the polyalkylene glycol chain (1)) is preferably 50% by mole or more, and more preferably 70% by mole or more, and still more preferably 90% by mole or more, and particularly preferably 100% by mole or more, relative to 100% by mole of the entire oxyalkylene group constituting the oxyalkylene chain.

In the above-mentioned oxyalkylene chain (the polyalkylene glycol chain (1)), it is preferable that cement particles are provided with a slight structure (network) by introducing an oxyalkylene group containing 3 or more carbon atoms into the oxyalkylene chain and thereby providing the polymer with hydrophobicity to some extent in order to reduce viscosity or stiffness of concrete if the polymer is mixed with an admixture for cement to produce a concrete composition. However, if the oxyalkylene group containing 3 or more carbon atoms is introduced too much, the obtained polymer has a too high hydrophobicity and the ability of dispersing the cement particles might be insufficient.

In view of these, the proportion of the oxyalkylene group containing 3 or more carbon atoms in the above-mentioned oxyalkylene chain is preferably 1% by mole or more, and more preferably 3% by mole or more, and still more preferably 5% by mole or more, and particularly preferably 7% by mole or more relative to 100% by mole of the entire oxyalkylene group constituting the oxyalkylene chain. Further, the proportion thereof is preferably 50% by mole or less, and more preferably 30% by mole or less, and still more preferably 20% by mole or less, and particularly preferably 10% by mole or less.

The above-mentioned oxyalkylene groups containing 3 or more carbon atoms in the oxyalkylene chain may be introduced into the chain in block or randomly. It is preferable that the oxyalkylene groups are introduced in block, for example, an oxyalkylene chain constituted by oxyalkylene groups containing 2 or more carbon atoms—an oxyalkylene chain constituted by oxyalkylene groups containing 3 carbon atoms—an oxyalkylene chain constituted by oxyalkylene groups containing 2 or more oxyalkylene groups.

An oxyalkylene group containing 3 to 8 carbon atoms is preferable as the above-mentioned oxyalkylene group containing 3 or more carbon atoms in view of easiness of the introduction, compatibility with cement particles, and the like. An oxypropylene group containing 3 carbon atoms, an oxybutylene group containing 4 carbon atoms, and the like are more preferable.

In the compounds represented by the above formulae (11) to (14), the ester bond might be separated by hydrolysis. It is preferable that an oxyalkylene group containing 3 or more carbon atoms is introduced into the end of $-(AO)_q-$.

Examples of the above-mentioned oxyalkylene group containing 3 or more carbon atoms include an oxypropylene group, an oxybutylene group, an oxystyrene group, and an alkyl glycidyl ether residue. Among these, an oxypropylene group and an oxybutylene group are preferable because of easiness of the production.

The amount of the above-mentioned oxyalkylene group containing 3 or more carbon atoms to be introduced is preferably 50% or more relative to both ends of $-(AO)_q-$, although it depends on the needed resistance to hydrolysis. It is more preferably 100% or more, and still more preferably 150% or more, and particularly preferably 200% or more.

In order to improve the resistance to hydrolysis, it is preferable that the end of $-(AO)_q-$ is a secondary alcohol residue. A publicly known method may be used to introduce a secondary alcohol group into the end of $-(AO)_q-$. For example, an alkylene oxide containing 3 or more carbon atoms is added to a polyalkylene glycol that is a starting material for $-(AO)_q-$. In order to increase the introduction rate of the secondary alcohol group, it is preferable that at least one compound selected from the group consisting of alkali metals, alkali earth metals, and oxides or hydroxides thereof is used as a catalyst in this addition reaction. Sodium hydroxide, potassium hydroxide, magnesium hydroxide, and calcium hydroxide are more preferable. Sodium hydroxide and potassium hydroxide are most preferable.

It is preferable that the reaction temperature during the addition reaction is 50 to 200° C. in order to increase the introduction rate of the secondary alcohol group. The reaction temperature is more preferably 70 to 170° C. and still more preferably 90 to 150° C., and particularly preferably 100 to 130° C.

The compound represented by the above formula (11), which is a thiol-modified monomer, can be produce by: for example, esterifying mercaptocarboxylic acid with —OH groups at both ends of the polyalkylene glycol chain using an acid catalyst such as p-toluene sulfonic acid; and, if necessary, neutralizing the acid catalyst using an alkali; and further removing the solvent. In this case, the compound represented by the above formula (11) is mainly produced, and the compounds represented by the above formulae (12) to (14) are secondarily produced.

Examples of the mercaptocarboxylic acid usable in the above-mentioned esterification reaction include thioglycolic acid, 2-mercaptopropionic acid, 3-mercaptopropionic acid, mercaptoisobutyl acid, thiomalic acid, mercaptostearic acid, mercaptoacetic acid, mercaptobutyric acid, mercaptooctanoic acid, mercaptobenzoic acid, mercaptonicotinic acid, cysteine, N-acetylcysteine, and mercaptothiazoleacetic acid. Among these, thioglycolic acid, 3-mercaptopropionic acid, thiomalic acid, and mercaptoisobutyl acid are preferable.

It is preferable that the above-mentioned reaction is performed in the presence of an antioxidant. This makes it possible to suppress a disulfide compound or the polymeric product represented by the above formulae (13) and (14) from being generated, in both of the mercaptocarboxylic acid as a starting material and the compound represented by the above formula (11) as a product.

The above-mentioned antioxidant is not especially limited and commonly used antioxidants may be used. Examples of the antioxidant include: phenothiazine and derivatives thereof; phenol compounds such as hydroquinone, catechol, resorcinol, methoquinone, butylhydroquinone, butylcatechol, naphthohydroquinone, dibutyl hydroxytoluene, butylhydroxyanisol, tocopherol, tocotrienol, and catechin; nitro compounds such as tri-p-nitrophenyl methyl, diphenyl picrylhydrazine, and picric acid; nitroso compounds such as nitrosobenzene and cupferron; amine compounds such as diphenylamine, di-p-fluorophenylamine, and N-(3-N-oxyanilino-1,3-dimethylbutylidene)aniline oxide; stable radicals such as TEMPO radical (2,2,6,6,-tetramethyl-1-piperidinyloxyl), diphenylpicrylhydrazyl, garbinoxyl, and verdazyl; ascorbic acid, erythorbic acid, and salts or esters thereof; dithiobenzoyl disulfide; copper (II) chloride; thiols such as mercaptoethanol, dithiothreitol, and glutathione; and tris(2-carboxyethyl)phosphine hydrochloride. These may be used singly or in combination of two or more species of them. Among these, phenothiazine and derivatives thereof, a phenol compound, ascorbic acid, erythorbic acid, and esters thereof are preferable because they are compounds which can more effectively exhibit a function as a radical scavenger or a polymerization inhibitor. Phenothiazine, hydroquinone, and methoquinone are more preferable.

The compound represented by the above formula (12), which is a thiol-modified monomer, can be produced by: for example, esterifying mercaptocarboxylic acid with —OH groups at both ends of the polyalkylene glycol chain using an acid catalyst such as p-toluene sulfonic acid; and, if necessary, neutralizing the acid catalyst using an alkali; and further removing the solvent. In this case, the compound represented by the above formula (12) is mainly produced and the compound represented by the above formula (14) is secondarily produced. If necessary, an antioxidant such as phenothiazine may be used in the esterification.

Examples of the mercaptocarboxylic acid usable in the above-mentioned esterification reaction include thioglycolic acid, 2-mercaptopropionic acid, 3-mercaptopropionic acid, mercaptoisobutyl acid, thiomalic acid, mercaptostearic acid, mercaptoacetic acid, mercaptobutyric acid, mercaptooctanoic acid, mercaptobenzoic acid, mercaptonicotinic acid, cysteine, N-acetylcysteine, and mercaptothiazoleacetic acid. Among these, thioglycolic acid, 3-mercaptopropionic acid, thiomalic acid, and mercaptoisobutyl acid are preferable.

In the above-mentioned alkylene glycol chain-containing thiol polymer, the polymer segment including a constitutional unit derived from the unsaturated monomer component is bonded to at least one end of the above-mentioned polyalkylene glycol chain (1) with a sulfur atom-containing group therebetween.

Examples of the above-mentioned sulfur atom-containing group include $-S-R^{11}-COO-$, $-S-R^{11}-CO-$, $-S-R^{11}-CO-NH-$, $-S-R^{11}-CO-NH-CH_2-CH_2-$, $-S-R^{11}-$, $-S-R^{11}-O-$, $-S-R^{11}-N-$, and $-S-R^{11}-S-$. Herein, $R^{11}$ means the same as the $R^{11}$ in the above formula (11). Among these sulfur atom-containing groups, $-S-R^{11}-COO-$ and are more preferable.

If the compound represented by the above formula (11) or a mixture including the compound (the mixture may further include the compounds represented by the above formulae (12) to (14)) is used for producing the above-mentioned polyalkylene glycol chain-containing thiol polymer, radicals generated from the thiol group (mercapto group) by heat, light, radiation, and the like, or radicals generated by a polymerization initiator which is additionally used according to need, are chain-transferred to the thiol group or cause cleavage of the disulfide bond, and thereby the monomers are successively added to both ends of the polyalkylene glycol chain (1) constituted by the oxyalkylene groups with the sulfur atom-containing group therebetween. As a result, the polyalkylene glycol chain-containing thiol polymer is produced.

In this case, a polymer including: a constitutional unit having a carboxyl group derived from the monomer (a); a constitutional unit having the polyalkylene glycol chain (2) constituted by p-oxyalkylene groups derived from the monomer (b); and further, if the monomer (c) is used, a constitutional unit derived from the monomer (c), at both ends of the polyalkylene glycol chain (1) constituted by q-oxyalkylene groups with the sulfur atom-containing group therebetween, is mainly generated. In addition, the following polymers are secondarily produced: a polymer in which the above-mentioned polymer structure is repeated twice or more; and a polymer including a constitutional unit containing a carboxyl group derived from the monomer (a), a constitutional unit containing the polyalkylene glycol chain (2) constituted by p-oxyalkylene groups derived from the monomer (b), and if the monomer (c) is used, a constitutional unit derived from the monomer (c). Further, a polymer of the monomer (a) and the monomer (b), a polymer of the monomers (a), (b), and (c) might be generated.

Such products are shown based on the above-mentioned polymers (i) to (iv) as follows. In the case where the polymerization reaction is performed in the presence of the compound represented by the above formula (11) or the mixture containing this compound (including the compounds represented by the above formulae (12) to (14)), the polymers (ii) and (iii) are generated as a polymer mixture if the monomers (a) and (b) are used or the monomers (a), (b), and (c) are used.

The relationship between the use amount of the compound represented by the above formula (11) and the use amount of the monomers (a), (b), and (c) is mentioned below. If the monomer (a) is a main component, the ratio (% by weight) of the compound represented by the above formula (11) to 100% of the total amount of the monomers (a), (b), and (c) is preferably 50 to 99, and more preferably 55 to 95, and still more preferably 60 to 90, and particularly preferably 65 to 85. If the monomer (b) is a main component, it is preferably 0.5 to 50, and more preferably 1 to 45, and still more preferably 2 to 40, and still more preferably 3 to 35, and particularly preferably 4 to 30, and most preferably 5 to 25.

If the compound represented by the above formula (12) or the mixture including such a compound (the mixture may further include the compound represented by the above formula (14)) is used for producing the above-mentioned polyalkylene glycol chain-containing thiol polymer, radicals generated from the thiol group (mercapto group) by heat, light, radiation, and the like, or radicals generated by a polymerization initiator which is additionally used according to need, are chain-transferred to the thiol group or cause cleavage of the disulfide bond, and thereby the monomers are successively added to both ends of the polyalkylene glycol chain (1) constituted by the oxyalkylene groups with the sulfur atom-containing group therebetween. As a result, the polyalkylene glycol chain-containing thiol polymer is produced.

In this case, a polymer including: a constitutional unit having a carboxyl group derived from the monomer (a); a constitutional unit having the polyalkylene glycol chain (2) constituted by p-oxyalkylene groups derived from the monomer (b); and further, if the monomer (c) is used, a constitutional unit derived from the monomer (c) at one end of the polyalkylene glycol chain (1) constituted by q-oxyalkylene groups with the sulfur atom-containing group therebetween, is mainly generated. In addition, the following polymers are secondarily produced: a polymer in which the polyalkylene glycol chain (1) constituted by q-oxyalkylene groups is bonded to both ends of the polymer segment including a constitutional unit having a carboxyl group derived from the monomer (a), a constitutional unit containing the polyalkylene glycol chain (2) constituted by p-oxyalkylene groups derived from the monomer (b), and if the monomer (c) is used, a constitutional unit derived from the monomer (c), with a sulfur atom-containing group therebetween; and a polymer including a constitutional unit containing a carboxyl group derived from the monomer (a), a constitutional unit containing the polyalkylene glycol chain (2) constituted by p-oxyalkylene groups derived from the monomer (b), and if the monomer (c) is used, a constitutional unit derived from the monomer (c). Further, a polymer of the monomers (a) and (b), or a polymer of the monomers (a), (b), and (c) might be generated.

Such products are shown based on the above-mentioned polymers (i) to (iv) as follows. In the case where the polymerization reaction is performed in the presence of the compound represented by the above formula (12) or a mixture containing such a compound (the compound represented by the above formula (14)), the polymers (i) and (iv) are generated as a polymer mixture if the monomers (a) and (b) are used or the monomers (a), (b), and (c) are used.

The relationship between the use amount of the compound represented by the above formula (12) and the use amount of the monomers (a), (b), and (c) is mentioned below. If the monomer (a) is a main component, the ratio (% by weight) of the compound represented by the above formula (12) to 100% of the total amount of the monomers (a), (b), and (c) is preferably 50 to 99, and more preferably 55 to 95, and still more preferably 60 to 90, and particularly preferably 65 to 85. If the monomer (b) is a main component, it is preferably 0.5 to 50, and more preferably 1 to 45, and still more preferably 2 to 40, and still more preferably 3 to 35, and particularly preferably 4 to 30, and most preferably 5 to 25.

A commonly used radical polymerization initiator may be used in the above-mentioned polymerization step, together with the compound represented by the above formula (11) or a mixture containing such a compound, or the compound represented by the above formula (12) or a mixture containing such a compound. Any conventional radical polymerization initiators can be used as the radical polymerization initiator.

The use amount of the above-mentioned polymerization initiator is not especially limited and may be appropriately adjusted depending on the species or amount of the compound represented by the above formula (11) or (12). If the use amount of the radical polymerization initiator is too small relative to the monomers to be polymerized, the radical concentration is too low and the polymerization reaction proceeds slowly. On the other hand, if the use amount thereof is too large, the polymerization attributed to the monomer proceeds preferentially rather than the polymerization attributed to the mercapto group or the disulfide bond, and thereby the yield of the block polymer might not be sufficient. Therefore, the use amount of the radical polymerization initiator is preferably 0.001% by mole or more, and more preferably 0.01% by mole or more, and still more preferably 0.1% by mole or more, and particularly preferably 0.2% by mole or more relative to 100% by mole of the unsaturated monomer component. In addition, the use amount thereof is preferably 10% by mole or less, and more preferably 5% by mole or less, and still more preferably 2% by mole or less, and particularly preferably 1% by mole or less.

In the above-mentioned polymerization step, if a solution polymerization is performed using water as a solvent, it is preferable that a water-soluble radical polymerization initiator is used. This is because insoluble components need not to be removed after the polymerization if a water-soluble radical polymerization initiator is used.

For example, the following compounds may be used. Persulfates such as ammonium persulfate, sodium persulfate, and potassium persulfate; hydrogen peroxide; water-soluble azo initiators, e.g., azoamidine compounds such as 2,2'-azobis(2-methylpropioneamidine)dihydrochloride, cyclic azoamidine compounds such as 2,2'-azobis[2-(2-imidazoline-2-yl) propane]dihydrochloride, azonitrile compounds such as 2-(carbamoylazo) isobutyronitrile, azoamide compounds such as 2,4'-azobis{2-methyl-N-[2-(1-hydroxybutyl)]propionamide}, macroazo compounds such as esters of 4,4'-azibis (4-cyanovaleric acid) with (alkoxy)polyethylene glycol. These polymerization initiators may be used singly or in combination of two or more species of them. Among these polymerization initiators, water-soluble azo initiators which easily generate radicals from the mercapto group or the disulfide bond are preferable.

In this case, the following accelerators (or reducing agents) may be used in combination. Alkali metal sulfites such as sodium hydrogensulfite, metadisulfite, sodium hypophosphite, Fe(II) salts such as Mohr's salt, sodiumhydroxymethane sulfinate dihydrate, hydroxylamine hydrochloride, thiourea, L-ascorbic acid or salts thereof, and erythorbic acid or salts or esters thereof. These accelerators (reducing agents) may be used singly or in combination of two or more species of them. Among these, a combination of hydrogen peroxide and an organic reducing agent is preferred. Preferred examples of the organic reducing agent include L-ascorbic acid or salts thereof, L-ascorbate, erythorbic acid or salts thereof, and erythorbate. The use amount of the accelerator (reducing agent) is not especially limited, and it is preferably 10% by mole or more, and more preferably 20% by mole or more, and still more preferably 50% by mole or more relative to 100% by mole of the polymerization initiator used together. In addition, the use amount thereof is more preferably 1000% by mole or less, and more preferably 500% by mole or less, and still more preferably 400% by mole or less.

If the solution polymerization is performed using a lower alcohol, an aromatic or aliphatic hydrocarbon, an ester, a ketone as the solvent in the above-mentioned polymerization step, or if a bulk polymerization is performed, the following compounds are used as a radical initiator. Peroxides such as benzoyl peroxide, lauroyl peroxide, and sodium peroxide; hydroperoxides such as t-butyl hydroperoxide and cumene hydroperoxide; macroazo compounds, e.g., azonitrile compounds such as azobisisobutylonitrile, azoamide compounds such as 2,2'-azobis(N-butyl-2-methyl propione amide), cyclic azoamidine compounds such as 2,2'-azobis[2-(2-imidazoline-2-yl)propane]dihydrochloride, azo compounds such as 4,4'-azobis(4-cyanovaleric acid), esters of 4,4'-azobis (4-cyanovaleric acid) with (alkoxy)polyethylene glycol, are used as a radical polymerization initiator. These polymerization initiators may be used singly or in combination of two or more species. Among these polymerization initiators, the azo initiators which easily generate radicals from the mercapto group or the disulfide bond are preferable.

In this case, an accelerator such as an amine compound also may be used. The use amount of the accelerator is not especially limited, and for example, it is preferably 10% by mole or more, and more preferably 20% by mole or more, and still more preferably 50% by mole or more, relative to 100% by mole of the polymerization initiator used together. The use amount thereof is preferably 1000% by mole or less, and more preferably 500% by mole or less, and still more preferably 400% by mole or less.

If a mixture solvent of water and a lower alcohol is used in the above-mentioned polymerization step, such a solvent may be appropriately selected from the above-mentioned radical polymerization initiators or combinations of the radical polymerization initiators and the accelerators.

A chain transfer agent may be used together in the above-mentioned polymerization reaction, in addition to the compound represented by the above formula (11) or (12). As usable chain transfer agents, the following commonly used hydrophilic chain transfer agents may be mentioned. Thiol chain transfer agents such as mercaptoethanol, thioglycerol, thioglycolic acid, 3-mercaptopropionic acid, thiomalic acid, and 2-mercaptoethanesulfonic acid; secondary alcohols such as isopropyl alcohol; and lower oxides and salts thereof, of phosphorous acid, hypophosphorous acid, and salts thereof (e.g., sodium hypophosphite, potassium hypophosphite, and the like), sulfurous acid, hydrogen sulfite, dithionous acid, metabisulfite, and salts thereof (e.g., sodium sulfite, sodium hydrogensulfite, sodium dithionite, sodium metabisulfite, and the like).

Hydrophobic chain transfer agents may be used as the above-mentioned chain transfer agent. Thiol chain transfer agents including a hydrocarbon group containing 3 or more carbon atoms such as butane thiol, octane thiol, decane thiol, dodecane thiol, hexadecane thiol, octadecane thiol, cyclohexylmercaptan, thiophenol, octyl thioglycolate, and octyl 3-mercaptopropionate are preferably used as the hydrophobic chain transfer agent.

One or more different compounds may be used as the above-mentioned chain transfer agents. The hydrophilic chain transfer agents and the hydrophobic chain transfer agents may be used in combination.

The use amount of the above-mentioned chain transfer agent is not especially limited and it may be appropriately adjusted depending on the species or amount of the compound represented by the above formula (11) or (12). The use amount of the chain transfer agent is preferably 0.1% by mole or more, and more preferably 0.25% by mole or more, and still more preferably 0.5% by mole or more relative to 100% by mole of the total number of moles of the unsaturated monomer component. The use amount thereof is preferably 20% by mole or less, and more preferably 15% by mole or less, and still more preferably 10% by mole or less.

The above-mentioned polymerization step may be performed by a solution polymerization, a bulk polymerization and the like. The solution polymerization may be performed in a batch-wise method, a continuous method, or a combination of two or more of them. Examples of a solvent which is used in the polymerization, if necessary, include: water; alcohols such as methyl alcohol, ethyl alcohol, and isopropyl alcohol; aromatic or aliphatic hydrocarbons such as benzene, toluene, xylene, cyclohexane, and n-hexane; esters such as ethyl acetate; ketones such as acetone and methyl ethyl ketone; and cyclic ethers such as tetrahydrofuran and dioxane. These may be used singly or in combination of two or more species of them.

In the above-mentioned polymerization step, the polymerization temperature is not especially limited and may be appropriately determined depending on the species of the solvent or the polymerization initiator to be used. The polymerization temperature is preferably 0° C. or more, and more preferably 30° C. or more, and still more preferably 50° C. or more, and still more preferably 70° C. or more. Further, the polymerization temperature is preferably 150° C. or less, and more preferably 120° C. or less, and still more preferably 100° C. or less, and still more preferably 90° C. or less.

The method of charging the unsaturated monomer component into a reactor is not especially limited. Any of the following methods may be employed. A method of charging the total amount of the monomers into the reactor in one portion in early stages; a method of charging the total amount of the monomers into the reactor in portions or continuously; and a method of charging part of the monomers into the reactor in early stages, and then changing the rest of the monomers into the reactor in portions or continuously. The radical polymerization initiator or the chain transfer agent may be initially charged or added dropwise into the reactor. These methods may be combined depending on the purpose.

In the above-mentioned polymerization step, it is necessary to allow the polymerization reaction to stably proceed in order to produce a polymer having a specific molecular weight with reproducibility. If the solution polymerization is performed, it is preferable that the concentration of dissolved oxygen in the used solvent at 25° C. is 5 ppm or less. The concentration is more preferably 4 ppm or less, and still more preferably 2 ppm or less, and most preferably 1 ppm or less. If the monomers are added to the solvent and then nitrogen substitution and the like is performed, it is preferable that the concentration of dissolved oxygen in the system also including the monomers is within the above-mentioned range.

The above-mentioned concentration of dissolved oxygen in the solvent may be adjusted in a polymerization reactor. A solvent having a previously adjusted concentration of dissolved oxygen may be used. The following (1) to (5) methods may be mentioned as a method of eliminating oxygen in the solvent.

(1) A closed vessel containing the solvent is charged with an inert gas such as nitrogen, under pressure, and the pressure within the closed vessel is then reduced to thereby reduce the partial pressure of oxygen in the solvent. The pressure within the closed vessel may be reduced in a nitrogen stream.
(2) The gaseous phase in a vessel containing the solvent is replaced with an inert gas such as nitrogen, and the liquid phase is stirred vigorously for a sufficiently long period of time.
(3) The solvent placed in a vessel is bubbled with an inert gas such as nitrogen, for a sufficiently long period of time.
(4) The solvent is once boiled and then cooled in an inert gas (e.g., nitrogen) atmosphere.
(5) A relevant piping is provided with a static mixer, and the solvent is admixed with an inert gas such as nitrogen, in the course of transfer to a polymerization vessel through the piping.

In terms of handling ability, it is preferable that the polymer obtained in the above-mentioned polymerization step is adjusted to have a pH higher than a weak acidic pH in an aqueous solution form. The pH is more preferably 4 or more, and still more preferably 5 or more, and particularly preferably 6 or more. The reaction aqueous solution with a pH of 7 or more may be subjected to the polymerization reaction, but in such a case, the polymerization degree is decreased and simultaneously the dispersibility is reduced because of insufficient polymerizability. Therefore, it is preferable that the reaction aqueous solution having an acid to neutral pH range is subjected to the copolymerization reaction. The pH is more preferably less than 6, and still more preferably less than 5.5, and particularly preferably less than 5. As a preferable polymerization initiator which enables the polymerization system to have a pH of 7.0 or less, persulfates such as ammonium persulfate, sodium persulfate, and potassium persulfate, water-soluble azo initiators, e.g., azoamidine compounds such as azobis-2-methylpropioneamidine hydrochloride, hydrogen peroxide; and combinations of hydrogen peroxide with an organic reducing agent are preferably used.

Accordingly, it is preferable that the aqueous reaction solution with a low pH is subjected to the polymerization reaction, and then, an alkali substance is added, thereby adjusting the solution to have a higher pH.

As preferable embodiments, the following methods are specifically mentioned. A method of subjecting the solution having a pH of less than 6 to the copolymerization reaction, then adding an alkali substance, thereby adjusting the solution to have a pH of 6 or more; a method of subjecting the solution having a pH of less than 5 to the copolymerization reaction, then adding an alkali substance, thereby adjusting the solution to have a pH of 5 or more; and a method of subjecting the solution having a pH of less than 5 to the copolymerization reaction, then adding an alkali substance, thereby adjusting the solution to have a pH of 6 or more. The pH may be adjusted using inorganic salts such as hydroxides or carbonates of monovalent metals or divalent metals; ammonia; and alkaline substances such as organic amines, for example. If the pH needs to be decreased, particularly if the pH needs to be adjusted during the polymerization, the pH can be adjusted using an acid substance such as phosphoric acid, sulfuric acid, nitric acid, alkyl phosphoric acid, alkyl sulfuric acid, alkyl sulfonic acid, and (alkyl)benzenesulfonic acid. Among these acid substances, phosphoric acid is preferred because it has a pH buffer action. After completion of the reaction, the concentration may be adjusted, if necessary.

The polymer mixture obtained by the above-mentioned polymerization step may be subjected to a step of isolating the respective polymers, if necessary. However, the polymer mixture can be used in various applications such as a dispersant (particularly an admixture for cement) without isolating the respective polymers in view of an operating efficiency or production costs.

A dispersant (H) and an admixture for cement (I) which includes the above-mentioned polyalkylene glycol chain-containing thiol polymer or polymer mixture thereof are as mentioned below.

<(D) Thiol-Modified Monomer>

The thiol modified monomer of the present invention is a thiol-modified monomer having a structure represented by the above-mentioned formula (1) or (2).

According to the thiol-modified monomer represented by the above formula (1), which is a dithiol-modified product, the thiol group (mercapto group) at one end and the thiol group at the other end are kept with a sufficient atomic distance therebetween, and therefore, the thiol groups become hard to be close to each other inside the molecule. According to the thiol-modified monomer represented by the above formula (2), which is a monothiol-modified product, the thiol groups become hard to be close to each other between the molecules.

In the above-mentioned formulae (1) and (2), $R^1$ and $R^2$ are the same or different and each represent an organic residue. Further, $R^1$ and $R^2$ are not especially limited and can be appropriately changed depending on the production embodiment of the thiol-modified monomers represented by the formulae (1) and (2). Examples of such an organic residue include $C_{1-18}$ straight- or branched chain alkylene groups, phenyl groups, alkylphenyl groups, pyridinyl groups, and aromatic groups such as thiophene, pyrrole, furan, and thiazole. If the above-mentioned thiol-modified monomer is produced, as mentioned below, by esterifying a compound containing a carboxyl group and a mercapto group in one molecule, which is a compound containing a carboxyl group and at least one thiol group in one molecule, with polyoxyalkylene glycol, $R^1$ and $R^2$ might be mercaptocarboxylic acid residues, which are divalent organic residues without the mercapto group and the carboxyl group.

The above-mentioned $R^1$ and $R^2$ may be partly substituted with a hydroxyl group, an amino group, a cyano group, a carbonyl group, a carboxyl group, a halogen group, a sulfonyl group, a nitro group, a formyl group, and the like.

In the above formulae (1) and (2), $R^3$ represents a hydrogen atom or an organic residue. The organic residue is preferably a hydrocarbon group containing 1 to 20 carbon atoms, specifically. Examples of the hydrocarbon group containing 1 to 20 carbon atoms include an aliphatic alkyl group containing 1 to 20 carbon atoms, an alicyclic alkyl group containing 3 to 20 carbon atoms, an alkenyl group containing 2 to 20 carbon atoms, an alkynyl group containing 2 to 20 carbon atoms, and an aryl group containing 6 to 20 carbon atoms.

The above-mentioned $R^3$ is preferably a hydrophilic group in view of dispersibility of cement particles. Specifically, a hydrogen atom or an alkyl group containing 1 to 10 carbon atoms is preferable. A hydrogen atom or an alkyl group containing 1 to 5 carbon atoms is more preferable, and a hydrogen atom or an alkyl group containing 1 to 3 carbon atoms is still more preferable.

In the above formulae (1) and (2), AO are not especially limited and are the same or different and each represent one or more different oxyalkylene groups containing 2 to 18 carbon atoms. If AO are constituted by two or more different oxyalkylene groups, these oxyalkylene groups may be introduced in block or randomly.

If the thiol-modified monomer of the present invention is used to produce an admixture component for cement, it is preferable that AO are relatively short chain-oxyalkylene groups containing about 2 to 8 carbon atoms, mainly. More preferably, AO are mainly oxyalkylene groups containing 2 to 4 carbon atoms, and still more preferably, AO are mainly oxyalkylene groups containing 2 carbon atoms, that is, oxyethylene groups. Particularly preferable is an embodiment in which oxyalkylene groups account for 75% by weight or more relative to 100% by weight of the entire oxyalkylene group constituting the oxyalkylene chain represented by $-(AO)_n-$. Due to this configuration, the thiol-modified monomer has a higher hydrophilicity.

If the above-mentioned oxyalkylene chain contains the oxyalkylene group containing 3 or more carbon atoms, the above-mentioned thiol-modified monomer is provided with hydrophobicity to some extent. Further, an admixture for cement obtained using such a thiol-modified monomer can slightly provide cement particles with a structure (network) and a viscosity or stiffness of a cement composition can be reduced. However, if the oxyalkylene group containing 3 or more carbon atoms is introduced too much, the performance of dispersing the cement particles might be insufficient because the hydrophobicity of the thiol-modified monomer becomes too higher.

In view of these, the proportion of the oxyalkylene group containing 3 or more carbon atoms in the above-mentioned oxyalkylene chain is preferably 30% by weight or less relative to 100% by weight of the oxyalkylene chain. The proportion thereof is more preferably 25% by weight or less, and still more preferably 20% by weight or less, and particularly preferably 5% by weight or less.

Depending on the application of the thiol-modified monomer of the present invention, an embodiment in which no oxyethylene group containing 3 or more carbon atoms is included might be preferable.

In the compounds represented by the above formulae (1) and (2), the ester bond might be separated by hydrolysis. It is preferable that an oxyalkylene group containing 3 or more carbon atoms is introduced into the end of $-(AO)_n-$.

Examples of the above-mentioned oxyalkylene group containing 3 or more carbon atoms include an oxypropylene group, an oxybutylene group, an oxystyrene group, and an alkyl glycidyl ether residue. Among these, an oxypropylene group and an oxybutylene group are preferable because of easiness of the production.

The amount of the above-mentioned oxyalkylene group containing 3 or more carbon atoms to be introduced is preferably 50% or more relative to both ends of $-(AO)_n-$, although it depends on the needed resistance to hydrolysis. It is more preferably 100% or more, and still more preferably 150% or more, and particularly preferably 200% or more.

In order to improve the resistance to hydrolysis, it is preferable that the end of $-(AO)_n-$ is a secondary alcohol residue. A publicly known method may be used to introduce a secondary alcohol group into the end of $-(AO)_n-$. For example, an alkylene oxide containing 3 or more carbon atoms is added to a polyalkylene glycol that is a starting material for $-(AO)_n-$. In order to increase the introduction rate of the secondary alcohol group, it is preferable that at least one compound selected from the group consisting of alkali metals, alkali earth metals, and oxides or hydroxides thereof is used as a catalyst in this addition reaction. Sodium hydroxide, potassium hydroxide, magnesium hydroxide, and calcium hydroxide are more preferable. Sodium hydroxide and potassium hydroxide are most preferable.

It is preferable that the reaction temperature during the addition reaction is 50 to 200° C. in order to increase the introduction rate of the secondary alcohol group. The reaction temperature is more preferably 70 to 170° C. and still more preferably 90 to 150° C., and particularly preferably 100 to 130° C.

In the above-mentioned oxyalkylene chain, the average number of moles of oxyalkylene group, represented by n, is an integer of 80 to 500. It is preferably 90 or more, and more preferably 100 or more, and still more preferably 110 or more, and particularly preferably 120 or more, and most preferably 140 or more. The upper limit of n is not especially limited. If n is a too large value, problems in terms of workability are generated. For example, the viscosity of starting compounds used for producing the thiol-modified monomer is increased or the reactivity is insufficient. Therefore, it is appropriate that n is 500 or less. n is preferably 400 or less, and more preferably 350 or less, and still more preferably 300 or less, and still more preferably 280 or less, and furthermore preferably 250 or less, and particularly preferably 220 or less, and most preferably 200 or less.

In this description, the average number of moles of oxyalkylene group also means the average number of moles of oxyalkylene group added.

It is preferable in the above-mentioned thiol-modified monomer that $R^1$ and/or $R^2$ in the above formula (1) or (2), or n is appropriately adjusted, thereby adjusting the proportion of AO in the formula to 50% by weight or more relative to 100% by weight of the thiol-modified monomer. As a result, the contribution rate of AO in the thiol-modified monomer is increased, and therefore the characteristics of the thiol-modified monomer of the present invention can be easily adjusted by appropriately selecting AO.

The thiol group is easy to form a polymeric product particularly by being oxidized under alkaline conditions. Examples of such a polymeric product include a r-mer of a diester compound represented by the following formula (1'):

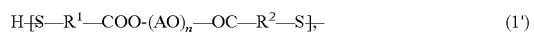

$$H-[S-R^1-COO-(AO)_n-OC-R^2-S]_r- \qquad (1')$$

in the formula,
$R^1$, $R^2$, AO, and n are the same as in the above formula (1);
r represents an integer of 2 or more, and a dimer of a monoester compound represented by the following formula (2'):

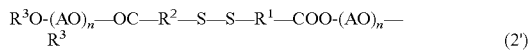

$$R^3O\text{-}(AO)_n\text{—OC—}R^2\text{—S—S—}R^1\text{—COO-}(AO)_n\text{—}R^3 \quad (2')$$

in the formula,
$R^1$, $R^2$, $R^3$, AO, and n are the same as in the above formula (2).

It is preferable that an antioxidant is added to the thiol-modified monomer in order to prevent the polymeric product of the monomer from being generated.

Specific examples and preferable compounds as the above-mentioned antioxidant are as mentioned above in <(A) polyalkylene glycol chain-containing thiol polymer>.

The dosage of the above-mentioned antioxidant is not especially limited as long as the antioxidant can effectively prevent the polymeric product of the thiol-modified monomer from being generated. If the dosage thereof is too small, the effects are not exhibited. If it is too large, the performances of the thiol-modified monomer might be insufficient or the monomer might be colored. Accordingly, the antioxidant is preferably 10 ppm by weight or more relative to the weight (solid contents) of the thiol modified-monomer. It is more preferably 20 ppm by weight or more, and still more preferably 50 ppm by weight or more, and particularly preferably 100 ppm by weight or more. Further, it is preferably 5000 ppm by weight or less, and more preferably 2000 ppm by weight or less, and still more preferably 1000 ppm by weight or less, and particularly preferably 500 ppm by weight or less.

Thus, the preferable embodiments of the present invention include an embodiment in which the thiol-modified monomer includes 10 to 5000 ppm by weight of an antioxidant.

It is preferable that the above-mentioned thiol-modified monomer is obtained by esterifying a compound including a carboxyl group or a hydroxyl group and a mercapto group in one molecule with a compound including an alkylene glycol group-containing organic residue. It is more preferable that the thiol-modified monomer is obtained by esterifying a compound including a carboxyl group and a mercapto group in one molecule with polyoxyalkylene glycol. The present invention also includes a production method of the thiol-modified monomer, including such an esterification step.

The following (i) to (iii) synthesis methods are mentioned as a thiol synthesis method in the Chemical Society of Japan, "Jikken Kagaku Koza Vol. 24, 4th Ed.", p 320 to 331, Maruzen.
(i) A synthesis method using a substitution reaction with a primary or secondary alkyl halide or a sulfonate and various sulfurization agents;
(ii) a synthesis method of adding thioacetic acid or thiobenzoic acid to a double bond and hydrolyzing it, thereby producing thiol (synthesis method using an addition reaction); and
(iii) a synthesis method using a reduction reaction of disulfide and the like.

However, according to the above-mentioned synthesis method (i), production of the thiol-modified monomer of the present invention needs many stages including reaction, purification, reduction, and purification, and the sulfurization agent is generally expensive. Therefore, it is very expensive to industrially produce the thiol-modified monomer by the above-mentioned synthesis method (i). A polyalkylene oxide compound including one or two functional groups which can be substituted, such as a halogen group and a sulfonate group (hereinafter, also referred to as simply "starting material compound 1") is needed as a starting material. It is very difficult to obtain the starting compound 1 having a high purity for obtaining a thiol-modified monomer with a relatively large molecular weight, as in the present invention. It is also very difficult to purify the obtained thiol-modified monomer (or thiol-modified monomer mixture) to have a desired purity.

If the thiol-modified monomer of the present invention is produced by the above-mentioned synthesis method (ii), thiocarboxylic acid such as thioacetic acid and thiobenzoic acid is added to a compound including a double bond such as an allyl group at both ends of a polyalkylene glycol (hereinafter, also referred to as a "starting compound 2") and then the obtained product is subjected to an alkaline hydrolysis. However, in the above-mentioned synthesis method (ii), an excess amount of thioacetic acid or thiobenzoic acid is added to the double bond, but such thioacetic acid or thiobenzoic acid is expensive. Further, thioacetic acid or thiobenzoic acid and a decomposed product thereof have a strong odor, and therefore a special apparatus is needed for the synthesis and purification. As a result, there is a problem in that the production costs for the thiol-modified monomer of the present invention are much increased.

Further, if the thiol-modified monomer is produced by the above-mentioned synthesis method (iii), as in the synthesis method (i), a polyalkylene oxide compound including one or two functional groups which can be substituted such as a halogen group and a sulfonate group (the starting material 1) is needed. As mentioned above, it is difficult to obtain and synthesize the starting compound 1 used for producing a high-molecular weight thiol-modified monomer of the present invention.

However, according to the production method of the thiol-modified monomer of the present invention, a high-molecular weight thiol-modified monomer can be simply or efficiently produced at low costs. The production method of the thiol-modified monomer of the present invention is further mentioned below.

In the above-mentioned production method of the thiol-modified monomer, a polyalkylene glycol and a compound obtained by introducing a carboxyl group into this polyalkylene glycol may be mentioned as the compound including an alkylene glycol group-containing organic residue (hereinafter, also referred to simply as an "alkylene glycol group-containing compound"). A commercially available polyalkylene glycol may be used, or a polyalkylene glycol synthesized by reacting one or more alkylene oxides with water or an alcohol may be used.

Examples of the above-mentioned alkylene oxide include ethylene oxide, propylene oxide, 1,2-butylene oxide, 2,3-butylene oxide, styrene oxide, and epichlorohydrin. One or two or more species of them may be used.

Specific examples of the alcohol include methanol, ethanol, buthanol, ethylene glycol, propylene glycol, and butanediol. One or two or more species of them may be used.

The above-mentioned reaction of the alkylene oxide with water or the alcohol may be performed by a common method. For example, the method disclosed in Japanese Kokai Publication No. 2002-173593 may be mentioned. Specifically, a mixture solution including an alkylene oxide and water or the alcohol is heated to 50 to 200° C. under pressure in the presence of a usual catalyst. In this case, the entire alkylene oxide may be charged in one portion and then the reaction may be performed, or into a reactor into which water or the alcohol and part of the alkylene oxide are charged, the rest of the alkylene oxide is continuously or sequentially added to perform the reaction.

If the above-mentioned polyalkylene glycol needs to have a carboxyl group, a carboxyl group may be introduced into polyalkylene glycol by a common method. Examples of such a method include a method of oxidizing a hydroxyl group included in polyalkylene glycol, a method of etherifying the hydroxyl group with monochloroacetic acid, and a method of esterifying the hydroxyl group with polycarboxylic acid.

In the above-mentioned production method of the thiol-modified monomer, the compound including a carboxyl group or a hydroxyl group and a mercapto group in one molecule (hereinafter, also referred to simply as "thiol group-containing compound") is not especially limited as long as the mercapto group can be introduced into the alkylene glycol group-containing compound. Examples thereof include: mercapto group-containing carboxylic acids such as thioglycolic acid, 2-mercaptopropionic acid, 3-mercaptopropionic acid, mercaptoisobutylic acid, thiomalic acid, mercaptostearic acid, mercaptoacetic acid, mercaptobutyric acid, mercaptooctanoic acid, mercaptobenzoic acid, mercaptonicotinic acid, cysteine, N-acetylcysteine, mercaptothiazoleacetic acid; and mercaptoethanol. One or two or more species of them may be used.

Among these, a compound including a carboxyl group and a mercapto group in one molecule is preferable as the above-mentioned thiol group-containing compound. Particularly, thioglycolic acid, 3-mercaptopropionic acid, mercaptoisobutylic acid, and thiomalic acid are preferable.

In the above-mentioned production method, the above-mentioned alkylene glycol group-containing compound is esterified with the above-mentioned thiol group-containing compound. The esterification reaction can be performed in a usual esterification manner which is performed in a liquid phase. Further, the esterification reaction may be performed under vacuumed pressure or using an entrainer such as xylene. If necessary, an acid catalyst such as sulfuric acid and paratoluenesulfonic acid may be used.

The reaction time for the above-mentioned esterification may be appropriately determined depending on the species or amount of the used acid catalyst, the mixing ratio between the alkylene glycol group-containing compound with the thiol group-containing compound, and the concentration of the solution.

The above-mentioned mixing ratio between the alkylene glycol group-containing compound and the thiol group-containing compound may be selected as follows depending on a desired purity of the thiol-modified monomer, production costs, the synthesis method, and the like.

(1) The molar ratio of the hydroxyl group or the carboxyl group derived from the thiol group-containing compound is adjusted to be excessively large relative to the amount of the functional group such as the hydroxyl group and the carboxyl group which is subjected to the reaction, derived from the alkylene glycol group-containing compound. Specifically, the molar ratio of the hydroxyl group or the carboxyl group derived from the thiol group-containing compound is twice or more, and more preferably 3 times or more in view of reaction speed. It is preferably 10 times or less and more preferably 5 times or less in view of production costs. According to this method, the thiol-modified monomer with a high purity can be produced for a short time. The coarse reaction product after the reaction may be used as it is, but if necessary, it may be purified to remove residual products.

(2) The molar ratio of the hydroxyl group or the carboxyl group derived from the thiol group-containing compound is twice or less relative to the amount of the functional group such as the hydroxyl group and the carboxyl group which is subjected to the reaction, derived from the alkylene glycol group-containing compound. Specifically, the molar ratio is preferably 0.3 times or more, and more preferably 0.5 times or more, and still more preferably 0.7 times or more, and still more preferably 0.8 times or more in view of yield. The molar ratio is preferably 1.8 times or less, and more preferably 1.6 times or less, and still more preferably 1.4 times or less, and still more preferably 1.3 times or less in view of the amount of residual products. The coarse reaction product after the reaction may be purified if necessary. However, according to this method, the amount of the residual thiol group-containing compound is small. Therefore, such a removing operation can be omitted, generally, and as a result, the production steps can be more simplified.

In the obtained thiol-modified monomer, if the content of the thiol-modified monomer (monothiol-modified product) represented by the above formula (2) is increased, for example, the carboxyl group or the hydroxyl group at one end of the alkylene glycol group-containing compound is protected with an alkyl group, and the carboxyl group or the hydroxyl group at the other end may be esterified with the thiol group-containing compound. The protection group such as an alkyl group, added to one end of the alkylene glycol group-containing compound may be eliminated if necessary.

The above-mentioned production method of the thiol-modified monomer may include a step of adjusting the pH of the reaction solution after the esterification reaction. As a result, the generated ester can be sufficiently suppressed from being hydrolyzed by the desolvation step. The pH can be adjusted by adding a NaOH aqueous solution into the reaction solution obtained by the above-mentioned esterification reaction, for example. In order to suppress the hydrolysis, the reaction solution preferably has a pH of 3 or more, and more preferably 4 or more. Further, it preferably has a pH of 8 or less, and more preferably 7 or less, and still more preferably 6 or less, and particularly preferably 5.5 or less.

The coarse reaction product (including the thiol-modified monomer of the present invention) obtained by the above-mentioned esterification reaction is preferably solidified by cooling the reaction solution after the esterification reaction (that is, the reaction solution whose pH is not adjusted) or the reaction solution whose pH is adjusted to a room temperature. As a result, the coarse reaction product (including the thiol-modified monomer) can be easily produced from the reaction solution. The obtained solidified coarse reaction product is dried as it is and then may be used as the thiol-modified monomer. However, if the obtained coarse reaction product includes impurities such as a residual thiol group-containing compound and the thiol-modified monomer of the present invention needs to be purified by removing these impurities, for example, the solidified coarse reaction product may be dried and pulverized and then washed with a solvent which dissolves the impurities such as the thiol group-containing compound but not dissolve the thiol-modified monomer, such as diethyl ether.

However, it is preferable that the above-mentioned washing using the above-mentioned solvent is not performed in view of an increase in production costs due to an increase in working steps, and environmental loads due to the use of the solvent. Accordingly, as mentioned above, with respect to the mixing ratio of the alkylene glycol group-containing compound with the thiol group-containing compound, which are starting material compounds, the molar ratio of the hydroxyl group or the carboxyl group derived from the thiol group-containing compound is twice or less relative to the amount of the functional group such as the hydroxyl group and the carboxyl group which is subjected to the reaction, derived from the alkylene glycol group-containing compound. The molar ratio is preferably 1.8 times or less, and more preferably 1.6 times or less, and still more preferably 1.4 times or less, and still more preferably 1.3 times or less in view of the amount of the residual compounds.

The present inventors found that a polymeric product of the thiol-modified monomer is generated when the solidified coarse reaction product is dried to form a dry solidified product or this dry solidified product is further washed with diethyl ether and the like, thereby obtaining a thiol-modified monomer from the coarse reaction product.

Then, after various investigations, the inventors found that such generation of the polymeric product of the thiol-modified monomer was attributed to the drying of the solidified coarse reaction product including the thiol-modified monomer. As a result, the following was found. It is preferable that the solidified coarse reaction product is handled while being prevented from being dried, and in such a case, generation of the polymeric product of the monomer can be suppressed.

It is preferable that the above-mentioned production method of the thiol-modified monomer includes a step of adding an antioxidant. According to this, for example, even if the solution in which the thiol-modified monomer is dissolved is heated, generation of the polymeric product of the monomer can be sufficiently suppressed. This seems to be because of the following reason.

That is, the reaction of the alkylene glycol group-containing compound with the thiol group-containing compound, which are starting materials, generally needs heating. However, if the reaction mixture is heated, the thiol group of the thiol-modified monomer in the reaction mixture generates heat radicals and therefore the polymeric compound might be generated. Therefore, generation of the polymeric product of the thiol-modified monomer can be effectively suppressed by adding the antioxidant having a radical-capturing capability into the monomer. The above-mentioned antioxidant may be added in any production stages, and for example, during the esterification reaction or when the solidified coarse reaction product is obtained from the reaction solution.

The specific examples and preferable compounds as the above-mentioned antioxidant are as mentioned above.

The dosage of the above-mentioned antioxidant is not especially limited as long as the antioxidant can effectively prevent the polymeric product of the thiol-modified monomer from being generated. It is preferable that the dosage thereof is adjusted in such a way that the content of the antioxidant in the thiol-modified monomer is within the above-mentioned range.

As mentioned above, the solidified product of the thiol-modified monomer tends to easily generate polymeric products if dried. Accordingly, it is preferable that the thiol-modified monomer of the present invention is preserved in a solution form. The thiol-modified monomer is preferably preserved in form of an aqueous solution with a pH of 4 or more. The pH is more preferably 5 or more, and still more preferably 6 or more. Further, it is preferably preserved in form of an aqueous solution with a pH of 7 or less.

The above-mentioned production method of the thiol-modified monomer also may include a step of removing the polymeric product from the thiol-modified monomer because the thiol-modified monomer easily forms the polymeric product and the thiol-modified monomer of the present invention also includes the polymeric product. Dialysis, ultra filtration, a molecular weight fractionation such as GPC, and the like may be mentioned as a method of removing the polymeric product.

The thiol-modified monomer including the polymeric product may be used as it is, for example, in preparation of the below-mentioned polymer because addition of the step of removing the polymeric product increases the production costs.

The present invention is also a polyalkylene glycol chain-containing thiol polymer (G) obtainable by polymerizing an unsaturated monomer component including an unsaturated carboxylic acid monomer and/or an unsaturated polyalkylene glycol monomer in the presence of the above-mentioned thiol-modified monomer.

Such a polymer (G) has a structure including a polyalkylene glycol chain (which is referred to as a "polyalkylene glycol chain (1)") derived from the above-mentioned thiol-modified monomer and a polymer segment bonded to at least one end of the polyalkylene glycol chain (1) with a sulfur atom-containing group therebetween. The polymer segment includes a constitutional unit derived from the unsaturated monomer unit.

With respect to such a structure, if at least an unsaturated carboxylic acid monomer is used as the above-mentioned unsaturated monomer component, such a polymer includes a carboxyl group derived from the unsaturated carboxylic acid monomer at one or both ends of the polyalkylene glycol chain (1). Therefore, the polymer adsorbs to a cement particle with the carboxyl group therebetween, and also due to a steric repulsion of the polyalkylene glycol chain (1), the polymer can effectively disperse the cement particle. If at least an unsaturated polyalkylene glycol monomer is used as the above-mentioned unsaturated monomer component, such a polymer includes a polyalkylene glycol chain (which is referred to as a "polyalkylene glycol chain (2)") derived from the unsaturated polyalkylene glycol monomer at one or both ends of the polyalkylene glycol chain (1). Therefore, due to synergistic effects of a steric repulsion of the polyalkylene glycol chain (2) in addition to the steric repulsion of the polyalkylene glycol chain (1), the performance of dispersing the cement particle seems to be improved.

With respect to the unsaturated monomer component constituting the above-mentioned polymer (G), the unsaturated carboxylic acid monomer and the unsaturated polyalkylene glycol monomer are the same as the monomer (a) and the monomer (b) mentioned in the <(A) polyalkylene glycol chain-containing thiol polymer>, respectively. Further, the unsaturated monomer component may include the above-mentioned monomer (c) as another monomer.

The use amount of these monomers, the relationship between the use amount of the above-mentioned thiol-modified monomer and the use amount of the unsaturated monomer component, the relationship between the amount of the polyalkylene glycol chain (1) and the use amount of the unsaturated monomer component, the polymerization method, the polymerization conditions, and the weight average molecular weight of the polymer are the same as those in the above-mentioned <(A) polyalkylene glycol chain-containing thiol polymer>.

If the above-mentioned thiol-modified monomer is used in the above-mentioned polymerization reaction, radicals generated from the thiol group (the mercapto group) by heat, light, radiation, and the like, or radicals generated by a polymerization initiator which is additionally used according to need, are chain-transferred to the thiol group or cause cleavage of the disulfide bond, and thereby the monomers are successively added to one or both ends of the polyalkylene glycol chain (1) constituted by the oxyalkylene groups with the sulfur atom-containing group therebetween. As a result, the polyalkylene glycol chain-containing thiol polymer is produced.

In this case, a polymer including: a constitutional unit having a carboxyl group derived from the monomer (a); a constitutional unit having the polyalkylene glycol chain (2) constituted by p-oxyalkylene groups derived from the monomer (b); and further, if the monomer (c) is used, a constitutional unit derived from the monomer (c) at one or both ends of the polyalkylene glycol chain (1) constituted by n-oxyalkylene groups with the sulfur atom-containing group therebetween, is mainly generated. In addition, the following polymers are secondarily produced: a polymer in which the above-mentioned polymer structure is repeated twice or more; and a polymer including a constitutional unit containing a carboxyl group derived from the monomer (a), a constitutional unit containing the polyalkylene glycol chain (2) constituted by p-oxyalkylene groups derived from the monomer (b), and if the monomer (c) is used, a constitutional unit derived from the monomer (c).

Further, a polymer of the monomers (a) and (b), a polymer of the monomers (a), (b), and (c) might be generated.

A dispersant (H) and an admixture for cement (I) each which includes the above-mentioned polymer (G) are as mentioned below.

<(F) Thiol-Modified Monomer Mixture>

The thiol-modified monomer mixture of the present invention includes: a thiol-modified monomer having a structure represented by the above-mentioned formula (3) and/or (4), and a polymeric product of the thiol-modified monomer.

If the monomer mixture includes the thiol-modified monomer represented by the above formula (3), which is a dithiol-modified product, as the above-mentioned thiol-modified monomer, the thiol group (the mercapto group) at one end and the thiol group at the other end are kept with a sufficient atomic distance therebetween. Further, if the monomer mixture includes the thiol-modified monomer represented by the above-mentioned formula (4), which is a monothiol-modified product, the thiol groups become hard to be close to each other between the molecules.

In the above formulae (3) and (4), $R^1$, $R^2$, and $R^3$ are the same as those mentioned in the <(D) thiol-modified monomer>.

In the above-mentioned formulae (3) and (4), AG constitutes a main part of the thiol-modified monomer mixture of the present invention and therefore AG is important because the characteristics of the monomer mixture depend on AG. In order for the above-mentioned thiol-modified monomer mixture to satisfy needed performances such as flexibility, solubility, and stability, AG essentially includes a polyalkylene oxide residue constituted by a repeating unit of at least one alkylene glycol containing 2 to 18 carbon atoms. The proportion of the polyalkylene oxide residue in AG is preferably 50% by weight or more, and more preferably 70% by weight or more, and still more preferably 80% by weight or more, and particularly preferably 90% by weight or more relative to 100% by weight of AG.

If the above-mentioned thiol-modified monomer mixture is used to produce an admixture component for cement, it is preferable that the polyalkylene oxide residue included in AG is mainly constituted by relatively short chain-oxyalkylene groups containing about 2 to 8 carbon atoms. The polyalkylene oxide residue is mainly constituted by oxyalkylene groups containing 2 to 4 carbon atoms, and more preferably mainly oxyalkylene groups (oxyethylene groups) containing 2 carbon atoms. If the polyalkylene oxide residue is constituted by two or more different oxyalkylene groups, these oxyalkylene groups may be introduced in block or randomly.

Among these, an embodiment in which the above-mentioned organic residue represented by AG contains 75% by weight or more of oxyethylene groups relative to 100% by weight of this organic residue is preferable. According to such a configuration, the thiol-modified monomer has a higher hydrophilicity.

If the oxyalkylene group containing 3 or more carbon atoms is included in the above-mentioned AG, the above-mentioned thiol-modified monomer is provided with hydrophobicity to some extent. Further, an admixture for cement obtained using the thiol-modified monomer mixture of the present invention can slightly provide cement particles with a structure (network) and reduce a viscosity or stiffness of a cement composition. However, if the oxyalkylene group containing 3 or more carbon atoms is introduced too much, the performance of dispersing the cement particles might be insufficient because the hydrophobicity of the thiol-modified monomer becomes too higher.

In view of these, the proportion of the oxyalkylene group containing 3 or more carbon atoms in the above-mentioned oxyalkylene chain is preferably 30% by weight or less relative to 100% by weight of the oxyalkylene chain. The proportion thereof is more preferably 25% by weight or less, and still more preferably 20% by weight or less, and particularly preferably 5% by weight or less.

Depending on the application of the thiol-modified monomer of the present invention, an embodiment in which no oxyethylene group containing 3 or more carbon atoms is included might be preferable.

If the average number of moles of oxyalkylene residue added in AG in the above-mentioned formulae (3) and (4) is defined as 1, 1 is preferably 10 or more in order for the thiol-modified monomer to exhibit performances attributed to AG. l is more preferably 20 or more, and still more preferably 45 or more, and still more preferably 70 or more, and still more preferably 80 or more, and still more preferably 90 or more, and still more preferably 100 or more, and furthermore preferably 110 or more, and particularly preferably 120 or more, and most preferably 140 or more. The upper limit of l is not especially limited, but it is preferably 500 or less in view of production. l is preferably 400 or less, and more preferably 350 or less, and still more preferably 300 or less, and still more preferably 280 or less, and still more preferably 250 or less, and particularly preferably 220 or less, and most preferably 200 or less.

The above-mentioned polyalkylene oxide residue includes 50% by mole of oxyethylene groups relative to 100% by mole of the alkylene oxide unit in the residue. The oxyethylene groups more preferably account for 70% by mole or more, and still more preferably 90% by mole or more, and particularly preferably 100% by mole. Due to this configuration, the above-mentioned thiol-modified monomer mixture has a higher hydrophilicity.

The above-mentioned polyalkylene oxide residue may be a single polyalkylene oxide residue, or two or more polyalkylene residues may be bonded to each other. A compound including two or more polyalkylene oxide residues can be easily obtained by adding an alkylene oxide to a compound including one or more primary amine groups, secondary amine groups, or hydroxyl groups.

In addition, such a polyalkylene oxide residue may be obtained by reacting a starting material polyalkylene oxide compound of two or more molecules with a di- or higher functional compound. The reaction method is not especially limited and it can be appropriately selected depending on a functional group of the starting material polyalkylene oxide compound. For example, the following methods may be mentioned. Two or more of the following reaction methods may be combined.

A method of esterifying a starting material polyalkylene oxide compound containing a carboxyl group with an alcohol compound; a method of amidating a starting material polyalkylene oxide compound containing a carboxyl group with an amine compound; a method of esterifying a starting material polyalkylene oxide compound containing a hydroxyl group with a carboxylic acid compound or an anhydride thereof; a method of urethanating a starting material polyalkylene oxide compound containing a hydroxyl group with an isocyanate compound; a method of amidating a starting material polyalkylene oxide compound containing an amino group with a carboxylic acid compound; a method of additionally reacting a starting material polyalkylene oxide compound containing an amino group with a (meth)acrylate compound; and a method of additionally reacting a starting material polyalkylene oxide compound containing a hydroxyl group or an amino group with an epoxy compound.

AG in the above-mentioned formulae (3) and (4) may include a structure other than the above-mentioned polyalkylene oxide residue. For example, structures such as polyalkylene oxide-block-polycaprolactone, polyalkylene oxide-block-polylactide, polyalkylene oxide-graft-poly(meth)acrylic acid, and polyalkylene oxide-graft-poly(meth)acrylate may be mentioned.

Further, AG essentially includes an organic residue bonded to a carbonyl residue in the above formulae (3) and (4).

In the compound represented by the above formulae (3) or (4), as an embodiment in which AG is bonded to the carbonyl residue with a thiol residue and a carbonyl group therebetween, an ester bond, an amide bond, or a ketone bond may be mentioned. AG includes a hydroxyl group residue, an amino group residue, or a hydrocarbon residue corresponding to the ester bond, the amide bond, and the ketone bond, respectively. Among these, in view of easiness of the thiol-modified monomer production, AG preferably includes a hydroxyl group residue or an amino group residue and more preferably includes a hydroxyl group residue.

It is preferable that the thiol-modified monomer represented by the formula (3) is a dithiol modified product having a structure represented by the following formula (3'), and the thiol-modified monomer represented by the formula (4) is a monothiol modified product having a structure represented by the following formula (4'):

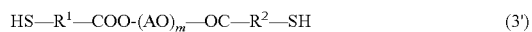

$$HS-R^1-COO-(AO)_m-OC-R^2-SH \quad (3')$$

$$HS-R^1-COO-(AO)_m-R^3 \quad (4')$$

in the formula, $R^1$ and $R^2$ being the same or different and each representing an organic residue;

AO being the same or different and each representing one or more different oxyalkylene groups containing 2 to 18 carbon atoms;

m representing an average number of moles of oxyalkylene group and being integer of 10 to 500; and $R^3$ representing a hydrogen atom or an organic residue.

In the above-mentioned formulae (3) and (4), m represents the average number of moles of oxyalkylene group, represented by AO. It is preferable that m is 10 or more in order for the thiol-modified monomer to exhibit the performances attributed to AG. m is more preferably 20 or more, and still more preferably 45 or more, and still more preferably 70 or more, and still more preferably 80 or more, and still more preferably 90 or more, and still more preferably 100 or more, and still more preferably 110 or more, and particularly preferably 120 or more, and most preferably 140 or more. The upper limit of m is not especially limited. If m is a too large value, problems in terms of workability are generated, for example, the viscosity of starting compounds used for producing the thiol-modified monomer mixture is increased or the reactivity is insufficient. Therefore, it is appropriate that m is 500 or less. m is preferably 400 or less, and more preferably 350 or less, and still more preferably 300 or less, and still more preferably 280 or less, and furthermore preferably 250 or less, and particularly preferably 220 or less, and most preferably 200 or less.

The above-mentioned AO is as mentioned above in the <(D) thiol-modified monomer>.

As in the compound represented by the above formula (1) or (2), the ester bond might be separated by hydrolysis also in the compound represented by the above formula (3) or (4). In order to improve the resistance to hydrolysis, it is preferable that an oxyalkylene group containing 3 or more carbon atoms is introduced into the end of $-(AO)_m-$, and that the end of $-(AO)_m-$ is a secondary alcohol residue. Specific compounds, a method of introducing such a group, and the like are as mentioned above in the <(D) thiol-modified monomer>.

If the thiol-modified monomer mixture of the present invention includes the dithiol-modified product represented by the above formula (3) as a main component, the preferable content of the dithiol modified product is not especially limited because it depends on the application of the thiol-modified monomer mixture. For example, it is preferable that dithiol-modified product accounts for 50% by weight or more relative to 100% by weight of the thiol-modified monomer mixture. The dithiol-modified product more preferably accounts for 60% by weight or more, and still more preferably 70% by weight or more, and still more preferably 80% by weight or more, and particularly preferably 90% by weight or more, and most preferably 95% by weight or more.

If the thiol-modified monomer mixture of the present invention includes the monothiol-modified product represented by the above formula (4) as a main component, the preferable content of the monothiol modified product is preferably 50% by weight or more relative to 100% by weight of the thiol-modified monomer mixture, although it is not especially limited because it depends on the application of the thiol-modified monomer mixture. The content thereof is more preferably 60% by weight or more, and still more preferably 70% by weight or more, and furthermore preferably 80% by weight or more, and particularly preferably 90% by weight or more, and most preferably 95% by weight or more.

The above-mentioned thiol-modified monomer mixture also includes a polymeric product constituted by the thiol-modified monomer represented by the above formula (3) and/or (4).

Examples of the above-mentioned polymeric product include a r-mer of a diester compound represented by the following formula (3"):

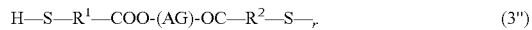

$$H-S-R^1-COO-(AG)-OC-R^2-S-_r \quad (3'')$$

in the formula, $R^1$, $R^2$, and AG are the same as in the above formula (3), and r is an integer of 2 or more; and a dimer of a monoester compound represented by the following formula (4"):

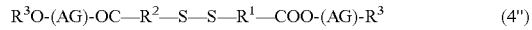

$$R^3O-(AG)-OC-R^2-S-S-R^1-COO-(AG)-R^3 \quad (4'')$$

in the formula, $R^1$, $R^2$, $R^3$, and AG are the same as in the above formula (4).

It is preferable that the thiol-modified monomer mixture of the present invention includes a larger amount of thiol-modified monomers which can exhibit a performance of dispersing cement particles in order to effectively suppress aggregation of the cement particles if a polymer obtained using the thiol-modified monomer mixture of the present invention is used as an admixture component of cement. However, the thiol group is easy to form a polymeric product by being oxidized. Therefore, if the thiol-modified monomer represented by the above formula (3) or (4) is produced, the polymeric compound of the thiol-modified monomer is inevitably included. That is, as the thiol-modified monomer mixture of the present invention, a thiol-modified monomer mixture which contains 30% by weight or more and less than 100% by weight of the polymeric product relative to 100% by weight of the thiol-modified monomer mixture is often produced. Thus, the preferable embodiments of the present invention also includes an embodiment in which the above-mentioned thiol-modified monomer mixture includes 30% by weight or more and less than 100% by weight of the polymeric product relative to 100% by weight of the thiol-modified monomer mixture is also included.

Further, the present inventors made various investigations, and successfully obtained the following inexpensive thiol-modified monomer mixtures having practical performances: a thiol-modified monomer mixture including 1% by weight or more and less than 6% by weight of a polymeric product relative to 100% by weight of the thiol-modified monomer mixture; and a thiol-modified monomer mixture including 6% by weight or more and less than 30% by weight of a polymeric relative to 100% by weight of the thiol-modified monomer mixture, by a simple method below mentioned, although a thiol-modified monomer mixture constituted by only thiol-modified monomers has not been obtained yet.

These thiol-modified monomer mixtures each have a large content of the thiol-modified monomer. Therefore, such a monomer mixture serves as a composition useful for producing an admixture component for cement, having excellent dispersibility.

Which thiol-modified monomer mixture is prepared to produce an admixture component for cement among these thiol-modified monomer mixtures may be appropriately determined depending on an available equipment or costs.

It is preferable that the above-mentioned thiol-modified monomer contained in the thiol-modified monomer mixture is obtained by esterifying a compound including a carboxyl group or a hydroxyl group and a mercapto group in one molecule with a compound including an alkylene glycol group-containing organic residue. According to this, a high-molecular weight thiol-modified monomer can be simply or efficiently produced at low costs in comparison to a conventional thiol synthesis method, for example, the above-mentioned conventional synthesis method mentioned in the <(D) thiol-modified monomer>.

It is more preferable that the thiol-modified monomer mixture is obtained by esterifying a compound including a carboxyl group and a mercapto group in one molecule with a polyoxyalkylene glycol.

According to such a production method of the thiol-modified monomer, a mixture of the above-mentioned thiol-modified monomer with a polymeric product can be produced. Therefore, such a production method of the thiol-modified monomer means also a production method of the monomer mixture of the present invention, including the above-mentioned thiol-modified monomer and the polymeric product.

In the above-mentioned esterification reaction step, the starting material compounds, the mixing ratio thereof, the reaction conditions and the like are the same as those mentioned in the <(D) thiol-modified monomer, respectively>.

After the above-mentioned esterification step, a step of adjusting the pH of the reaction solution may be performed, as mentioned above.

The coarse reaction product (including the thiol-modified monomer mixture of the present invention) obtained by the above-mentioned esterification reaction is preferably solidified by cooling the reaction solution after the esterification reaction (that is, the reaction solution whose pH is not adjusted yet) or the reaction solution whose pH is adjusted to a room temperature. As a result, the coarse reaction product (including the thiol-modified monomer mixture) can be easily produced from the reaction solution.

The obtained solidified coarse reaction product is dried as it is and then may be used as the thiol-modified monomer mixture. However, if the obtained coarse reaction product includes impurities such as a residual thiol group-containing compound and the thiol-modified monomer mixture of the present invention needs to be purified by removing these impurities, for example, the solidified coarse reaction product may be dried and pulverized and then washed with a solvent which dissolves the impurities such as the thiol group-containing compound but not dissolve the thiol-modified monomer, such as diethyl ether.

However, it is preferable that the above-mentioned washing using the above-mentioned solvent is not performed in view of an increase in production costs due to an increase in working steps, and environmental loads due to the use of the solvent. Accordingly, as mentioned above, with respect to the mixing ratio of the alkylene glycol group-containing compound with the thiol group-containing compound, which are starting material compounds, the molar ratio of the hydroxyl group or the carboxyl group derived from the thiol group-containing compound is twice or less relative to the amount of the functional group such as the hydroxyl group and the carboxyl group which is subjected to the reaction, derived from the alkylene glycol group-containing compound. The molar ratio is preferably 1.8 times or less, and more preferably 1.6 times or less, and still more preferably 1.4 times or less, and still more preferably 1.3 times or less in view of the amount of the residual compounds.

The present inventors found that the polymeric product of the thiol-modified monomer might be generated and the content of the polymeric product in the thiol-modified monomer mixture might be more than 30% by weight when the solidified coarse reaction product is dried to form a dry solidified product (thiol-modified monomer mixture) or this dry solidified product is further washed with diethyl ether and the like, thereby obtaining a thiol-modified monomer mixture from the coarse reaction product. Then, after various investigations, the inventors found that generation of the polymeric product of the thiol-modified monomer is attributed to drying of the solidified coarse reaction product. It is preferable that the solidified coarse reaction product is handled while being prevented from being dried. As a result, the following was found. It is preferable that generation of the polymeric product of the thiol-modified monomer can be generated and the content of the polymeric product in the thiol-modified monomer mixture can be within 1 to 30% by weight relative to 100% by weight of the thiol-modified monomer mixture. The amount of the polymeric product is preferably smaller if the thiol-modified monomer mixture or a solution thereof needs to have a low viscosity.

On the other hand, the coarse reaction product is dried for a certain time, thereby significantly increasing the amount of the polymeric product. The polymeric product seems to have a polydisulfide structure including a thiol-modified monomer residue as a repeating unit, in which two or more thiol-modified monomers are bonded to each other by disulfidation of a thiol group. The disulfide bond can generate radicals by various methods, as in the thiol group. Therefore, this polymeric product can be used as a chain transfer agent. Further, the generation of the radicals reduces a molecular weight of the polymeric product, and finally the polymeric product is decomposed to have a structure of the thiol-modified monomer residue. If the polymeric product is used as a chain transfer agent for various radical polymerizations, the polymeric product before the reaction has a high-molecular weight and therefore has a high viscosity, and the monomer residue after the reaction has a reduced molecular weight and therefore has a low viscosity. Accordingly, the polymerization reaction can be allowed to proceed while the viscosity of the system during the reaction is adjusted, and therefore such a monomer mixture can be used in applications different from those of the thiol-modified monomer.

In addition, the polymeric product can be formed from the thiol-modified monomer or the mixture thereof by various methods. For example, a method of turning the thiol group of the thiol-modified monomer into a radical by heat, light, radiation, or a radical generator, and then disulfidating the radical by a sulfur radical, treating it with an oxidant, or disulfidating it using a sulfur radical by being treated with an alkali, is mentioned.

It is preferable that the above-mentioned production method of the thiol-modified monomer mixture includes a step of adding an antioxidant if the amount of the polymeric product needs to be suppressed in view of viscosity and the like.

The addition of this antioxidant, the specific examples, and preferable compounds as the antioxidant are the same as mentioned in the <(D) thiol-modified monomer>, respectively.

The dosage of the above-mentioned antioxidant is not especially limited as long as generation of the polymeric product of the thiol-modified monomer can be effectively prevented. If the dosage thereof is too small, the effects are not exhibited. If it is too large, the performances of the thiol-modified monomer might be insufficient or the monomer mixture might be colored. Accordingly, the antioxidant is preferably 10 ppm by weight or more relative to the weight (solid contents) of the thiol modified-monomer mixture. It is more preferably 20 ppm by weight or more, and still more preferably 50 ppm by weight or more, and particularly preferably 100 ppm by weight or more. Further, it is preferably 5000 ppm by weight or less, and more preferably 2000 ppm by weight or less, and still more preferably 1000 ppm by weight or less, and particularly preferably 500 ppm by weight or less.

Thus, the preferable embodiments of the present invention include an embodiment in which the thiol-modified monomer mixture includes 10 to 5000 ppm by weight of an antioxidant.

With respect to a method of producing the solidified coarse reaction product from the reaction solution after the esterification reaction, it was found that also by a method of distilling the solvent by heating the reaction solution, the addition of the antioxidant enables the content of the polymeric product in the thiol-modified monomer mixture to be within 6 to 30% by weight relative to 100% by weight of the thiol-modified monomer mixture.

As mentioned above, the solidified product of the thiol-modified monomer mixture tends to easy form a polymeric product if dried. Accordingly, it is preferable that the thiol-modified monomer mixture of the present invention is preserved in a solution form in order to suppress the generation of the polymeric product. The thiol-modified monomer mixture is preferably preserved in form of an aqueous solution with a pH of 4 or more. The pH is more preferably 5 or more, and still more preferably 6 or more. Further, it is preferably preserved in form of an aqueous solution of pH 7 or less.

The above-mentioned production method of the thiol-modified monomer mixture also may include a step or removing the polymeric product. Dialysis, ultra filtration, a molecular weight fractionation such as GPC, and the like may be mentioned as a method of removing the polymeric product.

The thiol-modified monomer mixture including the polymeric product may be used as it is, for example, in preparation of the below-mentioned polymer because addition of the step of removing the polymeric product increases the production costs.

The present invention also includes a polyalkylene glycol chain-containing thiol polymer (G) obtainable by polymerizing an unsaturated monomer component including an unsaturated carboxylic acid monomer and/or an unsaturated polyalkylene glycol monomer in the presence of the above-mentioned thiol-modified monomer mixture.

Such a polymer (G) has a structure including a polyalkylene glycol chain (which is referred to as a "polyalkylene glycol chain (1)") derived from above-mentioned thiol-modified monomer and a polymer segment bonded to at least one end of the polyalkylene glycol chain (1) with a sulfur atom-containing group therebetween. The polymer segment includes a constitutional unit derived from an unsaturated monomer component.

The unsaturated monomer component constituting such a polymer (G), the use amount thereof, the relationship between the use amount of the above-mentioned thiol-modified monomer and the use amount of the unsaturated monomer component, the relationship between the amount of the polyalkylene glycol chain (1) and the use amount of the unsaturated monomer component, the polymerization method, the polymerization conditions, and the weight average molecular weight of the polymer are the same as those in the above-mentioned <(D) thiol-modified monomer>.

<Dispersant and Admixture for Cement>

The dispersant or the admixture for cement of the present invention includes the above-mentioned (A) or (G) polyalkylene glycol chain-containing thiol polymer, and/or the above-mentioned (C) polyalkylene glycol chain-containing thiol polymer mixture (hereinafter, also referred to as a "polymer ingredient").

Further, the present invention also includes an admixture for cement including the above-mentioned (C) thiol-modified monomer, and/or the above-mentioned (F) thiol-modified monomer mixture (hereinafter, also referred to as a "monomer ingredient").

Hereinafter, the admixture for cement is mentioned as a typical dispersant.

The mixing amount of the polymer ingredient in the above-mentioned admixture for cement is not especially limited and may be appropriately adjusted depending on desired dispersibility. Specifically, it is preferable that the polymer ingredient accounts for 50% by weight or more relative to 100% by weight of the entire weight of the admixture for cement on the solid content basis. The polymer more preferably accounts for 60% by weight or more, and still more preferably 70% by weight or more, and particularly preferably 80% by weight or more.

A polycarboxylic acid polymer may be mixed with the above-mentioned admixture for cement, if necessary, in addition to the polymer ingredient. In such a case, the mixing amount is determined in such a way that the ratio (% by weight) of the polymer ingredient/the polycarboxylic acid polymer is 90/10 to 10/90. The ratio is more preferably 80/20 to 20/80, and still more preferably 70/30 to 30/70, and particularly preferably 60/40 to 40/60.

If the above-mentioned admixture for cement includes the monomer ingredient, it is preferable that the content of the monomer ingredient is 50% by weight on the solid content basis relative to 100% by weight of the entire admixture for cement. The content is more preferably 60% by weight or more, and still more preferably 70% by weight or more, and particularly preferably 80% by weight or more.

Also in this case, a polycarboxylic acid polymer may be mixed with the admixture for cement. In such a case, the mixing amount is determined in such a way that the ratio (% by weight) of the monomer ingredient/the polycarboxylic acid polymer is 90/10 to 10/90. The ratio is more preferably 80/20 to 20/80, and still more preferably 70/30 to 30/70, and particularly preferably 60/40 to 40/60.

If the above-mentioned admixture for cement includes the above-mentioned polymer ingredient and the monomer ingredient, it is preferable that the total amount of the monomer ingredient and the polymer ingredient is within the above-mentioned range. Also with respect to the mixing amount relative to the polycarboxylic acid polymer, it is preferable that the total amount of the monomer ingredient and the polymer ingredient is within the above-mentioned range.

With the admixture for cement of the present invention, if necessary, a defoaming agent (e.g., (poly)oxyethylene-(poly)oxypropylene adduct, diethylene glycol heptyl ether), or a polyalkylene imine (e.g., ethylene imine or propylene imine)-alkylene oxide adduct, may be mixed.

The above-mentioned admixture for cement may be used in combination with one or more different conventional cement additives. As conventional cement additives, conventional polycarboxylic acid additives and sulfonic acid additives including a sulfonic acid group in the molecule are preferable. The combination use of these conventional cement additives enables the admixture for cement to exhibit stable dispersibility regardless of brand or the lot number of cement.

The above-mentioned sulfonic acid additive is an additive which exhibits dispersibility to cement due to electrostatic repulsion mainly attributed to the sulfonic acid group. Various sulfonic acid additives may be used, but a compound containing an aromatic group in the molecule is preferred. The following sulfonic acid additives may be mentioned. Polyalkyl aryl sulfonic acid salt such as naphthalenesulfonic acid-formaldehyde condensate, methylnaphthalenesulfonic acid-formaldehyde condensate, and anthracenesulfonic acid-formaldehyde condensate; melamineformalin resin sulfonic acid salt such as melaminesulfonic acid-formaldehyde condensate; aromatic aminosulfonic acid salt such as aminoarylsulfonic acid-phenol-formaldehyde condensate; ligninsulfonic acid salts such as ligninsulfonic acid salt and modified ligninsulfonic acid salt; polystyrenesulfonic acid salts. Ligninsulfonic acid salt additives are preferably used in concrete having a high water/cement ratio. Polyalkylarylsulfonic acid salt additives, melamine-formalin resin sulfonic acid salt additives, aromatic amino sulfonic acid salt additives, polystyrene sulfonic acid salt additives, and the like are preferably used in concrete having a moderate water/cement, which needs higher dispersibility. The sulfonic acid additives including a sulfonic acid group in the molecule may be used singly or in combination of two or more species of them.

An oxycarboxylic acid compound may be used together with the admixture for cement of the present invention, with or without using the above-mentioned sulfonic acid additives. If the admixture for cement of the present invention contains an oxycarboxylic acid compound, the admixture can exhibit high dispersibility even in a high temperature environment.

Oxycarboxylic acid containing 4 to 10 carbon atoms or salts thereof are preferable as the above-mentioned oxycarboxylic acid compound, and gluconic acid or a salt thereof is used as the oxycarboxylic acid compound.

The admixture for cement of the present invention may be used in combination with the below-mentioned conventional cement additives (or materials) (1) to (11), according to need.
(1) Water-soluble high-molecular substance
(2) High-molecular emulsion
(3) Setting retarders other than the oxycarboxylic acid compounds
(4) High early strength agents and accelerators
(5) Defoaming agents other than the oxyalkylene defoaming agents
(6) AE agents
(7) Other surfactants
(8) Waterproofing agents
(9) Corrosion inhibitors
(10) Crack-reducing agent
(11) Expansive additive Examples of other conventional cement additives (or materials) include a cement wetting agent, a thickening agent, a segregation-reducing agent, a flocculant, a drying shrinkage-reducing agent, a strength-increasing agent, a self-leveling agent, a corrosion inhibitor, a colorant, an antifungal agent. These conventional cement additives (or materials) may be used singly or in combination of two or more species.

The admixture for cement of the present invention may be used in an aqueous solution form, or in a powder form prepared by the following procedures. After the reaction, the admixture for cement is neutralized with a hydroxide of a divalent metal such as calcium and magnesium to be a polyvalent metal salt, and then dried; or carried on inorganic powders such as silica fine particles and then dried; or dried or solidified to be a thin film on a support using a drum drier, a disk drier, or belt drier, and then pulverized; or dried or solidified using a spray drier, thereby being pulverized. Further, the pulverized admixture for cement of the present invention is previously mixed with a cement composition free from water, such as cement powders and dry mortar, and then used as a premix product used for plasterer, floor finishing, grout, and the like, or added when the cement composition is mixed.

The admixture for cement of the present invention can be used in various hydraulic materials, that is, cement compositions such as cement and plaster, and other hydraulic materials. Specific examples of a hydraulic composition which contains such a hydraulic material, water, and the admixture for cement of the present invention, and if necessary, a fine aggregate (e.g., sand) or a coarse aggregate (e.g., gravel) include cement past, mortar, concrete, and plaster.

Among these hydraulic compositions, the cement composition including cement as a hydraulic material is most common. Such a cement composition includes the admixture for cement of the present invention, cement, and water. The present invention also includes such a cement composition.

That is, the present invention also includes a cement composition including: cement; the above-mentioned thiol-modified monomer or the above-mentioned thiol-modified monomer mixture; and/or the above-mentioned polyalkylene glycol chain-containing thiol polymer or the above-mentioned polyalkylene glycol chain-containing thiol polymer mixture.

In the above-mentioned cement composition, the cement is not especially limited. Examples of the cement include: Portland cements (e.g., ordinary, high early strength, ultra high early strength, moderate heat, sulfate resistance, and low alkaline type thereof); various mixed cements (e.g., blast furnace cement, silica cement, fly ash cement); white Portland cement; alumina cement; ultra rapid hardening cement (e.g., one-clinker ultra rapid hardening cement, two-clinker ultra rapid hardening cement, and magnesium phosphate cement); grouting cements; oil well cements; low heat cements (e.g., low heat blast furnace cement, fly ash-mixed low heat blast furnace cement, belite-highly containing cement); ultra high strength cements; cement solidification materials; and ecocements (e.g., cements manufactured using one or more kinds of municipal refuse incinerated ash and sludge incinerated ash as a raw material). Further, fine powders such as blast furnace slag, fly ash, cinder ash, clinker ash, husk ash, silica fume, silica powder, and limestone powder, or plaster may be added. As the aggregate, in addition to sand, gravel, water granulated slag, recycled aggregate, and the like, refractory aggregates such as silica aggregate, argillaceous aggregate, zircon aggregate, high alumina aggregate, silicon carbide aggregate, graphite aggregate, chromium aggregate, chrome-magnesite aggregate, and magnesia aggregate may be used.

In the above-mentioned cement composition, with respect to a unit quantity of water per cubic meter of the cement composition, a cement use amount, and a water/cement ratio, the unit quantity of water is preferably 100 kg/m$^3$ or more, and 185 kg/m$^3$ or less, and more preferably 120 kg/m$^3$ or more and 175 kg/m$^3$ or less. The use amount of cement is preferably 200 kg/m$^3$ or more and 800 kg/m$^3$ or less, and more preferably 250 kg/m$^3$ or more and 800 kg/m$^3$ or less. The water/cement ratio (weight ratio) is preferably 0.1 or more and 0.7 or less, and more preferably 0.2 or more and 0.65 or less. The admixture for cement of the present invention can be widely used at lean-mix design to rich-mix design. The admixture for cement of the present invention can be used in a high water-reducing ratio range, that is, in a range where the water/cement ratio is small, for example, the water/cement ratio (by weight) of 0.15 or more and 0.5 or less (preferably 0.15 or more and 0.4 or less). Further, the admixture for cement of the present invention can be effectively used in high strength concrete having a large unit quantity of cement and a small water/cement ratio or lean-mix concrete having a unit quantity of cement of 300 kg/m$^3$ or less.

The proportion of the admixture for cement of the present invention in the above-mentioned cement composition is preferably 0.01% by weight or more and 10.0% by weight or less on the solid content basis relative to the weight of cement if the admixture for cement is used in mortar or concrete each including a hydraulic cement. According to this, various preferable effects such as a reduction in unit quantity of water, an increase in strength, and an improvement in durability are exhibited. If the proportion of the admixture for cement is less than 0.01%, the performances might be insufficient. If it is more than 10.0% by weight, the effect of improving the dispersibility is no more improved substantially. In addition, the excessive use of the admixture for cement of the present invention might increase the production costs. The proportion thereof is more preferably 0.02% by weight or more and 5.0% by weight or less, and still more preferably 0.05% by weight or more and 3.0% by weight or less, and particularly preferably 0.1% by weight or more and 2.0% by weight or less.

The above-mentioned cement composition has high dispersibility and dispersion-holding performance also in a high water-reducing ratio range, and further exhibits sufficient initial dispersibility and viscosity-reducing property at low temperatures. Further, the cement composition has an excellent workability. Therefore, such a cement composition can be effective in ready mixed concrete, concrete for concrete secondary products (e.g., precast concrete), concrete for centrifugal molding, concrete for vibration compaction, steam-curing concrete, sprayed concrete, and the like. Further, the cement composition is also effective in medium-fluidity concrete (e.g., concrete having a slump value of 22 to 25 cm), high-fluidity concrete (e.g., concrete having a slump value of 25 cm or more and a slum flow value of 50 to 70 cm), self-filling concrete, and mortar or concrete which needs high fluidity, such as self-leveling material.

The polyalkylene glycol chain-containing thiol polymer of the present invention has the above-mentioned configuration. Therefore, the polymer can exhibit higher dispersibility than that of conventional copolymers used as an admixture for cement, obtained by copolymerizing an unsaturated carboxylic acid monomer with an unsaturated polyalkylene glycol monomer. Therefore, such a polymer of the present invention is preferably used in a dispersant, particularly an admixture for cement. If a cement composition including the admixture for cement of the present invention is prepared, the mixing amount of the admixture can be reduced. Therefore, excellent characteristics of cement are not deteriorated. Thus, the novel polymer of the present invention and the dispersant, particularly the admixture for cement including such a polymer significantly contribute to civil engineering and construction fields where concrete is handled, and the like.

BEST MODES FOR CARRYING OUT THE INVENTION

The present invention is mentioned in more detail below with reference to Examples, but it is not limited to only these Examples. The present invention can be appropriately changed without departing from the above or below-mentioned content. The changed embodiments are also included within the scope of the present invention. The term "%" represents "% by weight" unless otherwise specified. Further, "-" in Tables means that neither measurement nor analysis were performed or that the shown compound was not used.

Tables 1-1 to 1-3 show each abbreviation mentioned in the present description.

TABLE 1-1

| Abbreviation | Specie | Manufacturer | Compound name | Structure | Molecular weight |
|---|---|---|---|---|---|
| APS | Initiator (Persulfate) | Wako | Ammonium persulfate | $(NH_4)_2S_2O_8$ | 228.20 |
| V-50 | Initiator (Azo) | Wako | 2,2'-azobis(2-methylpropionamidine)dihydrochloride | $(NH)=C(NH_2)-C(CH_3)_2-N=N-C(CH_3)_2-C(=NH)NH_2 \cdot 2HCl$ | 271.19 |
| VA-044 | Initiator (Azo) | Wako | 2,2'-azobis[2-(2-imidazolin-2-yl)propane]dihydrochloride | | 323.33 |

TABLE 1-1-continued

| Abbreviation | Specie | Manufacturer | Compound name | Structure | Molecular weight |
|---|---|---|---|---|---|
| $H_2O_2$ | Initiator | Wako | Hydrogen peroxide | | |
| L-AS | Initiator (Reducing agent) | Wako | L-ascorbic acid | | 176.12 |
| MPA or 3-MPA | Thiol group-containing compound | Wako | 3-mercaptopropionic acid | HS—$CH_2$—$CH_2$—COOH | 106.14 |
| 2-MPA | Thiol group-containing compound | TOKYO CHEMICAL | 2-mercaptopropionic acid | $CH_3$—CH(SH)—COOH | 106.14 |
| MiBA | Thiol group-containing compound | TOKYO CHEMICAL | 3-mercaptoisobutyric acid | HS—$CH_2$—CH($CH_3$)—COOH | 120.17 |
| TGA | Thiol group-containing compound | Wako | Mercaptoacetic acid thioglycolic acid | HS—$CH_2$—COOH | 92.12 |
| TSA | Thiol group-containing compound | Wako | Thiosalicylic acid | 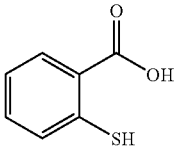 | 154.19 |

TABLE 1-2

| Abbreviation | Specie | Manufacturer | Compound name | Structure | Molecular weight |
|---|---|---|---|---|---|
| PTS(•$1H_2O$) | Acid catalyst | Wako | p-toluenesulfonic acid (monohydrate) | $CH_3$—$C_6H_4$—$SO_3H$(•$1H_2O$) | (190.22) |
| PTZ | Antioxidant Polymerization inhibitor | Wako | Phenothiazine | 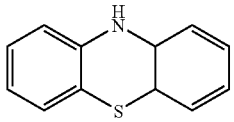 | 199.27 |
| PAO or PAG | Monomer starting material | Synthetic | Polyalkylene oxide Polyalkylene glycol | HO—(R—O)n—H: R is alkyl group | |
| MPEG or PGM | Monomer starting material | Synthetic | Methoxypolyethyleneglycol | HO—($CH_2$—$CH_2$—O)n—$CH_3$ | |
| IPN | Monomer starting material | KURARAY | 3-methyl-3-butene-1-ol | $CH_2$=C($CH_3$)—$CH_2$—$CH_2$—OH | 86.13 |
| MVC | Monomer starting material | Aldrich | 2-methy-2-propene-1-ol | | 72.11 |
| (S)MAA | Monomer | NIPPON SHOKUBAI | Methacrylic acid (sodium) | $CH_2$=C($CH_3$)—COOH or Na salt | 86.088 (108.07) |
| (S)AA | Monomer | NIPPON SHOKUBAI | Acrylic acid (sodium) | $CH_2$=CH—COOH or Na salt | 72.06 (94.042) |
| MMA | Monomer | Wako | Methyl methacrylate | $CH_2$=C($CH_3$)—$COOCH_3$ | 100.16 |

TABLE 1-3

| Abbreviation | Specie | Manufacturer | Compound name | Structure | Molecular weight |
|---|---|---|---|---|---|
| PGM-nE | Monomer | Synthetic | Methoxypolyethylene Glycol methacrylate | $CH_2$=C($CH_3$)—COO—($CH_2$—$CH_2$—O)n—$CH_3$ | |
| IPN-n | Monomer | Synthetic | Isoprenol nEO adduct | $CH_2$=C($CH_3$)—$CH_2$—$CH_2$—O—($CH_2$—$CH_2$—O)n—H | |
| MVC-n | Monomer | Synthetic | Methallyl alcohol nEO adduct | $CH_2$=C($CH_3$)—$CH_2$—O—($CH_2$—$CH_2$—O)n—H | |
| HEVE-n | Monomer | Synthetic | Hydroxyethylvinylether nEO adduct | $CH_2$=CH—O—$CH_2$—$CH_2$—O—($CH_2$—$CH_2$—O)n—H | |

Analysis conditions and calculation conditions of gel permeation chromatography (GPC) and liquid chromatography (LC) of polyalkylene glycols (which is also referred to as "PAG"), thiol-modified monomers or thiol-modified monomer mixtures (which are also referred to as "PAG thiol"), polyalkylene glycol chain-containing thiol polymers, and comparative polymers are mentioned, first. Further, a method of measuring a solid content of the thiol-modified monomers, the polyalkylene glycol chain-containing thiol polymers, and the comparative polymers is also mentioned.

<GPC Analysis Method>

A starting material PAG was analyzed for the number average molecular weight (Mn) under the following conditions. Based on this Mn, the average number of moles of oxyalkylene group (AO) added in the PAG (the number of repeating AO unit) was calculated. However, the Mn of the PAG No. G-1 in Table 2 was calculated from the mass balance. The weight average molecular weight and the number average molecular weight of polymers of the present invention obtained in Examples and comparative polymers obtained in Comparative Examples were measured under the following measurement conditions.
Device: Waters Alliance (2695)
Analysis software: product of Waters Co., Empower professional+GPC option
Column: Product of TOSOH Corp., TSK guard column SWXL+TSK gel G4000SWXL+G3000SWXL+G2000SWXL
Detector: Differential Refractive Index (RI) detector (Waters 2414), Photodiode Detector Array (PDA) (Waters 2996)
Eluent: A solution prepared by dissolving sodium acetate trihydrate 115.6 g in a solvent mixture containing water 10999 g and acetonitrile 6001 g, and the pH of the solution was adjusted to 6 with acetic acid
Standard substance for calibration curve preparation: Polyethylene glycol (peak top molecular weight (Mp) 272500, 219300, 107000, 50000, 24000, 12600, 7100, 4250, 1470)
Calibration curve: Prepared in third-order formulation based on the Mp value and elution time of the above-mentioned polyethylene glycol
Flow rate: 1.0 mL/min
Column temperature: 40° C.
Measuring time: 45 minutes
Injection amount of sample solution: 100 μL (0.4% by weight of the PAG dissolved in the eluent solution, 0.4% by weight of the thiol-modified monomer dissolved in the eluent solution, and 0.5% by weight of the polymer dissolved in the eluent solution)
<GPC calculation Condition 1 (PAG Analysis)>
In the RI chromatogram, the peak was detected and calculated by connecting flat and stable parts to each other in the base line immediately before and after the elution. However, if the objective peak partly overlaps with a polymeric product or impurity peak, the region where the two peaks overlapped with each other was perpendicularly divided into two regions from the deepest point at the overlapping part, thereby measuring the molecular weight of the objective substance. The average number (the number of the repeating unit) of moles of the alkylene oxide (AO) was calculated from the Mn value.
<GPC Analysis Condition 2 (Analysis of Thiol-Modified Monomer and the Thiol-Modified Monomer Mixture)>
In the RI chromatogram, the peak was detected and calculated by connecting flat and stable parts to each other in the base line immediately before and after the elution. If the objective peak partly overlaps with a polymeric product or impurity peak, the region where the two peaks overlapped with each other was perpendicularly divided into two regions based on the deepest overlapping point, thereby measuring the molecular weight of the objective substance.
"Calculations of a Pure Monomer Content and an Amount of a Polymeric Product"
The pure monomer content and the amount of the polymeric compound were calculated as follows based on the ratio of the peak area measured by the RI detector.

Pure monomer content=(area of thiol-modified monomer)/(peak area of polymeric product+area of thiol-modified monomer)

Amount of polymeric product=(peak area of polymeric product)/(peak area of polymeric product+area of thiol-modified monomer)

<GPC Calculation Condition 3 (Polymer Analysis: G-3)>
In the obtained RI chromatogram, the peak of the polymer was detected and calculated by connecting flat and stable parts to each other in the base line immediately before and after the elution of the polymer. However, if the polymer peak partly overlaps with a peak of a low molecular weight product, derived from a monomer, an impurity attributed to a monomer, or a thiol-modified monomer (or thiol-modified monomer mixture), the region where the peaks overlapped with each other was perpendicularly divided into a polymer part and a monomer part based on the deepest overlapping point, thereby measuring a molecular weight and a molecular weight distribution of only the polymer part. If the polymer part and other parts perfectly overlap with each other and can not be divided, the molecular weight and the molecular weight distribution of the polymer part and other parts were calculated together.
"Calculation of Pure Polymer Content"
The pure polymer content was calculated as follows based on the ratio of the peak area measured by RI detector.

Pure polymer content=(area of polymer peak)/(area of polymer peak+area of peaks other than the polymer peak)

<GPC Measurement Condition 4 (Polymer Analysis: G-4)>
In the obtained RI chromatogram, the peak of the polymer was detected and calculated by connecting flat and stable parts to each other in the base line immediately before and after the elution of the polymer. However, if the polymer peak partly overlaps with a peak of a low molecular weight product, derived from a monomer, a dimer, or a thiol-modified monomer (or thiol-modified monomer mixture), the region where the peaks overlapped with each other was perpendicularly divided into a polymer part and a monomer part based on the deepest overlapping point, thereby measuring a molecular weight and a molecular weight distribution of only the polymer part. If the polymer part and other parts perfectly overlap with each other and can not be divided, the molecular weight and the molecular weight distribution of the polymer part and other parts were calculated together.
"Calculation of Pure Polymer Content"
The pure polymer content was calculated as follows based on the ratio of the peak area measured by RI detector.

Pure polymer content=(area of polymer peak)/(area of polymer peak+area of peaks other than the polymer peak)

<LC Analysis Method>
One example of an analysis method using LC is mentioned. Depending on the structure of the PAG thiol, the analysis might not be performed under this condition. In such a case, the condition such as an LC column and an eluent is appropriately changed to perform the analysis.
Device: Waters Alliance (2695)
Analysis software: Product of Waters Corporation, Empower professional+GPC option
Column: GL Science Inertsil ODS-2 Guard column+Column (internal diameter of 4.6 mm×250 mm×3)
Detector: Differential Refractive Index (RI) detector (Waters 2414), Photodiode Detector Array (PDA) Detector (Waters 2996)
Eluent: A solution prepared by adding a 30% NaOH aqueous solution to a solution mixture of acetonitril/100 mM acetate in deionized water=40/60 (% by weight), thereby adjusting the pH to 4.0
Flow rate: 0.6 mL/min
Column temperature: 40° C.
Measuring time: 90 minutes
Injection amount of sample solution: 100 μL (1% by weight of the sample dissolved in the eluent solution)
<LC Calculation Condition: Analysis of PAG Thiol>
"Calculation of the Total Esterification Rate"
The total esterification rate was calculated as follows based on the ratio of the peak area measured by the RI detector.

The total esterification rate=(area of monoester peak+
area of diester peak)/(area of starting material
PAG+area of monoester peak+area of diester
peak)

"Calculation of Diester/Total Ester Ratio"

The diester/total ester ratio was calculated as follows based on the ratio of the peak area measured by the RI detector.

Diester/total ester ratio=(area of diester peak)/(area of
monoester peak+area of diester peak)

Herein, the monoester means a monothiol-modified monomer and the diester means a dithiol-modified product.

<Measuring Method of Solid Content>

A sample about 0.5 g was weighed on an aluminum plate and diluted with water about 1 g to be uniformly spread. Under nitrogen atmosphere, the diluted sample was dried at 130° C. for 1 hour and cooled in a desiccator. After drying, the sample was measured for weight. Based on the difference between the weight before drying and that after drying, the concentration of the solid content (the non-volatile content) was calculated.

The concentration of the aqueous solution of the thiol-modified monomer, the thiol-modified monomer mixture, or the polymer was measured in the above-mentioned procedures unless otherwise specified.

"PAG"

Table 2 shows starting material PAGs (PAGs Nos. G-1 to G-14).

charged into a pressure-resistant reactor equipped with a stirrer. Using an oil bath, the reaction system was heated to 100° C., and while nitrogen was slowly bubbled into the system, the pressure was decreased for 2 hours at 100 Torr by a vacuum pump, thereby removing moisture. The inside of the reactor was heated to 150° C., and nitrogen was introduced thereinto, thereby adjusting the inner pressure to 0.2 MPa. While the inner temperature of the reactor was maintained at 150±2° C., ethylene oxide at a specific amount was added. However, the ethylene oxide partial pressure was controlled to 50% or less in order to maintain the inner pressure of the reactor at 0.8 MPa or less. After completion of addition of the ethylene oxide, the inside of the reactor was maintained at 150° C. for 1 hour, thereby completing the reaction.

(2) Synthesis Method of Polyalkylene Glycol (Addition of Propylene Oxide or Butylene Oxide)

Polyalkylene glycols were produced in the same manner as in (1), except that the reaction temperature was 125° C.

Examples P1 to P29

Thiol-Modified Monomer and Thiol-Modified Monomer Mixture

As shown in Tables 4-1 to 4-2, a specific PAG, thiol group-containing compound (which is also referred to as a compound including a carboxyl group or a hydroxyl group and a

TABLE 2

| PAG No. | Kind | (EO)/(AO)wt | Manufacturer | Model Number | Mw | Mn | Mw/Mn | Purity | (AO)n | Measuring method |
|---|---|---|---|---|---|---|---|---|---|---|
| G-1 | Methoxy PEG | 100% | Synthetic | MPEG100 | — | 4437 | — | — | 100.0 | Weight |
| G-2 | PEG | 100% | Aldrich | 373001 | 4354 | 4180 | 1.04 | 98.34% | 95.0 | GPC |
| G-3 | PEG | 100% | Aldrich | 373001 | 4770 | 4656 | 1.02 | 98.36% | 105.8 | GPC |
| G-4 | Methoxy PEG | 100% | Aldrich | 20251-7 | 5158 | 5049 | 1.02 | 90.71% | 114.8 | GPC |
| G-5 | PEG | 100% | Wako | PEG6000 | 8120 | 8000 | 1.02 | 98.68% | 181.8 | GPC |
| G-6 | PEG | 100% | Wako | PEG6000 | 8362 | 8208 | 1.02 | 98.50% | 186.5 | GPC |
| G-7 | PEG | 100% | Synthetic | 10000 | 10893 | 10591 | 1.03 | 99.23% | 240.7 | GPC |
| G-8 | PEG | 100% | Synthetic | 13000 | 12584 | 12155 | 1.04 | 98.99% | 276.3 | GPC |
| G-9 | PEG | 100% | Synthetic | 13000 | 12923 | 12602 | 1.03 | 98.88% | 286.4 | GPC |
| G-10 | PEG | 100% | Aldrich | 81260 | 5567 | 5449 | 1.02 | 99.83% | 123.8 | GPC |
| G-11 | PEG | 100% | Wako | PEG2000 | 1934 | 1891 | 1.02 | 99.61% | 43.0 | GPC |
| G-12 | PEG | 100% | Synthetic | 400 | 4143 | 4072 | 1.02 | 98.64% | 92.5 | GPC |
| G-13 | PEG in G-12 + 4PO | 94.6% | Synthetic | — | — | 4304 | — | — | 96.5 | Weight |
| G-14 | PEG in G-12 + 4BO | 93.4% | Synthetic | — | — | 4360 | — | — | 96.5 | Weight |

In Table 2, "PEG" means polyethylene glycol, and "(EO)/(AO) wt" means Proportion by weight of ethylene oxide in 100% by weight of the entire alkylene oxide constituting PAG.

In Table 2, PAGs Nos. G-1, G-7 to G-9, and G-12 to G-14 were produced by the method mentioned in Japanese Kokai Publication No. 2002-173593.

That is, the following synthesis method was employed. If a starting material alcohol had a low boiling point and therefore vacuum dehydration could not be performed, part of the alcohol was separately adjusted to sodium alkoxide and then the reaction was performed. Further, if the number of AO (alkylene oxide) added was large and therefore the reaction could not be completed in one stage, polyalkylene glycol was produced by repeating the same procedures until the number of AO added was reduced to a specific value.

(1) Synthesis Method of Polyalkylene Glycol (Addition of Ethylene Oxide)

A starting material alcohol and sodium hydroxide at 500 ppm relative to a finish weight (30% aqueous solution) were mercapto group in one molecule), acid catalyst, and antioxidant, each at a specific amount, were charged as starting materials.

Then, the charged materials were reacted at a specific temperature for a specific time, thereby preparing a thiol-modified monomer (thiol-modified monomer mixture). In Table 4-2, "—" means that the shown material was not added or that the shown organic residue did not exist.

The production methods 1 to 3 in Table 4-1 are mentioned below.

"Production Method 1"

(1) Esterification Step

The starting materials were charged into a glass reactor equipped with a water quantitative receiver including a Dimroth condenser, a Teflon (registered trademark) stirrer including a stirring blade and a stirring seal, and a temperature sensor including a glass protection tube. The water quantitative receiver was filled with cyclohexane (as a solvent), and then the reaction system was heated to reflux under stirring.

The reaction system was heated to 110±5° C. for a specific time while cyclohexane was added thereto, thereby performing a dehydration esterification reaction.

The reaction time was determined in accordance with the time taken to reach the theoretical dehydration amount and the LC and GPC analysis results.

(2) Desolvation Step

After the esterification step, the reaction solution was left to cool to 60° C. or less while stirred in order to prevent the solution from being solidified. Then, a mixture of a 30% NaOH aqueous solution and water at a specific amount was immediately charged into the reactor. This reaction solution was heated to about 70° C., and after the reflux calmed down, the reaction solution was gradually heated to about 100° C., thereby distilling the cyclohexane. After the solvent was distilled, the heating was stopped. Then, while the reaction solution was left to cool, nitrogen was bubbled at 30 mL/min for 90 minutes, thereby removing residual cyclohexane from the reaction solution. As a result, an aqueous solution of a thiol-modified monomer (or a thiol-modified monomer mixture) of the present invention was obtained.

(3) $^1$H-NMR Analysis

Part of the PAG thiol (the thiol-modified monomer or the thiol-modified monomer mixture) after the esterification step was sampled, and after the contained solvent was substituted with deuteriochloroform, the sample was measured for $^1$H-NMR spectrum.

(i) Measurement Conditions
Device: Varian 400 MHz-NMR Unity plus
Solvent: $CDCl_3$ (containing 0.05% by volume of TMS)
Temperature: 30° C.
Integration: 32 times (ii) Results The following Table 3 shows the results.

TABLE 3

|  | Sample | ppm | Peak | Proton |
|---|---|---|---|---|
| reactant | 3-MPA | 2.5 | t | —$CH_2$—C—S— |
| reactant | 3-MPA | 2.8 | t | —C—$CH_2$—S— |
| reactant | PEG | 3.5 | m | —($CH_2$—$CH_2$—O)— |
| product | T-5 | 2.5 | t | —$CH_2$—C—S— |
| product | T-5 | 2.9 | t | —C—$CH_2$—S— |
| product | T-5 | 3.5 | m | —($CH_2$—$CH_2$—O)— |
| product | T-5 | 4.2 | t | —COO—$CH_2$—C—O— |

As shown in Table 3, the peak position derived from the starting material was partly shifted and the peak derived from the ester bond was generated, which shows that PEG that is an object and an esterified product of 3-MPA were generated.

"Production Method 2"

(1) Esterification Step

The starting materials were charged into a glass reactor equipped with a water quantitative receiver including a Dimroth condenser, a Teflon (registered trademark) stirrer including a stirring blade and a stirring seal, and a temperature sensor including a glass protection tube. The water quantitative receiver was filled with cyclohexane (as a solvent), and then the reaction system was heated to reflux under stirring. The reaction system was heated to 110±5° C. for a specific time while cyclohexane was added thereto.

The reaction time was determined in accordance with the time taken to reach the theoretical dehydration amount and the LC and GPC analysis results.

(2) Desolvation Step

After the esterification step, the reaction solution was left to cool to 60° C. or less while stirred in order to prevent it from being solidified. Then, a 30% NaOH aqueous solution at a specific amount was immediately charged into the reactor. This reaction solution was left to cool to a room temperature, and then the coarse reaction composition was solidified and filtered to produce a solidified product. To this solidified product, diethylether which accounts for about 1.5 times in terms of ratio by volume relative to the solidified product was added. Then, the mixture was stirred for 30 minutes and then subjected to suction filtration. As a result, powders were obtained. These procedures were performed, while being careful that the solidified product was not completely dried. Further, the obtained powders were washed twice or more in the same procedures. The powders after washed were dissolved in water at almost the same weight as in the powders, and thereby a 50% aqueous solution of the powders was prepared. Successively, residual diethylether was distilled at a room temperature and 100 Torr. As a result, an aqueous solution of a thiol-modified monomer (or a thiol-modified monomer mixture) of the present invention was obtained.

"Production Method 3"

(1) Esterification Step

The starting materials were charged into a glass reactor equipped with a water quantitative receiver including a Dimroth condenser, a Teflon (registered trademark) stirrer including a stirring blade and a stirring seal, and a temperature sensor including a glass protection tube. The water quantitative receiver was filled with cyclohexane (as a solvent), and then the reaction system was heated to reflux under stirring. The reaction system was heated to 110±5° C. for a specific time while cyclohexane was added thereto.

The reaction time was determined in accordance with the time taken to reach the theoretical dehydration amount and the LC and GPC analysis results.

(2) Desolvation step

After the esterification step, the reaction solution was left to cool to 60° C. or less while stirred in order to prevent it from being solidified. Then, a 30% NaOH aqueous solution at a specific amount was immediately charged into the reactor. This reaction solution was left to cool to a room temperature. Then, the coarse reaction product was solidified and filtered to produce a solidified product. In this case, the solidified product was dried as much as possible. This solidified product was pulverized, and thereto, diethylether which accounts for about 1.5 times in terms of ratio by volume relative to the solidified product was added. Then, the mixture was stirred for 30 minutes and then subjected to suction filtration. As a result, powders were obtained. Further, the obtained powders were washed twice or more in the same procedures. The obtained powders were dried at a room temperature and 100 Torr for 24 hours or more. As a result, a thiol-modified monomer (or a thiol-modified monomer mixture) of the present invention was obtained.

In Examples P1 to P29, the coarse reaction products after the esterification were each calculated for the total esterification rate, the diester/total ester, and the pure thiol-modified monomer content. In addition, the thiol-modified monomers (or thiol-modified monomer mixtures) after the desolvation step were calculated for the total esterification rate, the diester/total ester, the pure thiol-modified monomer content, and the amount of the polymeric product. Table 4-3 shows the results.

TABLE 4-1

| Example | Production method | Starting material PAG | Kind of PAG | PAG (n) | Kind of thiol group-containing compound | 3-MPA mol ratio relative to OH group | PTS·1H₂O wt % relative to (PAG + 3-MPA) | PTZ ppm relative to (PAG + 3-MPA) |
|---|---|---|---|---|---|---|---|---|
| P1 | 2 | G-1 | Methoxy PEG | 100.0 | 3-MPA | 500% | 2.0% | 0 |
| P2 | 2 | G-1 | Methoxy PEG | 100.0 | 3-MPA | 500% | 2.0% | 0 |
| P3 | 2 | G-2 | PEG | 95.0 | 3-MPA | 500% | 2.0% | 0 |
| P4 | 3 | G-4 | Methoxy PEG | 114.7 | 3-MPA | 500% | 2.0% | 0 |
| P5 | 2 | G-2 | PEG | 95.0 | 3-MPA | 500% | 2.0% | 0 |
| P6 | 2 | G-3 | PEG | 105.8 | 3-MPA | 500% | 2.0% | 0 |
| P7 | 3 | G-3 | PEG | 105.8 | 3-MPA | 500% | 2.0% | 0 |
| P8 | 1 | G-3 | PEG | 105.8 | 3-MPA | 100% | 2.0% | 0 |
| P9 | 1 | G-3 | PEG | 105.8 | 3-MPA | 110% | 2.0% | 200 |
| P10 | 1 | G-3 | PEG | 105.8 | 3-MPA | 100% | 5.0% | 200 |
| P11 | 1 | G-3 | PEG | 105.8 | 3-MPA | 120% | 2.0% | 200 |
| P12 | 3 | G-8 | PEG | 276.3 | 3-MPA | 500% | 2.0% | 200 |
| P13 | 1 | G-3 | PEG | 105.8 | 3-MPA | 110% | 2.0% | 500 |
| P14 | 1 | G-5 | PEG | 181.8 | 3-MPA | 110% | 2.0% | 200 |
| P15 | 1 | G-6 | PEG | 186.6 | 3-MPA | 110% | 2.0% | 200 |
| P16 | 1 | G-3 | PEG | 105.8 | 3-MPA | 110% | 2.0% | 200 |
| P17 | 1 | G-9 | PEG | 286.4 | 3-MPA | 110% | 2.0% | 500 |
| P18 | 1 | G-7 | PEG | 240.7 | 3-MPA | 110% | 2.0% | 500 |
| P19 | 1 | G-3 | PEG | 105.8 | 3-MPA | 100% | 2.0% | 200 |
| P20 | 1 | G-3 | PEG | 105.8 | 3-MPA | 90% | 2.0% | 200 |
| P21 | 1 | G-10 | PEG | 123.8 | 3-MPA | 110% | 2.0% | 200 |
| P22 | 1 | G-9 | PEG | 286.4 | 3-MPA | 110% | 1.0% | 500 |
| P23 | 1 | G-9 | PEG | 286.4 | 3-MPA | 110% | 2.0% | 500 |
| P24 | 1 | G-11 | PEG | 42.9 | 3-MPA | 110% | 2.0% | 500 |
| P25 | 1 | G-3 | PEG | 105.8 | TGA | 110% | 2.0% | 500 |
| P26 | 1 | G-3 | PEG | 105.8 | MiBA | 110% | 2.0% | 500 |
| P27 | 1 | G-3 | PEG | 105.8 | TSA | 110% | 2.0% | 500 |
| P28 | 1 | G-13 | PEG + 4PO | 92 +4 | 3-MPA | 110% | 2.0% | 500 |
| P29 | 1 | G-14 | PEG + 4BO | 92 +4 | 3-MPA | 110% | 2.0% | 500 |

| | Experiment conditions | | | | | |
|---|---|---|---|---|---|---|
| | Esterification step | | Neutralization and desolvation step | | | |
| Example | Reaction temperature/ °C. | Reaction time/h | Neutralization/ PTS mol % | Concentration at desolvation | pH | Temperature/ °C. |
| P1 | 110 | 12.5 | 0% | 100% | — | — |
| P2 | 110 | 11.0 | 0% | 100% | — | — |
| P3 | 110 | 13.0 | 0% | 100% | — | — |
| P4 | 110 | 14.0 | 98% | 100% | — | — |
| P5 | 110 | 14.0 | 0% | 100% | — | — |
| P6 | 110 | 14.0 | 100% | 100% | — | — |
| P7 | 110 | 14.0 | 100% | 100% | — | — |
| P8 | 110 | 48.0 | 95% | 70% | — | — |
| P9 | 110 | 48.0 | 95% | 70% | — | — |
| P10 | 110 | 25.0 | 90% | 65% | — | — |
| P11 | 110 | 30.0 | 97% | 60% | — | — |
| P12 | 110 | 14.0 | 95% | 100% | — | — |
| P13 | 110 | 38.0 | 95% | 60% | — | — |
| P14 | 110 | 40.5 | 95% | 50% | — | — |
| P15 | 110 | 38.5 | 95% | 50% | 4.44 | 25.8 |
| P16 | 110 | 38.5 | 95% | 50% | 4.73 | 25.2 |
| P17 | 110 | 36.0 | 95% | 50% | 5.17 | 23.8 |
| P18 | 110 | 36.0 | 95% | 50% | 5.27 | 23.4 |
| P19 | 110 | 35.0 | 95% | 50% | — | — |
| P20 | 110 | 35.0 | 95% | 50% | — | — |
| P21 | 110 | 37.0 | 95% | 50% | 4.88 | — |
| P22 | 110 | 53.0 | 95% | 50% | — | — |
| P23 | 110 | 34.0 | 95% | 50% | — | — |
| P24 | 110 | 44.0 | 95% | 50% | — | — |
| P25 | 110 | 40.0 | 95% | 50% | — | — |
| P26 | 110 | 54.0 | 95% | 50% | — | — |
| P27 | 110 | 300.0 | 95% | 50% | — | — |
| P28 | 110 | 66.0 | 95% | 50% | — | — |
| P29 | 110 | 66.5 | 95% | 50% | — | — |

TABLE 4-2

| Example | Charged amount | | | | | | | Structure of generated product | | | Kind of produced PAG thiol |
|---|---|---|---|---|---|---|---|---|---|---|---|
| | Charged into reactor | | | | | Neutralization | | | | | |
| | Starting material | | | | | 30% NaOH | Water | $R^1$ | $R^2$ | $R^3$ | |
| | PAG | 3-MPA | PTS·1H$_2$O | PTZ | Cyclohexane | | | | | | |
| P1 | 254.80 | 30.20 | 5.70 | — | 9.30 | — | 250.00 | CH$_2$CH$_2$ | — | CH$_3$ | R-44 |
| P2 | 831.33 | 98.54 | 18.60 | — | 30.34 | — | 800.00 | CH$_2$CH$_2$ | — | CH$_3$ | R-56 |
| P3 | 984.91 | 250.09 | 24.70 | — | 40.30 | — | 1000.00 | CH$_2$CH$_2$ | CH$_2$CH$_2$ | — | R-57 |
| P4 | 300.60 | 31.91 | 6.65 | — | 10.85 | 4.57 | — | CH$_3$CH | — | CH$_3$ | R-65 |
| P5 | 984.91 | 250.09 | 24.70 | — | 40.30 | — | 1000.00 | CH$_2$CH$_2$ | CH$_2$CH$_2$ | — | T-1 |
| P6 | 320.00 | 72.95 | 7.86 | — | 19.65 | 5.51 | 320.00 | CH$_2$CH$_2$ | CH$_2$CH$_2$ | — | T-2 |
| P7 | 320.00 | 72.95 | 7.86 | — | 19.65 | 5.51 | — | CH$_2$CH$_2$ | CH$_2$CH$_2$ | — | T-2-2 |
| P8 | 320.00 | 14.59 | 6.69 | — | 16.73 | 4.46 | 131.04 | CH$_2$CH$_2$ | CH$_2$CH$_2$ | — | T-4 |
| P9 | 320.00 | 16.05 | 6.72 | 0.0672 | 16.80 | 4.48 | 131.04 | CH$_2$CH$_2$ | CH$_2$CH$_2$ | — | T-5 |
| P10 | 290.00 | 13.22 | 15.16 | 0.0606 | 15.16 | 9.56 | 137.20 | CH$_2$CH$_2$ | CH$_2$CH$_2$ | — | T-6 |
| P11 | 290.00 | 15.87 | 6.12 | 0.0612 | 15.29 | 4.16 | 190.27 | CH$_2$CH$_2$ | CH$_2$CH$_2$ | — | T-7 |
| P12 | 1000.00 | 87.32 | 21.75 | 0.2175 | 54.37 | 14.48 | — | CH$_2$CH$_2$ | CH$_2$CH$_2$ | — | T-8 |
| P13 | 290.00 | 14.54 | 6.09 | 0.1523 | 15.23 | 4.06 | 190.41 | CH$_2$CH$_2$ | CH$_2$CH$_2$ | — | T-9 |
| P14 | 1000.00 | 29.19 | 20.58 | 0.2058 | 51.46 | 13.71 | 987.43 | CH$_2$CH$_2$ | CH$_2$CH$_2$ | — | T-10 |
| P15 | 1000.00 | 28.45 | 20.57 | 0.2057 | 51.42 | 13.70 | 986.90 | CH$_2$CH$_2$ | CH$_2$CH$_2$ | — | T-11 |
| P16 | 1000.00 | 50.15 | 21.00 | 0.2100 | 52.51 | 13.99 | 1002.55 | CH$_2$CH$_2$ | CH$_2$CH$_2$ | — | T-12 |
| P17 | 1000.00 | 18.53 | 20.37 | 0.5093 | 50.93 | 13.57 | 979.74 | CH$_2$CH$_2$ | CH$_2$CH$_2$ | — | T-15 |
| P18 | 1000.00 | 22.05 | 20.44 | 0.5110 | 51.10 | 13.61 | 982.28 | CH$_2$CH$_2$ | CH$_2$CH$_2$ | — | T-16 |
| P19 | 250.00 | 11.40 | 5.23 | 0.0523 | 13.07 | 3.48 | 250.68 | CH$_2$CH$_2$ | CH$_2$CH$_2$ | — | T-21 |
| P20 | 250.00 | 10.26 | 5.21 | 0.0521 | 13.01 | 3.47 | 250.71 | CH$_2$CH$_2$ | CH$_2$CH$_2$ | — | T-22 |

| Example | Charged amount | | | | | | | Kind of produced PAG thiol |
|---|---|---|---|---|---|---|---|---|
| | Charged into reactor | | | | | Neutralization | | |
| | Starting material | | | | | 30% NaOH | Water | |
| | PAG | 3-MPA | PTS·1H$_2$O | PTZ | Cyclohexane | | | |
| P21 | 1000.00 | 42.85 | 20.86 | 0.2086 | 52.14 | 13.89 | 997.28 | T-30 |
| P22 | 250.00 | 4.66 | 2.55 | 0.1273 | 12.73 | 1.70 | 249.24 | T-32 |
| P23 | 250.00 | 4.66 | 5.09 | 0.1273 | 12.73 | 3.39 | 244.95 | T-33 |
| P24 | 1000.00 | 123.68 | 22.47 | 0.5618 | 56.18 | 14.97 | 1055.57 | T-34 |
| P25 | 250.00 | 10.82 | 5.22 | 0.1304 | 13.04 | 3.47 | 249.19 | T-35 |
| P26 | 250.00 | 14.20 | 5.28 | 0.1321 | 13.21 | 3.52 | 252.09 | T-36 |
| P27 | 250.00 | 18.21 | 5.36 | 0.1341 | 13.41 | 3.57 | 255.61 | T-37 |
| P28 | 250.00 | 13.56 | 5.27 | 0.1318 | 13.18 | 3.51 | 251.38 | T-38 |
| P29 | 250.00 | 13.39 | 5.27 | 0.1317 | 13.17 | 3.51 | 251.25 | T-39 |

TABLE 4-3

| Example | Analysis value after esterification | | | Analysis value after desolvation | | | |
|---|---|---|---|---|---|---|---|
| | LC | | GPC | LC | | GPC | |
| | Total esterification rate | Diester/Total ester | Pure monomer content | Total esterification rate | Diester/Total ester | Pure monomer content | Amount of polymeric product |
| P1 | 100.0% | 13.9% | — | 99.7% | 14.6% | 98.3% | 1.7% |
| P2 | 99.7% | 14.4% | — | 74.6% | 11.0% | 96.6% | 3.4% |
| P3 | 99.9% | 98.1% | — | 99.5% | 76.6% | 91.3% | 8.7% |
| P4 | 98.8% | 14.5% | — | 99.8% | 15.3% | 13.8% | 86.2% |
| P5 | 98.7% | 100.0% | — | 98.0% | 71.1% | 95.9% | 4.1% |
| P6 | 99.4% | 100.0% | — | 97.3% | 99.7% | 98.0% | 2.0% |
| P7 | 99.4% | 100.0% | — | — | — | 4.8% | 92.3% |
| P8 | 99.7% | 82.9% | 89.9% | 99.5% | 81.0% | 83.8% | 16.2% |
| P9 | 99.5% | 93.6% | 92.9% | 99.5% | 93.1% | 91.9% | 8.1% |
| P10 | 98.7% | 77.7% | 92.8% | 98.4% | 73.9% | 85.5% | 14.6% |
| P11 | 98.0% | 96.3% | 93.1% | 98.3% | 94.2% | 93.8% | 6.3% |
| P12 | 98.3% | 99.0% | 98.9% | 95.4% | 100.0% | 37.0% | 63.0% |
| P13 | 99.9% | 90.0% | 93.8% | 98.7% | 91.2% | 92.5% | 7.5% |
| P14 | 99.6% | 91.3% | 89.3% | 98.9% | 89.1% | 89.0% | 11.0% |
| P15 | 100.0% | 91.2% | 89.7% | 99.0% | 89.4% | 88.8% | 11.2% |
| P16 | 100.0% | 91.3% | 93.4% | 99.2% | 90.1% | 93.2% | 6.8% |
| P17 | 99.3% | 81.4% | 85.1% | 98.8% | 79.2% | 83.6% | 16.4% |

TABLE 4-3-continued

|  | Analysis value after esterification | | | Analysis value after desolvation | | | |
| --- | --- | --- | --- | --- | --- | --- | --- |
|  | LC | | GPC | LC | | GPC | |
| Example | Total esterification rate | Diester/ Total ester | Pure monomer content | Total esterification rate | Diester/ Total ester | Pure monomer content | Amount of polymeric product |
| P18 | 99.9% | 91.1% | 87.9% | 99.7% | 89.2% | 86.4% | 13.7% |
| P19 | 99.4% | 85.3% | 93.0% | 99.2% | 79.2% | 85.2% | 14.8% |
| P20 | 98.2% | 74.2% | 93.7% | 97.8% | 69.0% | 87.5% | 12.5% |
| P21 | 100.0% | 94.9% | 94.0% | 100.0% | 91.4% | 93.1% | 6.9% |
| P22 | 96.3% | 83.8% | 89.4% | 95.7% | 77.3% | 83.5% | 16.6% |
| P23 | 95.8% | 84.9% | 89.5% | 95.2% | 84.2% | 88.5% | 11.5% |
| P24 | 99.7% | 97.1% | 98.4% | 99.9% | 96.0% | 96.7% | 3.3% |
| P25 | 100.0% | 84.1% | 95.3% | 100.0% | 86.8% | 94.8% | 5.2% |
| P26 | 95.4% | 85.3% | 92.8% | 96.8% | 84.8% | 92.2% | 7.8% |
| P27 | 88.8% | 58.1% | 88.1% | 79.9% | 50.4% | 87.8% | 12.2% |
| P28 | 98.9% | 86.6% | 89.3% | 97.9% | 85.6% | 84.3% | 15.7% |
| P29 | 93.4% | 87.6% | 89.6% | 92.5% | 86.7% | 82.0% | 18.0% |

The results of Examples P1 to P29 show that the thiol-modified monomer mixtures which contained 1% by weight or more and less than 6% by weight, or 6% by weight or more and less than 30% by weight of the polymeric product relative to 100% by weight of the thiol-modified monomer mixture could be obtained. The results also show that the thiol-modified monomer mixtures which contained more than 0 and 70% by weight or less of the thiol-modified monomer could be obtained.

It is also shown that according to the production method of the present invention, a high-molecular weight thiol-modified monomer could be obtained.

Examples F1 to F97, L1 to L111

Polyalkylene Glycol Chain-Containing Thiol Polymer

Then, Examples of polymers according to the present invention obtained by polymerizing (meth)acrylic acid as an unsaturated carboxylic acid monomer with a polyalkylene ethylene glycol monomer (hereinafter, also referred to as a "PEG monomer") as an unsaturated polyalkylene glycol monomer using the thiol-modified monomers (or thiol-modified monomer mixtures) obtained in Examples P1 to P29, are mentioned below.

Examples F1 to F97

Under the polymerization conditions shown in Tables 5-1 to 5-4 and Tables 6-1 to 6-4, polymers were produced. Analysis results of each polymer are shown in Tables 5-1 to 5-4.

In these Examples, the proportion of each polymer is expressed as a mass ratio on the SMAA basis (in the case where the unsaturated carboxylic acid monomer is perfectly neutralized with NaOH) and the total proportion of the thiol-modified monomer and that of the thiol-modified monomer mixture are not 100% because they are calculated at the outside rate.

TABLE 5-1

| | Polymerization conditions | | | | | | | | | | |
| --- | --- | --- | --- | --- | --- | --- | --- | --- | --- | --- | --- |
| | | PAG thiol | | PEG | | Initiator mol % relative to monomer | Proportion (wt) | | | Temperature/ °C. | Reaction time Monomer dropwise addition/ Initiator dropwise addition/ Maturing time |
| | Production method | Kind | EO mol | monomer Kind | Initiator Kind | | SMAA | PEG monomer | PAG thiol | | |
| Example F1 | F-1 | R-56 | 100.0 | PGM25E | NaPS | 2.00% | 20 | 80 | 25 | 80 | 4/5/1 |
| Example F2 | F-1 | R-56 | 100.0 | PGM25E | NaPS | 1.00% | 20 | 80 | 25 | 80 | 4/5/1 |
| Example F3 | F-1 | R-56 | 100.0 | PGM25E | NaPS | 1.00% | 20 | 80 | 10 | 80 | 4/5/1 |
| Example F4 | F-1 | R-56 | 100.0 | PGM25E | NaPS | 1.00% | 20 | 80 | 15 | 80 | 4/5/1 |
| Example F5 | F-1 | R-56 | 100.0 | PGM25E | NaPS | 1.00% | 20 | 80 | 17.5 | 80 | 4/5/1 |
| Example F6 | F-1 | R-56 | 100.0 | PGM25E | NaPS | 1.00% | 20 | 80 | 20 | 80 | 4/5/1 |
| Example F7 | F-1 | R-56 | 100.0 | PGM25E | NaPS | 1.00% | 20 | 80 | 22.5 | 80 | 4/5/1 |
| Example F8 | F-1 | R-56 | 100.0 | PGM25E | NaPS | 1.00% | 20 | 80 | 10 | 80 | 4/5/1 |
| Example F9 | F-1 | R-56 | 100.0 | PGM25E | NaPS | 1.00% | 20 | 80 | 25 | 80 | 4/5/1 |
| Example F10 | F-1 | R-57 | 95.0 | PGM25E | NaPS | 1.00% | 20 | 80 | 10 | 80 | 4/5/1 |
| Example F11 | F-1 | R-57 | 95.0 | PGM25E | NaPS | 1.00% | 20 | 80 | 17.5 | 80 | 4/5/1 |
| Example F12 | F-1 | R-57 | 95.0 | PGM25E | NaPS | 1.00% | 20 | 80 | 25 | 80 | 4/5/1 |
| Example F13 | F-1 | R-57 | 95.0 | PGM25E | NaPS | 1.00% | 20 | 80 | 12.5 | 80 | 4/5/1 |
| Example F14 | F-1 | R-57 | 95.0 | PGM25E | NaPS | 1.00% | 20 | 80 | 15 | 80 | 4/5/1 |
| Example F15 | F-1 | R-57 | 95.0 | PGM25E | NaPS | 1.00% | 20 | 80 | 22.5 | 80 | 4/5/1 |
| Example F16 | F-1 | R-56 | 100.0 | PGM25E | V50 | 0.50% | 20 | 80 | 25 | 80 | 4/5/1 |
| Example F17 | F-1 | R-56 | 100.0 | PGM25E | V50 | 0.50% | 20 | 80 | 25 | 80 | 4/5/1 |
| Example F18 | F-1 | R-57 | 95.0 | PGM25E | NaPS | 1.00% | 22.5 | 77.5 | 17.5 | 80 | 4/5/1 |

TABLE 5-1-continued

| | | | | | | | | | | | |
|---|---|---|---|---|---|---|---|---|---|---|---|
| Example F20 | F-1 | R-57 | 95.0 | PGM25E | NaPS | 1.00% | 25 | 75 | 17.5 | 80 | 4/5/1 |
| Example F21 | F-3 | R-57 | 95.0 | PGM23E | — | — | 20 | 80 | 22.4 | 95 | 6 |
| Example F22 | F-3 | R-57 | 95.0 | PGM23E | V50 | 10.00% | 20 | 80 | 22.4 | 95 | 6 |
| Example F23 | F-1 | R-57 | 95.0 | PGM25E | V50 | 0.20% | 20 | 80 | 22.5 | 80 | 4/5/1 |
| Example F24 | F-1 | R-57 | 95.0 | PGM25E | V50 | 0.10% | 20 | 80 | 22.5 | 80 | 4/5/1 |
| Example F25 | F-1 | R-57 | 95.0 | PGM25E | V50 | 0.20% | 20 | 80 | 22.5 | 80 | 4/5/1 |
| Example F26 | F-1 | R57 | 95.0 | PGM25E | V50 | 0.20% | 20 | 80 | 22.5 | 95 | 4/5/1 |

| | | Analysis result of polymer | | | | |
|---|---|---|---|---|---|---|
| | | GPC | | | Polymer Pure content | Calculation method |
| | Polymer No. | Mw | Mp | Mn | | |
| Example F1 | B-1 | 31013 | 27672 | 17774 | 86.2% | G-3 |
| Example F2 | B-2 | 34553 | 28190 | 18814 | 87.1% | G-3 |
| Example F3 | B-3 | 108773 | 100806 | 37071 | 91.7% | G-3 |
| Example F4 | B-4 | 61117 | 59874 | 26374 | 90.1% | G-3 |
| Example F5 | B-5 | 51786 | 45569 | 23769 | 89.1% | G-3 |
| Example F6 | B-6 | 44098 | 36259 | 21579 | 88.7% | G-3 |
| Example F7 | B-7 | 37789 | 32597 | 19775 | 87.0% | G-3 |
| Example F8 | B-8 | 60674 | 59019 | 27158 | 92.3% | G-3 |
| Example F9 | B-9 | 23123 | 17026 | 15850 | 84.9% | G-3 |
| Example F10 | B-10 | 55613 | 46983 | 26110 | 92.6% | G-3 |
| Example F11 | B-11 | 29014 | 22879 | 17758 | 89.2% | G-3 |
| Example F12 | B-12 | 20853 | 15329 | 14408 | 85.5% | G-3 |
| Example F13 | B-13 | 40305 | 34493 | 21758 | 91.6% | G-3 |
| Example F14 | B-14 | 33684 | 27256 | 19339 | 90.7% | G-3 |
| Example F15 | B-15 | 23192 | 17209 | 15384 | 86.7% | G-3 |
| Example F16 | B-17 | 23555 | 18357 | 15147 | 88.2% | G-3 |
| Example F17 | B-18 | 21474 | 17423 | 14510 | 87.7% | G-3 |
| Example F18 | B-19 | 29411 | 22556 | 17637 | 89.3% | G-3 |
| Example F20 | B-20 | 30022 | 22983 | 17737 | 89.9% | G-3 |
| Example F21 | B-32 | 25856 | 23124 | 17484 | 51.6% | G-3 |
| Example F22 | B-33 | 24244 | 15950 | 15344 | 77.1% | G-3 |
| Example F23 | B-36 | 22236 | 18192 | 15442 | 85.9% | G-3 |
| Example F24 | B-37 | 25520 | 20630 | 16861 | 83.9% | G-3 |
| Example F25 | B-38 | 21708 | 17943 | 15216 | 86.7% | G-3 |
| Example F26 | B-39 | 20603 | 16494 | 14641 | 84.8% | G-3 |

TABLE 5-2

| | Polymerization conditions | | | | | | | | | | |
|---|---|---|---|---|---|---|---|---|---|---|---|
| | PAG thiol | | PEG | | Initiator mol % relative | Proportion (wt) | | | | | Reaction time Monomer dropwise addition/ Initiator dropwise addition/ Maturing time |
| | Production method | Kind | EO mol | monomer Kind | Initiator Kind | to monomer | SMAA | PEG monomer | PAG thiol | Temperature/ °C. | |
| Example F27 | F-1 | R-57 | 95.0 | PGM25E | V50 | 0.20% | 20 | 80 | 22.5 | 60 | 4/5/1 |
| Example F28 | F-2 | R-57 | 95.0 | PGM25E | V50 | 0.20% | 20 | 80 | 22.5 | 80 | 4/3.5/5/1 |
| Example F29 | F-1 | R-57 | 95.0 | PGM23E | V50 | 0.20% | 15 | 85 | 15 | 80 | 4/5/1 |
| Example F30 | F-1 | R-57 | 95.0 | PGM23E | V50 | 0.20% | 15 | 85 | 20 | 80 | 4/5/1 |
| Example F31 | F-1 | R-57 | 95.0 | PGM23E | V50 | 0.20% | 15 | 85 | 25 | 80 | 4/5/1 |
| Example F32 | F-1 | R-57 | 95.0 | PGM23E | V50 | 0.20% | 15 | 85 | 10 | 80 | 4/5/1 |
| Example F33 | F-1 | R-57 | 95.0 | PGM23E | V50 | 0.20% | 17.5 | 82.5 | 15 | 80 | 4/5/1 |
| Example F34 | F-1 | R-57 | 95.0 | PGM23E | V50 | 0.20% | 20 | 80 | 17.5 | 80 | 4/5/1 |
| Example F35 | F-1 | R-57 | 95.0 | PGM23E | V50 | 0.20% | 17.5 | 82.5 | 17.5 | 80 | 4/5/1 |
| Example F36 | F-1 | R-57 | 95.0 | PGM23E | V50 | 0.20% | 15 | 85 | 17.5 | 80 | 4/5/1 |
| Example F37 | F-1 | R-57 | 95.0 | PGM23E | V50 | 0.20% | 17.5 | 82.5 | 20 | 80 | 4/5/1 |
| Example F38 | F-1 | R-57 | 95.0 | PGM23E | V50 | 0.20% | 20 | 80 | 20 | 80 | 4/5/1 |
| Example F39 | F-1 | R-57 | 95.0 | PGM23E | V50 | 0.20% | 22.5 | 77.5 | 22.5 | 80 | 4/5/1 |
| Example F40 | F-1 | R-57 | 95.0 | PGM23E | V50 | 0.20% | 15 | 85 | 7.5 | 80 | 4/5/1 |
| Example F41 | F-1 | R-57 | 95.0 | PGM23E | V50 | 0.20% | 15 | 85 | 12.5 | 80 | 4/5/1 |
| Example F42 | F-1 | R-57 | 95.0 | PGM23E | V50 | 0.20% | 15 | 85 | 2.5 | 80 | 4/5/1 |
| Example F43 | F-1 | R-57 | 95.0 | PGM23E | V50 | 0.20% | 15 | 85 | 5 | 80 | 4/5/1 |
| Example F44 | F-1 | R-57 | 95.0 | PGM23E | V50 | 0.20% | 20 | 80 | 2.5 | 80 | 4/5/1 |
| Example F45 | F-1 | R-57 | 95.0 | PGM23E | V50 | 0.20% | 20 | 80 | 7.5 | 80 | 4/5/1 |
| Example F46 | F-1 | R-57 | 95.0 | PGM23E | V50 | 0.20% | 20 | 80 | 12.5 | 80 | 4/5/1 |
| Example F47 | F-1 | R-57 | 95.0 | PGM23E | V50 | 0.20% | 17.5 | 82.5 | 7.5 | 80 | 4/5/1 |
| Example F48 | F-1 | R-57 | 95.0 | PGM23E | V50 | 0.20% | 22.5 | 77.5 | 15 | 80 | 4/5/1 |
| Example F49 | F-1 | R-57 | 95.0 | PGM23E | V50 | 0.20% | 25 | 75 | 17.5 | 80 | 4/5/1 |

TABLE 5-2-continued

| | | | | | | | | | | |
|---|---|---|---|---|---|---|---|---|---|---|
| Example F50 | F-1 | R-57 | 95.0 | PGM23E | V50 | 0.20% | 17.5 | 82.5 | 5 | 80 | 4/5/1 |
| Example F51 | F-1 | R-57 | 95.0 | PGM23E | V50 | 0.20% | 20 | 80 | 10 | 80 | 4/5/1 |

| | | Analysis result of polymer | | | | | |
|---|---|---|---|---|---|---|---|
| | | | GPC | | | | Polymer Calculation |
| | Polymer No. | Mw | Mp | Mn | Pure content | method |
| Example F27 | B-40 | 36685 | 34906 | 20924 | 80.0% | G-3 |
| Example F28 | B-41 | 21157 | 17117 | 14976 | 86.0% | G-3 |
| Example F29 | B-42 | 24532 | 22596 | 16465 | 90.7% | G-3 |
| Example F30 | B-43 | 20472 | 17719 | 14537 | 88.8% | G-3 |
| Example F31 | B-44 | 17748 | 14804 | 13083 | 86.7% | G-3 |
| Example F32 | B-45 | 32190 | 31957 | 20238 | 91.9% | G-3 |
| Example F33 | B-46 | 24703 | 22678 | 16634 | 89.7% | G-3 |
| Example F34 | B-48 | 22145 | 19420 | 15325 | 88.3% | G-3 |
| Example F35 | B-49 | 22215 | 19467 | 15470 | 88.4% | G-3 |
| Example F36 | B-50 | 22020 | 19399 | 15423 | 88.6% | G-3 |
| Example F37 | B-51 | 20337 | 17489 | 14532 | 86.8% | G-3 |
| Example F38 | B-52 | 20321 | 17379 | 14477 | 86.9% | G-3 |
| Example F39 | B-53 | 18966 | 15674 | 13754 | 85.5% | G-3 |
| Example F40 | B-54 | 38813 | 40543 | 23149 | 92.9% | G-3 |
| Example F41 | B-55 | 26833 | 25349 | 17733 | 90.6% | G-3 |
| Example F42 | B-56 | 79399 | 88664 | 41992 | 95.3% | G-3 |
| Example F43 | B-57 | 50527 | 56537 | 28444 | 93.4% | G-3 |
| Example F44 | B-58 | 81217 | 91308 | 41969 | 94.7% | G-3 |
| Example F45 | B-59 | 39736 | 41522 | 23347 | 92.2% | G-3 |
| Example F46 | B-60 | 27689 | 26436 | 17930 | 90.2% | G-3 |
| Example F47 | B-61 | 37945 | 39880 | 22653 | 92.6% | G-3 |
| Example F48 | B-62 | 24024 | 21386 | 15990 | 88.8% | G-3 |
| Example F49 | B-63 | 21845 | 18708 | 14952 | 87.3% | G-3 |
| Example F50 | B-64 | 50900 | 56927 | 28365 | 93.8% | G-3 |
| Example F51 | B-65 | 31778 | 31828 | 19722 | 91.7% | G-3 |

TABLE 5-3

| | Polymerization conditions | | | | | | | | | |
|---|---|---|---|---|---|---|---|---|---|---|
| | | PAG thiol | | PEG | | Initiator mol % relative to monomer | Proportion (wt) | | | Temperature/ °C. | Reaction time Monomer dropwise addition/ Initiator dropwise addition/ Maturing time |
| | Production method | Kind | EO mol | monomer Kind | Initiator Kind | | SMAA | PEG monomer | PAG thiol | | |
| Example F52 | F-1 | T-12 | 105.8 | PGM23E | V50 | 0.20% | 15 | 85 | 7.5 | 80 | 4/5/1 |
| Example F53 | F-1 | T-12 | 105.8 | PGM23E | V50 | 0.20% | 20 | 80 | 7.5 | 80 | 4/5/1 |
| Example F54 | F-1 | T-12 | 105.8 | PGM23E | V50 | 0.20% | 17.5 | 82.5 | 5 | 80 | 4/5/1 |
| Example F55 | F-1 | T-12 | 105.8 | PGM23E | V50 | 0.20% | 17.5 | 82.5 | 7.5 | 80 | 4/5/1 |
| Example F56 | F-1 | T-12 | 105.8 | PGM23E | V50 | 0.20% | 17.5 | 82.5 | 10 | 80 | 4/5/1 |
| Example F57 | F-1 | T-11 | 186.6 | PGM23E | V50 | 0.20% | 15 | 85 | 5 | 80 | 4/5/1 |
| Example F58 | F-1 | T-11 | 186.6 | PGM23E | V50 | 0.20% | 15 | 85 | 10 | 80 | 4/5/1 |
| Example F59 | F-1 | T-11 | 186.6 | PGM23E | V50 | 0.20% | 15 | 85 | 15 | 80 | 4/5/1 |
| Example F60 | F-1 | T-11 | 186.6 | PGM23E | V50 | 0.20% | 17.5 | 82.5 | 10 | 80 | 4/5/1 |
| Example F61 | F-1 | T-11 | 186.6 | PGM23E | V50 | 0.20% | 17.5 | 82.5 | 15 | 80 | 4/5/1 |
| Example F62 | F-1 | T-11 | 186.6 | PGM23E | V50 | 0.20% | 17.5 | 82.5 | 20 | 80 | 4/5/1 |
| Example F63 | F-1 | T-11 | 186.6 | PGM23E | V50 | 0.20% | 20 | 80 | 5 | 80 | 4/5/1 |
| Example F64 | F-1 | T-11 | 186.6 | PGM23E | V50 | 0.20% | 20 | 80 | 10 | 80 | 4/5/1 |
| Example F65 | F-1 | T-11 | 186.6 | PGM23E | V50 | 0.20% | 20 | 80 | 15 | 80 | 4/5/1 |
| Example F66 | F-1 | T-11 | 186.6 | PGM23E | V50 | 0.20% | 22.5 | 77.5 | 5 | 80 | 4/5/1 |
| Example F67 | F-1 | T-11 | 186.6 | PGM23E | V50 | 0.20% | 22.5 | 77.5 | 15 | 80 | 4/5/1 |
| Example F68 | F-1 | T-11 | 186.6 | PGM23E | V50 | 0.20% | 22.5 | 77.5 | 10 | 80 | 4/5/1 |
| Example F69 | F-1 | T-12 | 105.8 | PGM25E | V50 | 0.20% | 17.5 | 82.5 | 5 | 80 | 4/5/1 |
| Example F70 | F-1 | T-12 | 105.8 | PGM25E | V50 | 0.20% | 17.5 | 82.5 | 7.5 | 80 | 4/5/1 |
| Example F71 | F-1 | T-12 | 105.8 | PGM25E | V50 | 0.20% | 17.5 | 82.5 | 10 | 80 | 4/5/1 |
| Example F72 | F-1 | T-12 | 105.8 | PGM25E | V50 | 0.20% | 17.5 | 82.5 | 15 | 80 | 4/5/1 |
| Example F73 | F-1 | T-12 | 105.8 | PGM25E | V50 | 0.20% | 17.5 | 82.5 | 10 | 80 | 4/5/1 |
| Example F74 | F-1 | T-34 | 43.0 | PGM10E | V50 | 0.20% | 20 | 80 | 7.5 | 80 | 4/5/1 |
| Example F75 | F-1 | T-34 | 43.0 | PGM10E | V50 | 0.20% | 20 | 80 | 10 | 80 | 4/5/1 |
| Example F76 | F-1 | T-34 | 43.0 | PGM10E | V50 | 0.20% | 20 | 80 | 15 | 80 | 4/5/1 |

TABLE 5-3-continued

| | Polymer No. | GPC Mw | GPC Mp | GPC Mn | Polymer Pure content | Calculation method |
|---|---|---|---|---|---|---|
| Example F52 | B-66 | 54163 | 58002 | 30651 | 96.4% | G-3 |
| Example F53 | B-67 | 53095 | 57353 | 30006 | 96.4% | G-3 |
| Example F54 | B-68 | 67051 | 73571 | 36432 | 96.0% | G-3 |
| Example F55 | B-69 | 52332 | 55418 | 29448 | 95.7% | G-3 |
| Example F56 | B-70 | 42315 | 42714 | 25082 | 94.8% | G-3 |
| Example F57 | B-71 | 101576 | 107697 | 56844 | 95.3% | G-3 |
| Example F58 | B-72 | 68546 | 72298 | 41167 | 93.7% | G-3 |
| Example F59 | B-73 | 53135 | 54492 | 33894 | 92.2% | G-3 |
| Example F60 | B-74 | 69085 | 72420 | 40828 | 93.4% | G-3 |
| Example F61 | B-75 | 53629 | 54832 | 33833 | 92.5% | G-3 |
| Example F62 | B-76 | 44061 | 42068 | 29138 | 89.9% | G-3 |
| Example F63 | B-77 | 107053 | 119656 | 58862 | 95.7% | G-3 |
| Example F64 | B-78 | 75636 | 80005 | 44207 | 93.8% | G-3 |
| Example F65 | B-79 | 59924 | 58733 | 36944 | 92.4% | G-3 |
| Example F66 | B-80 | 111960 | 121213 | 59994 | 93.9% | G-3 |
| Example F67 | B-82 | 60754 | 60286 | 36915 | 91.0% | G-3 |
| Example F68 | B-83 | 75338 | 79014 | 43338 | 83.1% | G-3 |
| Example F69 | B-84 | 91856 | 81071 | 42497 | 96.6% | G-3 |
| Example F70 | B-85 | 65380 | 58699 | 33527 | 96.5% | G-3 |
| Example F71 | B-86 | 51253 | 45294 | 27860 | 96.3% | G-3 |
| Example F72 | B-87 | 37909 | 29966 | 22090 | 94.9% | G-3 |
| Example F73 | B-88 | 48597 | 44366 | 27228 | 95.7% | G-3 |
| Example F74 | B-116 | 25759 | 21805 | 13215 | 98.6% | G-3 |
| Example F75 | B-117 | 22155 | 16624 | 11230 | 98.3% | G-3 |
| Example F76 | B-118 | 14207 | 10844 | 8099 | 97.8% | G-3 |

TABLE 5-4

| | Production method | PAG thiol Kind | PEG EO mol | PEG monomer Kind | Initiator Kind | Initiator mol % relative to monomer | Proportion (wt) SMAA | Proportion (wt) PEG monomer | Proportion (wt) PAG thiol | Temperature/ °C. | Reaction time Monomer dropwise addition/ Initiator dropwise addition/ Maturing time |
|---|---|---|---|---|---|---|---|---|---|---|---|
| Example F77 | F-1 | T-34 | 43.0 | PGM10E | V50 | 0.20% | 22.5 | 77.5 | 7.5 | 80 | 4/5/1 |
| Example F78 | F-1 | T-34 | 43.0 | PGM10E | V50 | 0.20% | 22.5 | 77.5 | 10 | 80 | 4/5/1 |
| Example F79 | F-1 | T-34 | 43.0 | PGM10E | V50 | 0.20% | 22.5 | 77.5 | 15 | 80 | 4/5/1 |
| Example F80 | F-1 | T-34 | 43.0 | PGM10E | V50 | 0.20% | 25 | 75 | 5 | 80 | 4/5/1 |
| Example F81 | F-1 | T-34 | 43.0 | PGM10E | V50 | 0.20% | 25 | 75 | 7.5 | 80 | 4/5/1 |
| Example F82 | F-1 | T-34 | 43.0 | PGM10E | V50 | 0.20% | 25 | 75 | 6.5 | 80 | 4/5/1 |
| Example F83 | F-1 | T-34 | 43.0 | PGM10E | V50 | 0.20% | 22.5 | 77.5 | 5 | 80 | 4/5/1 |
| Example F84 | F-1 | T-34 | 43.0 | PGM10E | V50 | 0.20% | 22.5 | 77.5 | 4 | 80 | 4/5/1 |
| Example F85 | F-1 | T-34 | 43.0 | PGM10E | V50 | 0.20% | 22.5 | 77.5 | 6 | 80 | 4/5/1 |
| Example F86 | F-1 | T-34 | 43.0 | PGM10E | V50 | 0.20% | 20 | 80 | 5.5 | 80 | 4/5/1 |
| Example F87 | F-1 | T-34 | 43.0 | PGM10E | V50 | 0.20% | 20 | 80 | 6.5 | 80 | 4/5/1 |
| Example F88 | F-1 | T-34 | 43.0 | PGM10E | V50 | 0.20% | 20 | 80 | 4 | 80 | 4/5/1 |
| Example F89 | F-1 | T-34 | 43.0 | PGM10E | V50 | 0.20% | 20 | 80 | 5 | 80 | 4/5/1 |
| Example F90 | F-1 | T-12 | 105.8 | PGM25E | V50 | 0.20% | 17.5 | 82.5 | 10 | 80 | 4/5/1 |
| Example F91 | F-1 | T-9 | 105.8 | PGM25E | V50 | 0.20% | 17.5 | 82.5 | 10 | 80 | 4/5/1 |
| Example F92 | F-1 | T-12 | 105.8 | PGM25E | V50 | 0.20% | 17.5 | 82.5 | 10 | 80 | 4/5/1 |
| Example F93 | F-1 | T-9 | 105.8 | PGM25E | V50 | 0.20% | 17.5 | 82.5 | 10 | 80 | 4/5/1 |
| Example F94 | F-1 | T-35 | 105.8 | PGM25E | V50 | 0.20% | 17.5 | 82.5 | 10 | 80 | 4/5/1 |
| Example F95 | F-1 | T-36 | 105.8 | PGM25E | V50 | 0.20% | 17.5 | 82.5 | 10 | 80 | 4/5/1 |
| Example F96 | F-1 | T-38 | 92 + 4 | PGM25E | V50 | 0.20% | 17.5 | 82.5 | 10 | 80 | 4/5/1 |
| Example F97 | F-1 | T-39 | 92 + 4 | PGM25E | V50 | 0.20% | 17.5 | 82.5 | 10 | 80 | 4/5/1 |

TABLE 5-4-continued

| | | Analysis result of polymer | | | | |
|---|---|---|---|---|---|---|
| | | | GPC | | | Polymer Calculation |
| | Polymer No. | Mw | Mp | Mn | Pure content | method |
| Example F77 | B-120 | 25502 | 21527 | 12964 | 98.4% | G-3 |
| Example F78 | B-121 | 19410 | 15917 | 10734 | 98.3% | G-3 |
| Example F79 | B-122 | 17093 | 11139 | 8521 | 98.3% | G-3 |
| Example F80 | B-123 | 36904 | 32290 | 16606 | 98.6% | G-3 |
| Example F81 | B-124 | 25115 | 21113 | 12571 | 98.5% | G-3 |
| Example F82 | B-125 | 28195 | 24767 | 13933 | 98.5% | G-3 |
| Example F83 | B-126 | 36269 | 32431 | 16749 | 98.5% | G-3 |
| Example F84 | B-127 | 41876 | 38430 | 18778 | 97.3% | G-3 |
| Example F85 | B-128 | 30069 | 27523 | 14481 | 98.1% | G-3 |
| Example F86 | B-129 | 31672 | 30660 | 15395 | 98.2% | G-3 |
| Example F87 | B-130 | 27865 | 25671 | 13894 | 98.1% | G-3 |
| Example F88 | B-131 | 41505 | 39656 | 19222 | 97.9% | G-3 |
| Example F89 | B-132 | 34503 | 33737 | 16595 | 98.0% | G-3 |
| Example F90 | B-133 | 49771 | 45320 | 24685 | 96.4% | G-3 |
| Example F91 | B-134 | 48887 | 44448 | 25304 | 96.6% | G-3 |
| Example F92 | B-135 | 52223 | 45375 | 24783 | 96.7% | G-3 |
| Example F93 | B-136 | 47238 | 44583 | 23766 | 96.6% | G-3 |
| Example F94 | B-137 | 58458 | 63032 | 25694 | 96.5% | G-3 |
| Example F95 | B-138 | 46492 | 44944 | 24224 | 96.6% | G-3 |
| Example F96 | B-139 | 44419 | 43901 | 23438 | 96.5% | G-3 |
| Example F97 | B-140 | 43222 | 40365 | 22928 | 96.4% | G-3 |

TABLE 6-1

| | Charged amount | | | | | | | | | | | |
|---|---|---|---|---|---|---|---|---|---|---|---|---|
| | Dropwise-added monomer | | | | | | Dropwise-added transfer agent | | Dropwise-added initiator | | Charged into reactor | | |
| | | | | | | | | | | | PEG | Acid |
| | SMAA/ g | MAA/ g | PEG monomer/g | PAG thiol/g | Water/ g | NaOH/ g | PAG thiol/g | Water/g | Initiator/ g | Water/g | monomer/ g | monomer/ g | Water/g |
| Example F1 | 0.26 | 20.86 | 105.81 | 33.07 | 80.00 | — | — | — | 1.619 | 38.38 | — | — | 120.00 |
| Example F2 | 0.26 | 20.86 | 105.81 | 33.07 | 80.00 | — | — | — | 0.810 | 39.19 | — | — | 120.00 |
| Example F3 | 0.30 | 23.81 | 120.79 | 15.10 | 80.00 | — | — | — | 0.913 | 39.09 | — | — | 120.00 |
| Example F4 | 0.29 | 22.74 | 115.34 | 21.63 | 80.00 | — | — | — | 0.875 | 39.12 | — | — | 120.00 |
| Example F5 | 0.28 | 22.24 | 112.80 | 24.68 | 80.00 | — | — | — | 0.858 | 39.14 | — | — | 120.00 |
| Example F6 | 0.28 | 21.76 | 110.37 | 27.59 | 80.00 | — | — | — | 0.841 | 39.16 | — | — | 120.00 |
| Example F7 | 0.27 | 21.30 | 108.04 | 30.39 | 80.00 | — | — | — | 0.825 | 39.17 | — | — | 120.00 |
| Example F8 | 0.30 | 23.81 | 120.79 | 15.10 | 80.00 | — | — | — | 0.913 | 39.09 | — | — | 120.00 |
| Example F9 | 0.26 | 20.86 | 105.81 | 33.07 | 80.00 | — | — | — | 0.811 | 39.19 | — | — | 120.00 |
| Example F10 | 0.30 | 23.81 | 120.79 | 15.10 | 80.00 | — | — | — | 0.905 | 39.10 | — | — | 120.00 |
| Example F11 | 0.28 | 22.24 | 112.80 | 24.68 | 80.00 | — | — | — | 0.845 | 39.16 | — | — | 120.00 |
| Example F12 | 0.26 | 20.86 | 105.81 | 33.07 | 80.00 | — | — | — | 0.792 | 39.21 | — | — | 120.00 |
| Example F13 | 0.30 | 23.26 | 118.00 | 18.44 | 80.00 | — | — | — | 0.884 | 39.12 | — | — | 120.00 |
| Example F14 | 0.29 | 22.74 | 115.34 | 21.63 | 80.00 | — | — | — | 0.864 | 39.14 | — | — | 120.00 |
| Example F15 | 0.27 | 21.30 | 108.04 | 30.39 | 80.00 | — | — | — | 0.809 | 39.19 | — | — | 120.00 |
| Example F16 | 0.26 | 20.86 | 105.81 | 33.07 | 80.00 | — | — | — | 0.451 | 39.55 | — | — | 120.00 |
| Example F17 | 0.26 | 20.86 | 105.81 | 33.07 | 80.00 | — | — | — | 0.451 | 39.55 | — | — | 120.00 |
| Example F18 | 0.26 | 20.86 | 105.81 | 33.07 | 80.00 | — | — | — | 0.920 | 39.08 | — | — | 120.00 |
| Example F20 | 0.32 | 25.14 | 109.76 | 24.79 | 80.00 | 0.02 | — | — | 0.995 | 39.01 | — | — | 120.00 |
| Example F21 | — | 3.77 | 18.93 | — | 22.70 | — | 5.30 | 19.30 | — | — | — | — | — |
| Example F22 | — | 3.77 | 18.93 | — | 22.70 | — | 5.30 | 12.30 | 0.033 | 6.97 | — | — | — |
| Example F23 | 0.11 | 8.32 | 42.20 | 11.87 | 37.50 | — | — | — | 0.072 | 49.93 | — | — | 100.00 |
| Example F24 | 0.11 | 8.32 | 42.20 | 11.87 | 37.50 | — | — | — | 0.036 | 49.96 | — | — | 100.00 |
| Example F25 | 1.05 | 7.54 | 42.07 | 11.83 | 37.50 | 0.35 | — | — | 0.072 | 49.93 | — | — | 100.00 |
| Example F26 | 0.11 | 8.32 | 42.20 | 11.87 | 37.50 | — | — | — | 0.072 | 49.93 | — | — | 100.00 |

TABLE 6-2

| | Charged amount | | | | | | | | | | | |
|---|---|---|---|---|---|---|---|---|---|---|---|---|
| | Dropwise-added monomer | | | | | | Dropwise-added transfer agent | | Dropwise-added initiator | | Charged into reactor | | |
| | | | | | | | | | | | PEG | Acid | |
| | SMAA/ g | MAA/ g | PEG monomer/g | PAG thiol/g | Water/ g | NaOH/ g | PAG thiol/g | Water/g | Initiator/ g | Water/g | monomer/ g | monomer/ g | Water/g |
| Example F27 | 0.11 | 8.32 | 42.20 | 11.87 | 37.50 | — | — | — | 0.072 | 49.93 | — | — | 100.00 |
| Example F28 | 0.11 | 8.32 | 42.20 | — | 12.66 | — | 11.87 | 37.34 | 0.072 | 37.43 | — | — | 100.00 |
| Example F29 | 0.84 | 5.99 | 47.33 | 8.35 | 37.50 | 0.31 | — | — | 0.065 | 49.94 | — | — | 100.00 |
| Example F30 | 0.80 | 5.73 | 45.31 | 10.66 | 37.50 | 0.30 | — | — | 0.062 | 49.94 | — | — | 100.00 |
| Example F31 | 0.77 | 5.50 | 43.45 | 12.78 | 37.50 | 0.28 | — | — | 0.060 | 49.94 | — | — | 100.00 |
| Example F32 | 0.87 | 6.27 | 49.53 | 5.83 | 37.50 | 0.32 | — | — | 0.068 | 49.93 | — | — | 100.00 |
| Example F33 | 0.98 | 7.01 | 46.12 | 8.39 | 37.50 | 0.36 | — | — | 0.072 | 49.93 | — | — | 100.00 |
| Example F34 | 1.10 | 7.87 | 43.92 | 9.61 | 37.50 | 0.41 | — | — | 0.077 | 49.92 | — | — | 100.00 |
| Example F35 | 0.96 | 6.86 | 45.11 | 9.57 | 37.50 | 0.35 | — | — | 0.070 | 49.93 | — | — | 100.00 |
| Example F36 | 0.82 | 5.86 | 46.29 | 9.53 | 37.50 | 0.30 | — | — | 0.064 | 49.94 | — | — | 100.00 |
| Example F37 | 0.94 | 6.71 | 44.15 | 10.70 | 37.50 | 0.35 | — | — | 0.069 | 49.93 | — | — | 100.00 |
| Example F38 | 1.07 | 7.70 | 42.98 | 10.74 | 37.50 | 0.40 | — | — | 0.075 | 49.93 | — | — | 100.00 |
| Example F39 | 1.19 | 8.52 | 40.92 | 11.88 | 37.50 | 0.44 | — | — | 0.080 | 49.92 | — | — | 100.00 |
| Example F40 | 0.89 | 6.42 | 50.71 | 4.47 | 37.50 | 0.33 | — | — | 0.070 | 49.93 | — | — | 100.00 |
| Example F41 | 0.85 | 6.12 | 48.40 | 7.12 | 37.50 | 0.32 | — | — | 0.066 | 49.93 | — | — | 100.00 |
| Example F42 | 0.94 | 6.74 | 53.26 | 1.57 | 37.50 | 0.35 | — | — | 0.073 | 49.93 | — | — | 100.00 |
| Example F43 | 0.92 | 6.57 | 51.95 | 3.06 | 37.50 | 0.34 | — | — | 0.071 | 49.93 | — | — | 100.00 |
| Example F44 | 1.26 | 9.07 | 50.59 | 1.58 | 37.50 | 0.47 | — | — | 0.088 | 49.91 | — | — | 100.00 |
| Example F45 | 1.20 | 8.63 | 48.15 | 4.51 | 37.50 | 0.44 | — | — | 0.084 | 49.92 | — | — | 100.00 |
| Example F46 | 1.15 | 8.23 | 45.94 | 7.18 | 37.50 | 0.42 | — | — | 0.080 | 49.92 | — | — | 100.00 |
| Example F47 | 1.05 | 7.52 | 49.44 | 4.49 | 37.50 | 0.39 | — | — | 0.077 | 49.92 | — | — | 100.00 |
| Example F48 | 1.01 | 7.27 | 34.95 | 6.76 | 30.00 | 0.37 | — | — | 0.068 | 39.93 | — | — | 80.00 |
| Example F49 | 1.11 | 7.94 | 33.21 | 7.75 | 30.00 | 0.41 | — | — | 0.072 | 39.93 | — | — | 80.00 |
| Example F50 | 1.07 | 7.70 | 50.65 | 3.07 | 37.50 | 0.40 | — | — | 0.079 | 49.92 | — | — | 100.00 |
| Example F51 | 1.18 | 8.43 | 47.02 | 5.88 | 37.50 | 0.43 | — | — | 0.082 | 49.92 | — | — | 100.00 |

TABLE 6-3

| | Charged amount | | | | | | | | | | | |
|---|---|---|---|---|---|---|---|---|---|---|---|---|
| | Dropwise-added monomer | | | | | | Dropwise-added transfer agent | | Dropwise-added initiator | | Charged into reactor | | |
| | | | | | | | | | | | PEG | Acid | |
| | SMAA/ g | MAA/ g | PEG monomer/g | PAG thiol/g | Water/ g | NaOH/ g | PAG thiol/g | Water/g | Initiator/ g | Water/g | monomer/ g | monomer/ g | Water/g |
| Example F52 | 0.89 | 6.42 | 50.71 | 4.47 | 37.50 | 0.33 | — | — | 0.070 | 49.93 | — | — | 100.00 |
| Example F53 | 1.20 | 8.63 | 48.15 | 4.51 | 37.50 | 0.44 | — | — | 0.084 | 49.92 | — | — | 100.00 |
| Example F54 | 1.07 | 7.70 | 50.65 | 3.07 | 37.50 | — | — | — | 0.079 | 49.92 | — | — | 100.00 |
| Example F55 | 1.05 | 7.52 | 49.44 | 4.49 | 37.50 | — | — | — | 0.077 | 49.92 | — | — | 100.00 |
| Example F56 | 1.02 | 7.34 | 48.28 | 5.85 | 37.50 | — | — | — | 0.075 | 49.93 | — | — | 100.00 |
| Example F57 | 0.92 | 6.57 | 51.95 | 3.06 | 37.50 | — | — | — | 0.071 | 49.93 | — | — | 100.00 |
| Example F58 | 0.87 | 6.27 | 49.53 | 5.83 | 37.50 | — | — | — | 0.068 | 49.93 | — | — | 100.00 |
| Example F59 | 0.84 | 5.99 | 47.33 | 8.35 | 37.50 | — | — | — | 0.065 | 49.94 | — | — | 100.00 |
| Example F60 | 1.02 | 7.34 | 48.28 | 5.85 | 37.50 | — | — | — | 0.075 | 49.93 | — | — | 100.00 |
| Example F61 | 0.98 | 7.01 | 46.12 | 8.39 | 37.50 | — | — | — | 0.072 | 49.93 | — | — | 100.00 |
| Example F62 | 0.94 | 6.71 | 44.15 | 10.70 | 37.50 | — | — | — | 0.069 | 49.93 | — | — | 100.00 |
| Example F63 | 1.23 | 8.84 | 49.34 | 3.08 | 37.50 | — | — | — | 0.086 | 49.91 | — | — | 100.00 |
| Example F64 | 1.18 | 8.43 | 47.02 | 5.88 | 37.50 | — | — | — | 0.082 | 49.92 | — | — | 100.00 |
| Example F65 | 1.12 | 8.05 | 44.91 | 8.42 | 37.50 | — | — | — | 0.078 | 49.92 | — | — | 100.00 |
| Example F66 | 1.39 | 9.99 | 48.01 | 3.10 | 37.50 | — | — | — | 0.093 | 49.91 | — | — | 100.00 |
| Example F67 | 1.27 | 9.09 | 43.68 | 8.46 | 37.50 | — | — | — | 0.085 | 49.92 | — | — | 100.00 |
| Example F68 | 1.33 | 9.52 | 45.75 | 5.90 | 37.50 | — | — | — | 0.089 | 49.91 | — | — | 100.00 |
| Example F69 | 7.74 | 55.46 | 364.70 | 22.10 | 150.00 | 2.57 | — | — | 0.553 | 49.45 | — | — | 350.00 |
| Example F70 | 7.55 | 54.13 | 355.96 | 32.36 | 150.00 | 2.51 | — | — | 0.540 | 49.46 | — | — | 350.00 |
| Example F71 | 7.37 | 52.87 | 347.62 | 42.14 | 175.00 | 2.45 | — | — | 0.527 | 49.47 | — | — | 325.00 |
| Example F72 | 7.04 | 50.50 | 332.08 | 60.38 | 175.00 | 2.34 | — | — | 0.503 | 49.50 | — | — | 325.00 |
| Example F73 | 7.37 | 52.87 | 347.62 | 42.14 | 175.00 | 2.45 | — | — | 0.527 | 49.47 | — | — | 325.00 |
| Example F74 | 6.74 | 48.33 | 269.65 | 25.28 | 200.00 | 0.28 | — | — | 0.606 | 49.39 | — | — | 400.00 |
| Example F75 | 6.58 | 47.19 | 263.31 | 32.91 | 200.00 | 0.28 | — | — | 0.592 | 49.41 | — | — | 400.00 |
| Example F76 | 6.29 | 45.07 | 251.48 | 47.15 | 200.00 | 0.26 | — | — | 0.565 | 49.43 | — | — | 400.00 |

TABLE 6-4

| | Charged amount | | | | | | | | | | | |
|---|---|---|---|---|---|---|---|---|---|---|---|---|
| | Dropwise-added monomer | | | | | | Dropwise-added transfer agent | | Dropwise-added initiator | | Charged into reactor | | |
| | | | | | | | | | | | PEG | Acid | |
| | SMAA/ g | MAA/ g | PEG monomer/g | PAG thiol/g | Water/ g | NaOH/ g | PAG thiol/g | Water/g | Initiator/ g | Water/g | monomer/ g | monomer/ g | Water/g |
| Example F77 | 7.62 | 54.61 | 262.38 | 25.39 | 200.00 | 0.67 | — | — | 0.643 | 49.36 | — | — | 400.00 |
| Example F78 | 7.44 | 53.32 | 256.18 | 33.06 | 200.00 | 0.65 | — | — | 0.628 | 49.37 | — | — | 400.00 |
| Example F79 | 7.10 | 50.92 | 244.63 | 47.35 | 200.00 | 0.62 | — | — | 0.599 | 49.40 | — | — | 400.00 |
| Example F80 | 8.71 | 62.47 | 261.39 | 17.43 | 200.00 | 1.08 | — | — | 0.697 | 49.30 | — | — | 400.00 |
| Example F81 | 8.50 | 60.95 | 255.04 | 25.50 | 200.00 | 1.05 | — | — | 0.680 | 49.32 | — | — | 400.00 |
| Example F82 | 8.58 | 61.55 | 257.55 | 22.32 | 200.00 | 1.06 | — | — | 0.687 | 49.31 | — | — | 400.00 |
| Example F83 | 7.81 | 55.97 | 268.88 | 17.35 | 200.00 | 0.68 | — | — | 0.659 | 49.34 | — | — | 400.00 |
| Example F84 | 7.88 | 56.53 | 271.57 | 14.02 | 200.00 | 0.69 | — | — | 0.665 | 49.33 | — | — | 400.00 |
| Example F85 | 7.73 | 55.42 | 266.24 | 20.61 | 200.00 | 0.68 | — | — | 0.652 | 49.35 | — | — | 400.00 |
| Example F86 | 6.87 | 49.28 | 274.94 | 18.90 | 200.00 | 0.29 | — | — | 0.618 | 49.38 | — | — | 400.00 |
| Example F87 | 6.81 | 48.80 | 272.27 | 22.12 | 200.00 | 0.29 | — | — | 0.612 | 49.39 | — | — | 400.00 |
| Example F88 | 6.98 | 50.02 | 279.05 | 13.95 | 200.00 | 0.29 | — | — | 0.627 | 49.37 | — | — | 400.00 |
| Example F89 | 6.91 | 49.52 | 276.30 | 17.27 | 200.00 | 0.29 | — | — | 0.621 | 49.38 | — | — | 400.00 |
| Example F90 | 2.95 | 21.15 | 139.05 | 16.85 | 70.00 | 0.98 | — | — | 0.211 | 29.79 | — | — | 120.00 |
| Example F91 | 2.95 | 21.15 | 139.05 | 16.85 | 70.00 | 0.98 | — | — | 0.211 | 29.79 | — | — | 120.00 |
| Example F92 | 3.32 | 23.79 | 156.43 | 18.96 | 78.75 | 1.10 | — | — | 0.237 | 44.76 | — | — | 123.75 |
| Example F93 | 3.32 | 23.79 | 156.43 | 18.96 | 78.75 | 1.10 | — | — | 0.237 | 44.76 | — | — | 123.75 |
| Example F94 | 3.32 | 23.79 | 156.43 | 18.96 | 78.75 | 1.10 | — | — | 0.237 | 44.76 | — | — | 123.75 |
| Example F95 | 3.32 | 23.79 | 156.43 | 18.96 | 78.75 | 1.10 | — | — | 0.237 | 44.76 | — | — | 123.75 |
| Example F96 | 3.32 | 23.79 | 156.43 | 18.96 | 78.75 | 1.10 | — | — | 0.237 | 44.76 | — | — | 123.75 |
| Example F97 | 3.32 | 23.79 | 156.43 | 18.96 | 78.75 | 1.10 | — | — | 0.237 | 44.76 | — | — | 123.75 |

The production methods F-1 to F-3 in Tables are as follows.

"Production Method F-1"

As a monomer solution, an aqueous solution including a monomer, PAG thiol, and sodium hydroxide, each at a specific amount, was prepared. As an initiator solution, an initiator aqueous solution at a specific amount was prepared.

Water at a specific amount was charged into a glass reactor equipped with a Dimroth condenser, a Teflon (registered trademark) stirrer including a stirring blade and a stirring seal, a nitrogen gas inlet tube, and a temperature sensor. The water was heated to a specific temperature while nitrogen gas was introduced thereinto at 100 to 200 mL/min under stirring at 250 rpm. Successively, the monomer solution and the initiator solution, each at a specific amount, were added dropwise into the reactor for 4 hours and 5 hours, respectively. After completion of the dropwise addition, the mixture was maintained for 1 hour at a specific temperature, thereby completing the polymerization reaction.

The obtained polymer was the following mixture: a polymer segment was bonded to each end of the polyalkylene glycol chain (1) with a sulfur atom-containing group therebetween; such a polymer segment mainly included a polymer (1) containing a carboxyl group derived from an unsaturated carboxylic acid monomer (methacrylic acid) and the polyalkylene glycol chain (2) derived from an unsaturated polyalkylene glycol monomer (methoxypolyethylene glycol methacrylate); and a small amount of a polymer (3) repeatedly including the constitutional units of the polymer (1) is included.

"Production Method F-2"

As a monomer solution, an aqueous solution including a monomer and sodium hydroxide, each at a specific amount, was prepared. An aqueous solution of PAG thiol at a specific amount was prepared as a chain transfer agent solution. An initiator aqueous solution at a specific amount was prepared as an initiator solution.

Water at a specific amount was charged into a glass reactor equipped with a Dimroth condenser, a Teflon (registered trademark) stirrer including a stirring blade and a stirring seal, and a nitrogen gas inlet tube, and a temperature sensor. The water was heated to a specific temperature while nitrogen gas was introduced thereinto at 100 to 200 mL/min under stirring at 250 rpm. Successively, the monomer solution, the chain transfer agent solution, and the initiator solution, each at a specific amount, were added dropwise, into the reactor for 4 hours, 3.5 hours, and 5 hours, respectively. After completion of the dropwise addition, the mixture was maintained for 1 hour at a specific temperature, thereby completing the polymerization reaction. After the reaction solution was cooled to a room temperature, if necessary, a 30% NaOH aqueous solution was added thereto, thereby adjusting the pH. As a result, an aqueous solution of a polymer was obtained.

The obtained polymer was the following mixture: a polymer segment was bonded to each end of the polyalkylene glycol chain (1) with a sulfur atom-containing group therebetween; such a polymer segment mainly included a polymer (1) containing a carboxyl group derived from the unsaturated carboxylic acid monomer (methacrylic acid) and the polyalkylene glycol chain (2) derived from the unsaturated polyalkylene glycol monomer (methoxypolyethylene glycol methacrylate); and a small amount of a polymer (3) repeatedly including the constitutional units of the polymer (1) was included.

"Production Method F-3"

As a monomer solution, an aqueous solution including a monomer and sodium hydroxide, each at a specific amount, was prepared. An aqueous solution of PAG thiol at a specific amount was prepared as a chain transfer agent solution. An initiator aqueous solution at a specific amount was prepared as an initiator solution.

The monomer solution was charged into a glass reactor and then heated to a specific temperature under stirring. Successively, the total amount of the chain transfer agent solution and the total amount of the initiator solution were added into the reactor and uniformly mixed. Then, the mixture was maintained at a specific temperature for a specific time, thereby completing the reaction. After the reaction solution was cooled to a room temperature, if necessary, a 30% NaOH aqueous solution was added thereto, thereby adjusting the pH. As a result, an aqueous solution of a polymer was obtained.

The obtained polymer was the following mixture: a polymer segment was bonded to each end of the polyalkylene glycol chain (1) with a sulfur atom-containing group therebetween; such a polymer segment mainly included a polymer (1) containing a carboxyl group derived from an unsaturated carboxylic acid monomer (methacrylic acid) and the polyalkylene glycol chain (2) derived from an unsaturated polyalkylene glycol monomer (methoxypolyethylene glycol methacrylate); and a small amount of a polymer (3) repeatedly including the constitutional units of the polymer (1) was included.

Examples L1 to L111

Polymers were produced under the polymerization conditions shown in Tables 7-1 to 7-5 and 8-1 to 8-5. Analysis results of each polymer are as shown in Tables 7-1 and 7-5.

In these Examples, the proportion of each polymer is expressed by a mass ratio on the SAA basis (in the case where the unsaturated carboxylic acid monomer is completely neutralized with NaOH). The total proportion of the thiol-modified monomer and that of the thiol-modified monomer mixture are not 100% because they are calculated at the outer ratio.

TABLE 7-1

| | | PAG thiol | | PEG | | Initiator mol % relative | Proportion (wt) | | | | Reaction time Monomer dropwise addition/ initiator dropwise |
|---|---|---|---|---|---|---|---|---|---|---|---|
| | Production method | Kind | EO mol | monomer Kind | Initiator Kind | to monomer | SAA | IPN-50 | PAG thiol | Temperature/ °C. | addition/ Maturing time |
| Example L1 | I-2 | T-1 | 95.0 | IPN-50 | V-50 | 0.20% | 7.5 | 92.5 | 10 | 58 | 3/3.5/1 |
| Example L2 | I-2 | T-1 | 95.0 | IPN-50 | V-50 | 0.20% | 7.5 | 92.5 | 2.5 | 70 | 3/3.5/1 |
| Example L3 | I-2 | T-1 | 95.0 | IPN-50 | V-50 | 0.20% | 7.5 | 92.5 | 5 | 70 | 3/3.5/1 |
| Example L4 | I-2 | T-1 | 95.0 | IPN-50 | V-50 | 0.20% | 7.5 | 92.5 | 10 | 70 | 3/3.5/1 |
| Example L5 | I-2 | T-1 | 95.0 | IPN-50 | V-50 | 0.20% | 7.5 | 92.5 | 10 | 70 | 4/4.5/1 |
| Example L6 | I-2 | T-1 | 95.0 | IPN-50 | V-50 | 0.20% | 7.5 | 92.5 | 10 | 80 | 3/3.5/1 |
| Example L7 | I-1 | T-8 | 276.3 | IPN-50 | V-50 | 0.10% | 7.5 | 92.5 | 5 | 70 | 3/3.5/1 |
| Example L8 | I-1 | T-8 | 276.3 | IPN-50 | V-50 | 0.20% | 7.5 | 92.5 | 5 | 70 | 3/3.5/1 |
| Example L9 | I-1 | T-8 | 276.3 | IPN-50 | V-50 | 0.30% | 7.5 | 92.5 | 5 | 70 | 3/3.5/1 |
| Example L10 | I-1 | T-8 | 276.3 | IPN-50 | V-50 | 0.30% | 7.5 | 92.5 | 2.5 | 70 | 3/3.5/1 |
| Example L11 | I-1 | T-8 | 276.3 | IPN-50 | V-50 | 0.30% | 7.5 | 92.5 | 7.5 | 70 | 3/3.5/1 |
| Example L12 | I-1 | T-8 | 276.3 | IPN-50 | V-50 | 0.30% | 10 | 90 | 2.5 | 70 | 3/3.5/1 |
| Example L13 | I-1 | T-8 | 276.3 | IPN-50 | V-50 | 0.30% | 10 | 90 | 5 | 70 | 3/3.5/1 |
| Example L14 | I-1 | T-8 | 276.3 | IPN-50 | V-50 | 0.30% | 10 | 90 | 7.5 | 70 | 3/3.5/1 |
| Example L15 | I-1 | T-8 | 276.3 | IPN-50 | V-50 | 0.30% | 12.5 | 87.5 | 5 | 70 | 3/3.5/1 |
| Example L16 | I-1 | T-8 | 276.3 | IPN-50 | V-50 | 0.30% | 12.5 | 87.5 | 7.5 | 70 | 3/3.5/1 |
| Example L17 | I-1 | T-8 | 276.3 | IPN-50 | V-50 | 0.50% | 7.5 | 92.5 | 5 | 70 | 3/3.5/1 |
| Example L18 | I-1 | T-10 | 181.8 | IPN-50 | V-50 | 0.20% | 7.5 | 92.5 | 1.5 | 70 | 3/3.5/1 |
| Example L19 | I-1 | T-10 | 181.8 | IPN-50 | V-50 | 0.20% | 7.5 | 92.5 | 2.5 | 70 | 3/3.5/1 |
| Example L20 | I-1 | T-10 | 181.8 | IPN-50 | V-50 | 0.20% | 7.5 | 92.5 | 5 | 70 | 3/3.5/1 |
| Example L21 | I-1 | T-10 | 181.8 | IPN-50 | V-50 | 0.20% | 7.78 | 92.22 | 2.6 | 70 | 3/3.5/1 |
| Example L22 | I-1 | T-10 | 181.8 | IPN-50 | V-50 | 0.50% | 7.78 | 92.22 | 2.6 | 70 | 3/3.5/1 |
| Example L23 | I-1 | T-10 | 181.8 | IPN-50 | V-50 | 0.20% | 8.012 | 91.988 | 2.5 | 70 | 3/3.5/1 |
| Example L24 | I-1 | T-10 | 181.8 | IPN-50 | V-50 | 0.50% | 8.012 | 91.988 | 2.5 | 70 | 3/3.5/1 |
| Example L25 | I-1 | T-10 | 181.8 | IPN-50 | V-50 | 0.75% | 8.012 | 91.988 | 2.5 | 70 | 3/3.5/1 |

| | | Analysis result of polymer | | | | |
|---|---|---|---|---|---|---|
| | Polymer No. | GPC | | | | Polymer Calculation |
| | | Mw | Mp | Mn | Pure content | method |
| Example L1 | I-1 | 25546 | 22492 | 17927 | 60.1% | G-4 |
| Example L2 | I-5 | 45812 | 49580 | 29101 | 75.8% | G-4 |
| Example L3 | I-6 | 33794 | 34179 | 23014 | 73.1% | G-4 |
| Example L4 | I-2 | 23590 | 22896 | 17461 | 69.8% | G-4 |
| Example L5 | I-4 | 23890 | 23184 | 17627 | 70.8% | G-4 |
| Example L6 | I-3 | 21880 | 21160 | 16399 | 69.5% | G-4 |
| Example L7 | I-7 | 66474 | 71487 | 39399 | 69.7% | G-4 |
| Example L8 | I-8 | 64386 | 69953 | 37444 | 75.2% | G-4 |
| Example L9 | I-9 | 61904 | 67748 | 36078 | 77.9% | G-4 |
| Example L10 | I-10 | 72040 | 80698 | 39984 | 78.2% | G-4 |
| Example L11 | I-11 | 57098 | 60549 | 34222 | 77.2% | G-4 |
| Example L12 | I-12 | 88973 | 99249 | 43838 | 84.5% | G-4 |
| Example L13 | I-13 | 80123 | 88008 | 41292 | 84.6% | G-4 |
| Example L14 | I-14 | 71205 | 77359 | 38223 | 84.2% | G-4 |
| Example L15 | I-15 | 95880 | 104806 | 45084 | 87.7% | G-4 |

TABLE 7-1-continued

|  | | | | | | |
|---|---|---|---|---|---|---|
| Example L16 | I-16 | 81947 | 88463 | 40289 | 87.5% | G-4 |
| Example L17 | I-19 | 70562 | 80354 | 37162 | 80.1% | G-4 |
| Example L18 | I-38 | 71058 | 76759 | 40037 | 75.7% | G-4 |
| Example L19 | I-39 | 61029 | 65639 | 36139 | 76.3% | G-4 |
| Example L20 | I-40 | 50223 | 53751 | 31374 | 75.8% | G-4 |
| Example L21 | I-30 | 63831 | 68406 | 37772 | 77.0% | G-4 |
| Example L22 | I-32 | 56723 | 61160 | 33175 | 80.9% | G-4 |
| Example L23 | I-34 | 64682 | 68874 | 37788 | 77.4% | G-4 |
| Example L24 | I-35 | 56244 | 60694 | 32583 | 82.6% | G-4 |
| Example L25 | I-36 | 52076 | 58491 | 30487 | 83.4% | G-4 |

TABLE 7-2

| | Polymerization conditions | | | | | | | | | |
|---|---|---|---|---|---|---|---|---|---|---|
| | Production method | PAG thiol Kind | EO mol | PEG monomer Kind | Initiator Kind | Initiator mol % relative to monomer | Proportion (wt) SAA | IPN-50 | PAG thiol | Temperature/ °C. |
| Example L26 | I-1 | T-10 | 181.8 | IPN-50 | V-50 | 0.20% | 8.012 | 91.988 | 5.353 | 50 |
| Example L27 | I-1 | T-10 | 181.8 | IPN-50 | V-50 | 0.50% | 8.012 | 91.988 | 5.353 | 50 |
| Example L28 | I-1 | T-10 | 181.8 | IPN-50 | V-50 | 1.00% | 8.012 | 91.988 | 5.353 | 50 |
| Example L29 | I-1 | T-10 | 181.8 | IPN-50 | V-50 | 2.00% | 8.012 | 91.988 | 5.353 | 50 |
| Example L30 | I-1 | T-10 | 181.8 | IPN-50 | V-50 | 0.20% | 8.012 | 91.988 | 5.353 | 58 |
| Example L31 | I-1 | T-10 | 181.8 | IPN-50 | V-50 | 0.50% | 8.012 | 91.988 | 5.353 | 58 |
| Example L32 | I-1 | T-10 | 181.8 | IPN-50 | V-50 | 0.75% | 8.012 | 91.988 | 5.353 | 58 |
| Example L33 | I-1 | T-10 | 181.8 | IPN-50 | V-50 | 1.00% | 8.012 | 91.988 | 5.353 | 58 |
| Example L34 | I-1 | T-10 | 181.8 | IPN-50 | V-50 | 0.20% | 8.012 | 91.988 | 5.353 | 58 |
| Example L35 | I-1 | T-10 | 181.8 | IPN-50 | V-50 | 0.50% | 8.012 | 91.988 | 5.353 | 58 |
| Example L36 | I-1 | T-10 | 181.8 | IPN-50 | V-50 | 0.75% | 8.012 | 91.988 | 5.353 | 58 |
| Example L37 | I-1 | T-10 | 181.8 | IPN-50 | V-50 | 1.00% | 8.012 | 91.988 | 5.353 | 58 |
| Example L38 | I-1 | T-10 | 181.8 | IPN-50 | V-50 | 0.20% | 8.012 | 91.988 | 5.353 | 65 |
| Example L39 | I-1 | T-10 | 181.8 | IPN-50 | V-50 | 0.10% | 8.012 | 91.988 | 5.353 | 70 |
| Example L40 | I-1 | T-10 | 181.8 | IPN-50 | V-50 | 0.20% | 8.012 | 91.988 | 5.353 | 70 |
| Example L41 | I-1 | T-10 | 181.8 | IPN-50 | V-50 | 0.30% | 8.012 | 91.988 | 5.353 | 70 |
| Example L42 | I-1 | T-10 | 181.8 | IPN-50 | V-50 | 0.50% | 8.012 | 91.988 | 5.353 | 70 |
| Example L43 | I-1 | T-10 | 181.8 | IPN-50 | V-50 | 0.75% | 8.012 | 91.988 | 5.353 | 70 |
| Example L44 | I-1 | T-10 | 181.8 | IPN-50 | V-50 | 1.00% | 8.012 | 91.988 | 5.353 | 70 |
| Example L45 | I-1 | T-10 | 181.8 | IPN-50 | V-50 | 0.20% | 8.012 | 91.988 | 5.353 | 80 |
| Example L46 | I-1 | T-10 | 181.8 | IPN-50 | V-50 | 0.20% | 8.21 | 91.79 | 8.23 | 70 |

| | Polymerization conditions Reaction time Monomer dropwise addition/ Initiator dropwise addition/ Maturing time | Analysis result of polymer | | | | | |
|---|---|---|---|---|---|---|---|
| | | Polymer No. | GPC Mw | Mp | Mn | Polymer Pure content | Calculation method |
| Example L26 | 3/3.5/1 | I-50 | 75490 | 60823 | 38860 | 44.9% | G-4 |
| Example L27 | 3/3.5/1 | I-51 | 73146 | 71482 | 43177 | 66.2% | G-4 |
| Example L28 | 3/3.5/1 | I-52 | 71677 | 72152 | 43497 | 72.2% | G-4 |
| Example L29 | 3/3.5/1 | I-53 | 66300 | 68923 | 41107 | 80.2% | G-4 |
| Example L30 | 3/3.5/1 | I-42 | 67452 | 67361 | 40557 | 66.9% | G-4 |
| Example L31 | 3/3.5/1 | I-43 | 62490 | 64736 | 38459 | 77.3% | G-4 |
| Example L32 | 3/3.5/1 | I-46 | 62215 | 64575 | 38333 | 79.2% | G-4 |
| Example L33 | 3/3.5/1 | I-48 | 60000 | 62836 | 36838 | 80.5% | G-4 |
| Example L34 | 4/4.5/1 | I-44 | 65003 | 66849 | 40013 | 70.9% | G-4 |
| Example L35 | 4/4.5/1 | I-45 | 59529 | 62451 | 36695 | 79.0% | G-4 |
| Example L36 | 4/4.5/1 | I-47 | 59432 | 62838 | 36358 | 81.9% | G-4 |
| Example L37 | 4/4.5/1 | I-49 | 56457 | 60347 | 34389 | 82.8% | G-4 |
| Example L38 | 3/3.5/1 | I-27 | 56198 | 59532 | 34809 | 73.9% | G-4 |
| Example L39 | 3/3.5/1 | I-21 | 54357 | 56931 | 33041 | 69.8% | G-4 |
| Example L40 | 3/3.5/1 | I-22 | 50310 | 55644 | 31560 | 76.2% | G-4 |
| Example L41 | 3/3.5/1 | I-23 | 50146 | 53444 | 31535 | 78.1% | G-4 |
| Example L42 | 3/3.5/1 | I-24 | 48251 | 51762 | 29696 | 81.1% | G-4 |
| Example L43 | 3/3.5/1 | I-28 | 44256 | 47811 | 27298 | 82.9% | G-4 |
| Example L44 | 3/3.5/1 | I-29 | 42655 | 45966 | 26362 | 83.7% | G-4 |
| Example L45 | 3/3.5/1 | I-26 | 40716 | 42677 | 26053 | 77.1% | G-4 |
| Example L46 | 3/3.5/1 | I-31 | 42620 | 43655 | 27548 | 77.3% | G-4 |

TABLE 7-3

| | Polymerization conditions | | | | | | | | | |
|---|---|---|---|---|---|---|---|---|---|---|
| | | PAG thiol | PEG | | Initiator mol % relative | Proportion (wt) | | | |
| | Production method | Kind | EO mol | monomer Kind | Initiator Kind | to monomer | SAA | IPN-50 | PAG thiol | Temperature/ °C. |
| Example L47 | I-1 | T-11 | 186.6 | IPN-50 | V-50 | 0.50% | 7.5 | 92.5 | 2.5 | 58 |
| Example L48 | I-1 | T-11 | 186.6 | IPN-50 | V-50 | 0.50% | 7.5 | 92.5 | 5 | 58 |
| Example L49 | I-1 | T-11 | 186.6 | IPN-50 | V-50 | 0.50% | 7.5 | 92.5 | 10 | 58 |
| Example L50 | I-1 | T-11 | 186.6 | IPN-50 | V-50 | 0.50% | 7.5 | 92.5 | 15 | 58 |
| Example L51 | I-1 | T-11 | 186.6 | IPN-50 | V-50 | 0.50% | 10 | 90 | 5 | 58 |
| Example L52 | I-1 | T-11 | 186.6 | IPN-50 | V-50 | 0.50% | 10 | 90 | 10 | 58 |
| Example L53 | I-1 | T-11 | 186.6 | IPN-50 | V-50 | 0.50% | 10 | 90 | 15 | 58 |
| Example L54 | I-1 | T-11 | 186.6 | IPN-50 | V-50 | 0.50% | 12.5 | 87.5 | 5 | 58 |
| Example L55 | I-1 | T-11 | 186.6 | IPN-50 | V-50 | 0.50% | 12.5 | 87.5 | 10 | 58 |
| Example L56 | I-1 | T-11 | 186.6 | IPN-50 | V-50 | 0.50% | 12.5 | 87.5 | 15 | 58 |
| Example L57 | I-1 | T-11 | 186.6 | IPN-50 | V-50 | 0.50% | 12.5 | 87.5 | 20 | 58 |
| Example L58 | I-1 | T-11 | 186.6 | IPN-50 | V-50 | 0.20% | 12.5 | 87.5 | 5 | 58 |
| Example L59 | I-1 | T-11 | 186.6 | IPN-50 | V-50 | 0.20% | 12.5 | 87.5 | 7.5 | 58 |
| Example L60 | I-1 | T-11 | 186.6 | IPN-50 | V-50 | 0.20% | 12.5 | 87.5 | 10 | 58 |
| Example L61 | I-1 | T-11 | 186.6 | IPN-50 | V-50 | 0.50% | 15 | 85 | 2.5 | 58 |
| Example L62 | I-1 | T-11 | 186.6 | IPN-50 | V-50 | 0.50% | 15 | 85 | 5 | 58 |
| Example L63 | I-1 | T-11 | 186.6 | IPN-50 | V-50 | 0.50% | 15 | 85 | 10 | 58 |
| Example L64 | I-1 | T-11 | 186.6 | IPN-50 | V-50 | 0.50% | 15 | 85 | 15 | 58 |
| Example L65 | I-1 | T-11 | 186.6 | IPN-50 | V-50 | 0.50% | 15 | 85 | 20 | 58 |
| Example L66 | I-1 | T-11 | 186.6 | IPN-50 | V-50 | 0.20% | 12.5 | 87.5 | 2.5 | 70 |
| Example L67 | I-1 | T-11 | 186.6 | IPN-50 | V-50 | 0.20% | 12.5 | 87.5 | 5 | 70 |
| Example L68 | I-1 | T-11 | 186.6 | IPN-50 | V-50 | 0.20% | 12.5 | 87.5 | 7.5 | 70 |
| Example L69 | I-1 | T-11 | 186.6 | IPN-50 | V-50 | 0.20% | 12.5 | 87.5 | 10 | 70 |
| Example L70 | I-1 | T-15 | 286.4 | IPN-50 | V-50 | 0.20% | 7.5 | 92.5 | 5 | 70 |
| Example L71 | I-1 | T-15 | 286.4 | IPN-50 | V-50 | 0.20% | 7.5 | 92.5 | 10 | 70 |

| | Polymerization conditions Reaction time Monomer dropwise addition/ Initiator dropwise addition/ Maturing time | Analysis result of polymer | | | | | |
|---|---|---|---|---|---|---|---|
| | | Polymer No. | GPC | | | Polymer Pure content | Calculation method |
| | | | Mw | Mp | Mn | | |
| Example L47 | 4/4.5/1 | I-54 | 83558 | 87434 | 48405 | 76.4% | G-4 |
| Example L48 | 4/4.5/1 | I-55 | 62181 | 62407 | 37931 | 77.4% | G-4 |
| Example L49 | 4/4.5/1 | I-56 | 44759 | 45071 | 29632 | 77.1% | G-4 |
| Example L50 | 4/4.5/1 | I-57 | 36414 | 34271 | 25062 | 75.9% | G-4 |
| Example L51 | 4/4.5/1 | I-63 | 74229 | 77126 | 41895 | 84.5% | G-4 |
| Example L52 | 4/4.5/1 | I-64 | 51177 | 52104 | 32133 | 84.4% | G-4 |
| Example L53 | 4/4.5/1 | I-65 | 40137 | 37731 | 26863 | 83.7% | G-4 |
| Example L54 | 4/4.5/1 | I-66 | 82219 | 85831 | 44360 | 88.3% | G-4 |
| Example L55 | 4/4.5/1 | I-67 | 54617 | 57777 | 33400 | 87.6% | G-4 |
| Example L56 | 4/4.5/1 | I-68 | 42265 | 41783 | 27440 | 87.4% | G-4 |
| Example L57 | 4/4.5/1 | I-69 | 35526 | 34045 | 24298 | 87.1% | G-4 |
| Example L58 | 4/4.5/1 | I-74 | 85273 | 88000 | 31246 | 84.6% | G-4 |
| Example L59 | 4/4.5/1 | I-76 | 65112 | 67907 | 38616 | 84.5% | G-4 |
| Example L60 | 4/4.5/1 | I-75 | 56930 | 59073 | 35256 | 82.8% | G-4 |
| Example L61 | 4/4.5/1 | I-58 | 140345 | 168206 | 62373 | 89.9% | G-4 |
| Example L62 | 4/4.5/1 | I-59 | 98724 | 102843 | 48312 | 89.9% | G-4 |
| Example L63 | 4/4.5/1 | I-60 | 62853 | 65442 | 35664 | 89.8% | G-4 |
| Example L64 | 4/4.5/1 | I-61 | 47226 | 47466 | 29308 | 89.6% | G-4 |
| Example L65 | 4/4.5/1 | I-70 | 37368 | 35688 | 24856 | 89.4% | G-4 |
| Example L66 | 3/3.5/1 | I-71 | 98676 | 103812 | 47305 | 87.2% | G-4 |
| Example L67 | 3/3.5/1 | I-72 | 73755 | 77782 | 38539 | 87.2% | G-4 |
| Example L68 | 3/3.5/1 | I-77 | 59644 | 62412 | 33834 | 86.9% | G-4 |
| Example L69 | 3/3.5/1 | I-73 | 52595 | 55145 | 31246 | 86.5% | G-4 |
| Example L70 | 3/3.5/1 | I-81 | 62475 | 68603 | 36324 | 75.3% | G-4 |
| Example L71 | 3/3.5/1 | I-82 | 50939 | 52107 | 31612 | 74.6% | G-4 |

TABLE 7-4

| | Polymerization conditions | | | | | | | | | |
|---|---|---|---|---|---|---|---|---|---|---|
| | | PAG thiol | | PEG | | Initiator mol % relative | Proportion (wt) | | | |
| | Production method | Kind | EO mol | monomer Kind | Initiator Kind | to monomer | SAA | IPN-50 | PAG thiol | Temperature/ °C. |
| Example L72 | I-1 | T-15 | 286.4 | IPN-50 | V-50 | 0.20% | 7.5 | 92.5 | 15 | 70 |
| Example L73 | I-1 | T-15 | 286.4 | IPN-50 | V-50 | 0.20% | 10 | 90 | 5 | 70 |
| Example L74 | I-1 | T-15 | 286.4 | IPN-50 | V-50 | 0.20% | 10 | 90 | 7.5 | 70 |
| Example L75 | I-1 | T-15 | 286.4 | IPN-50 | V-50 | 0.20% | 10 | 90 | 10 | 70 |
| Example L76 | I-1 | T-15 | 286.4 | IPN-50 | V-50 | 0.20% | 10 | 90 | 15 | 70 |
| Example L77 | I-1 | T-15 | 286.4 | IPN-50 | V-50 | 0.20% | 12.5 | 87.5 | 5 | 70 |
| Example L78 | I-1 | T-15 | 286.4 | IPN-50 | V-50 | 0.20% | 12.5 | 87.5 | 10 | 70 |
| Example L79 | I-1 | T-15 | 286.4 | IPN-50 | V-50 | 0.20% | 12.5 | 87.5 | 15 | 70 |
| Example L80 | I-1 | T-15 | 286.4 | IPN-50 | V-50 | 0.20% | 15 | 85 | 5 | 70 |
| Example L81 | I-1 | T-15 | 286.4 | IPN-50 | V-50 | 0.20% | 15 | 85 | 10 | 70 |
| Example L82 | I-1 | T-15 | 286.4 | IPN-50 | V-50 | 0.20% | 15 | 85 | 15 | 70 |
| Example L83 | I-1 | T-15 | 286.4 | IPN-50 | V-50 | 0.20% | 15 | 85 | 20 | 70 |
| Example L84 | I-1 | T-15 | 286.4 | IPN-50 | V-50 | 0.20% | 15 | 85 | 25 | 70 |
| Example L85 | I-1 | T-15 | 286.4 | IPN-50 | V-50 | 0.20% | 10 | 90 | 5 | 80 |
| Example L86 | I-1 | T-15 | 286.4 | IPN-50 | V-50 | 0.20% | 10 | 90 | 10 | 80 |
| Example L87 | I-1 | T-15 | 286.4 | IPN-50 | V-50 | 0.20% | 10 | 90 | 15 | 80 |
| Example L88 | I-1 | T-15 | 286.4 | IPN-50 | V-50 | 0.20% | 15 | 85 | 15 | 80 |
| Example L89 | I-1 | T-15 | 286.4 | IPN-50 | V-50 | 0.20% | 15 | 85 | 15 | 90 |
| Example L90 | I-1 | T-16 | 240.7 | IPN-50 | V-50 | 0.20% | 10 | 90 | 5 | 80 |
| Example L91 | I-1 | T-16 | 240.7 | IPN-50 | V-50 | 0.20% | 10 | 90 | 10 | 80 |
| Example L92 | I-1 | T-16 | 240.7 | IPN-50 | V-50 | 0.20% | 10 | 90 | 15 | 80 |
| Example L93 | I-1 | T-16 | 240.7 | IPN-50 | V-50 | 0.20% | 12.5 | 87.5 | 5 | 80 |
| Example L94 | I-1 | T-16 | 240.7 | IPN-50 | V-50 | 0.20% | 12.5 | 87.5 | 10 | 80 |
| Example L95 | I-1 | T-16 | 240.7 | IPN-50 | V-50 | 0.20% | 12.5 | 87.5 | 15 | 80 |

| | Polymerization conditions Reaction time Monomer dropwise addition/ Initiator dropwise addition/ Maturing time | Analysis result of polymer | | | | | |
|---|---|---|---|---|---|---|---|
| | | Polymer No. | GPC | | | Polymer Pure content | Calculation method |
| | | | Mw | Mp | Mn | | |
| Example L72 | 3/3.5/1 | I-83 | 44672 | 45514 | 28802 | 75.1% | G-4 |
| Example L73 | 3/3.5/1 | I-90 | 78935 | 86199 | 41767 | 83.2% | G-4 |
| Example L74 | 3/3.5/1 | I-96 | 63912 | 66550 | 35933 | 82.9% | G-4 |
| Example L75 | 3/3.5/1 | I-85 | 58957 | 61132 | 34212 | 82.4% | G-4 |
| Example L76 | 3/3.5/1 | I-86 | 50357 | 49736 | 30921 | 82.1% | G-4 |
| Example L77 | 3/3.5/1 | I-78 | 93458 | 102460 | 46320 | 85.8% | G-4 |
| Example L78 | 3/3.5/1 | I-79 | 70527 | 72070 | 37899 | 86.0% | G-4 |
| Example L79 | 3/3.5/1 | I-80 | 58414 | 58606 | 33316 | 86.3% | G-4 |
| Example L80 | 3/3.5/1 | I-87 | 108798 | 124118 | 50166 | 88.5% | G-4 |
| Example L81 | 3/3.5/1 | I-88 | 81487 | 84164 | 41497 | 88.9% | G-4 |
| Example L82 | 3/3.5/1 | I-91 | 65279 | 68035 | 35857 | 88.5% | G-4 |
| Example L83 | 3/3.5/1 | I-92 | 51614 | 49917 | 30481 | 88.4% | G-4 |
| Example L84 | 3/3.5/1 | I-93 | 45811 | 44366 | 27843 | 88.3% | G-4 |
| Example L85 | 3/3.5/1 | I-97 | 57919 | 64642 | 32306 | 83.3% | G-4 |
| Example L86 | 3/3.5/1 | I-98 | 49814 | 51175 | 29397 | 83.0% | G-4 |
| Example L87 | 3/3.5/1 | I-99 | 44730 | 45973 | 27485 | 82.4% | G-4 |
| Example L88 | 3/3.5/1 | I-95 | 55818 | 55228 | 30216 | 88.3% | G-4 |
| Example L89 | 3/3.5/1 | I-94 | 46072 | 45786 | 25885 | 86.3% | G-4 |
| Example L90 | 3/3.5/1 | I-100 | 54798 | 57726 | 31318 | 82.8% | G-4 |
| Example L91 | 3/3.5/1 | I-101 | 44804 | 45909 | 27199 | 81.8% | G-4 |
| Example L92 | 3/3.5/1 | I-102 | 39234 | 38579 | 25102 | 81.0% | G-4 |
| Example L93 | 3/3.5/1 | I-103 | 66987 | 69165 | 34598 | 86.6% | G-4 |
| Example L94 | 3/3.5/1 | I-104 | 52694 | 53534 | 29511 | 86.0% | G-4 |
| Example L95 | 3/3.5/1 | I-105 | 44821 | 45145 | 26851 | 85.7% | G-4 |

TABLE 7-5

| | Polymerization conditions | | | | | | | | | | |
|---|---|---|---|---|---|---|---|---|---|---|---|
| | | PAG thiol | | PEG | | Initiator mol % relative | Proportion (wt) | | | | |
| | Production method | Kind | EO mol | monomer Kind | Initiator Kind | to monomer | SAA | IPN-50 | PAG thiol | Temperature/ °C. |
| Example L96 | I-1 | T-16 | 240.7 | IPN-50 | V-50 | 0.20% | 10 | 90 | 5 | 80 |
| Example L97 | I-1 | T-16 | 240.7 | IPN-50 | V-50 | 0.20% | 10 | 90 | 5 | 80 |
| Example L98 | I-1 | T-16 | 240.7 | IPN-50 | V-50 | 0.20% | 10 | 90 | 5 | 80 |
| Example L99 | I-1 | T-16 | 240.7 | IPN-50 | V-50 | 0.20% | 10 | 90 | 5 | 80 |
| Example L100 | I-1 | T-15 | 286.4 | IPN-50 | V-50 | 0.20% | 10 | 90 | 5 | 80 |
| Example L101 | I-1 | T-15 | 286.4 | IPN-50 | V-50 | 0.20% | 10 | 90 | 2.5 | 80 |
| Example L102 | I-1 | T-15 | 286.4 | IPN-50 | V-50 | 0.20% | 10 | 90 | 10 | 80 |
| Example L103 | I-1 | T-15 | 286.4 | IPN-50 | V-50 | 0.20% | 7.5 | 92.5 | 5 | 80 |
| Example L104 | I-1 | T-15 | 286.4 | IPN-50 | V-50 | 0.20% | 10 | 90 | 7.5 | 80 |
| Example L105 | I-1 | T-15 | 286.4 | IPN-50 | V-50 | 0.20% | 12.5 | 87.5 | 12.5 | 80 |
| Example L106 | I-1 | T-15 | 286.4 | IPN-50 | V-50 | 0.20% | 15 | 85 | 15 | 80 |
| Example L107 | I-1 | T-15 | 286.4 | IPN-50 | V-50 | 0.20% | 7.5 | 92.5 | 3.5 | 80 |
| Example L108 | I-1 | T-15 | 286.4 | IPN-50 | V-50 | 0.20% | 12.5 | 87.5 | 15 | 80 |
| Example L109 | I-1 | T-11 | 186.6 | IPN-50 | V-50 | 0.20% | 12.5 | 87.5 | 15 | 80 |
| Example L110 | I-1 | T-11 | 186.6 | IPN-50 | V-50 | 0.20% | 7.5 | 92.5 | 10 | 80 |
| Example L111 | I-1 | T-15 | 286.4 | IPN-50 | V-50 | 0.20% | 15 | 85 | 15 | 80 |

| | Polymerization conditions Reaction time Monomer dropwise addition/ Initiator dropwise addition/ Maturing time | Analysis result of polymer | | | | | |
|---|---|---|---|---|---|---|---|
| | | Polymer No. | GPC | | | Polymer Pure content | Calculation method |
| | | | Mw | Mp | Mn | | |
| Example L96 | 3/3.5/1 | I-106 | 58120 | 64038 | 31950 | 83.5% | G-4 |
| Example L97 | 3/3.5/1 | I-107 | 53839 | 56578 | 30662 | 77.6% | G-4 |
| Example L98 | 2.5/2.92/1 | I-108 | 56468 | 62514 | 32039 | 85.5% | G-4 |
| Example L99 | 2/2.33/1 | I-109 | 55898 | 61694 | 31510 | 84.7% | G-4 |
| Example L100 | 3/3.5/1 | I-116 | 57625 | 66471 | 25623 | 86.6% | G-3 |
| Example L101 | 3/3.5/1 | I-117 | 63538 | 71199 | 26898 | 86.9% | G-3 |
| Example L102 | 3/3.5/1 | I-118 | 47876 | 50615 | 23397 | 86.2% | G-3 |
| Example L103 | 3/3.5/1 | I-127 | 45768 | 50109 | 23199 | 79.6% | G-3 |
| Example L104 | 3/3.5/1 | I-128 | 51840 | 57435 | 24569 | 84.5% | G-3 |
| Example L105 | 3/3.5/1 | I-129 | 56851 | 63482 | 24888 | 90.7% | G-3 |
| Example L106 | 3/3.5/1 | I-130 | 48430 | 49999 | 23180 | 90.6% | G-3 |
| Example L107 | 3/3.5/1 | I-131 | 45940 | 50553 | 22971 | 81.7% | G-3 |
| Example L108 | 3/3.5/1 | I-132 | 48283 | 49650 | 23413 | 88.2% | G-3 |
| Example L109 | 3/3.5/1 | I-133 | 43179 | 43092 | 24318 | 90.1% | G-3 |
| Example L110 | 3/3.5/1 | I-134 | 46094 | 49234 | 24371 | 76.7% | G-3 |
| Example L111 | 3/3.5/1 | I-135 | 60931 | 64807 | 27631 | 91.5% | G-3 |

TABLE 8-1

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | IPN-50/g | AA/g | Water/g | PAG thiol/g | AA/g | IPN-50/g | Water/g | PAG thiol/g | Water | V-50/g | Water/g |
| Example L1 | 64.09 | 0.12 | 33.08 | — | 3.87 | — | 27.06 | 6.93 | 64.86 | 0.045 | 49.96 |
| Example L2 | 68.86 | 0.12 | 35.54 | — | 4.15 | — | 29.08 | 1.86 | 60.39 | 0.049 | 49.95 |
| Example L3 | 67.19 | 0.12 | 34.68 | — | 4.05 | — | 28.37 | 3.63 | 61.95 | 0.047 | 49.95 |
| Example L4 | 64.09 | 0.12 | 33.08 | — | 3.87 | — | 27.06 | 6.93 | 64.86 | 0.045 | 49.96 |
| Example L5 | 64.09 | 0.12 | 33.08 | — | 3.87 | — | 27.06 | 6.93 | 64.86 | 0.045 | 49.96 |
| Example L6 | 64.09 | 0.12 | 33.08 | — | 3.87 | — | 27.06 | 6.93 | 64.86 | 0.045 | 49.96 |
| Example L7 | 197.10 | 0.36 | 101.72 | 10.65 | 11.89 | — | 48.28 | — | — | 0.069 | 29.93 |
| Example L8 | 197.10 | 0.36 | 101.72 | 10.65 | 11.89 | — | 48.28 | — | — | 0.139 | 29.86 |
| Example L9 | 197.10 | 0.36 | 101.72 | 10.65 | 11.89 | — | 48.28 | — | — | 0.208 | 29.79 |
| Example L10 | 201.99 | 0.37 | 104.24 | 5.46 | 12.18 | — | 45.76 | — | — | 0.213 | 29.79 |
| Example L11 | 192.44 | 0.35 | 99.32 | 15.60 | 11.61 | — | 50.69 | — | — | 0.203 | 29.80 |

TABLE 8-1-continued

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | | | | PAG | | | | PAG | | | |
| | IPN-50/g | AA/g | Water/g | thiol/g | AA/g | IPN-50/g | Water/g | thiol/g | Water | V-50/g | Water/g |
| Example L12 | 197.68 | 0.36 | 102.02 | 5.49 | 16.47 | — | 47.98 | — | — | 0.260 | 29.74 |
| Example L13 | 192.86 | 0.35 | 99.53 | 10.72 | 16.07 | — | 50.47 | — | — | 0.254 | 29.75 |
| Example L14 | 188.28 | 0.34 | 97.17 | 15.69 | 15.69 | — | 52.83 | — | — | 0.248 | 29.75 |
| Example L15 | 188.58 | 0.34 | 97.32 | 10.78 | 20.30 | — | 52.68 | — | — | 0.300 | 29.70 |
| Example L16 | 184.07 | 0.33 | 95.00 | 15.78 | 19.82 | — | 55.00 | — | — | 0.293 | 29.71 |
| Example L17 | 197.10 | 0.36 | 101.72 | 10.65 | 11.89 | — | 48.28 | — | — | 0.347 | 29.65 |
| Example L18 | 115.92 | — | 59.72 | 1.88 | 7.20 | — | 27.78 | — | — | 0.082 | 37.42 |
| Example L19 | 114.77 | — | 59.12 | 3.10 | 7.13 | — | 28.38 | — | — | 0.081 | 37.42 |
| Example L20 | 111.99 | — | 57.69 | 6.05 | 6.96 | — | 29.81 | — | — | 0.079 | 37.42 |
| Example L21 | 114.77 | 0.21 | 59.23 | 3.23 | 7.21 | — | 27.84 | — | — | 0.081 | 37.42 |
| Example L22 | 114.77 | 0.21 | 59.23 | 3.23 | 7.21 | — | 27.84 | — | — | 0.202 | 37.30 |
| Example L23 | 109.34 | 0.20 | 56.43 | 9.80 | 7.29 | — | 29.44 | — | — | 0.084 | 37.42 |
| Example L24 | 109.34 | 0.20 | 56.43 | 9.80 | 7.29 | — | 29.44 | — | — | 0.211 | 37.29 |
| Example L25 | 109.34 | 0.20 | 56.43 | 9.80 | 7.29 | — | 29.44 | — | — | 0.317 | 37.18 |

TABLE 8-2

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | | | | PAG | | | | PAG | | | |
| | IPN-50/g | AA/g | Water/g | thiol/g | AA/g | IPN-50/g | Water/g | thiol/g | Water | V-50/g | Water/g |
| Example L26 | 111.99 | 0.20 | 57.80 | 6.52 | 7.27 | — | 28.72 | — | — | 0.082 | 37.42 |
| Example L27 | 111.99 | 0.20 | 57.80 | 6.52 | 7.27 | — | 28.72 | — | — | 0.205 | 37.30 |
| Example L28 | 111.99 | 0.20 | 57.80 | 6.52 | 7.27 | — | 28.72 | — | — | 0.411 | 37.09 |
| Example L29 | 111.99 | 0.20 | 57.80 | 6.52 | 7.27 | — | 28.72 | — | — | 0.822 | 36.68 |
| Example L30 | 111.99 | 0.20 | 57.80 | 6.52 | 7.27 | — | 28.72 | — | — | 0.082 | 37.42 |
| Example L31 | 111.99 | 0.20 | 57.80 | 6.52 | 7.27 | — | 28.72 | — | — | 0.205 | 37.30 |
| Example L32 | 111.99 | 0.20 | 57.80 | 6.52 | 7.27 | — | 28.72 | — | — | 0.308 | 37.19 |
| Example L33 | 111.99 | 0.20 | 57.80 | 6.52 | 7.27 | — | 28.72 | — | — | 0.411 | 37.09 |
| Example L34 | 111.99 | 0.20 | 57.80 | 6.52 | 7.27 | — | 28.72 | — | — | 0.082 | 37.42 |
| Example L35 | 111.99 | 0.20 | 57.80 | 6.52 | 7.27 | — | 28.72 | — | — | 0.205 | 37.30 |
| Example L36 | 111.99 | 0.20 | 57.80 | 6.52 | 7.27 | — | 28.72 | — | — | 0.308 | 37.19 |
| Example L37 | 111.99 | 0.20 | 57.80 | 6.52 | 7.27 | — | 28.72 | — | — | 0.411 | 37.09 |
| Example L38 | 111.99 | 0.20 | 57.80 | 6.52 | 7.27 | — | 28.72 | — | — | 0.039 | 37.46 |
| Example L39 | 111.99 | 0.20 | 57.80 | 6.52 | 7.27 | — | 28.72 | — | — | 0.039 | 37.46 |
| Example L40 | 111.99 | 0.20 | 57.80 | 6.52 | 7.27 | — | 28.72 | — | — | 0.039 | 37.46 |
| Example L41 | 111.99 | 0.20 | 57.80 | 6.52 | 7.27 | — | 28.72 | — | — | 0.039 | 37.46 |
| Example L42 | 111.99 | 0.20 | 57.80 | 6.52 | 7.27 | — | 28.72 | — | — | 0.039 | 37.46 |
| Example L43 | 111.99 | 0.20 | 57.80 | 6.52 | 7.27 | — | 28.72 | — | — | 0.039 | 37.46 |
| Example L44 | 111.99 | 0.20 | 57.80 | 6.52 | 7.27 | — | 28.72 | — | — | 0.039 | 37.46 |
| Example L45 | 111.99 | 0.20 | 57.80 | 6.52 | 7.27 | — | 28.72 | — | — | 0.039 | 37.46 |
| Example L46 | 109.34 | 0.20 | 56.43 | 9.80 | 7.29 | — | 29.44 | — | — | 0.077 | 37.42 |

TABLE 8-3

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | | | | PAG | | | | PAG | | | |
| | IPN-50/g | AA/g | Water/g | thiol/g | AA/g | IPN-50/g | Water/g | thiol/g | Water | V-50/g | Water/g |
| Example L47 | 114.77 | — | 59.12 | 3.10 | 7.13 | — | 28.38 | — | — | 0.202 | 37.30 |
| Example L48 | 111.99 | — | 57.69 | 6.05 | 6.96 | — | 29.81 | — | — | 0.197 | 37.30 |
| Example L49 | 106.82 | — | 55.03 | 11.55 | 6.64 | — | 32.47 | — | — | 0.188 | 37.31 |
| Example L50 | 102.10 | — | 52.60 | 16.56 | 6.34 | — | 34.90 | — | — | 0.180 | 37.32 |

TABLE 8-3-continued

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | | | | PAG | | | | PAG | | | |
| | IPN-50/g | AA/g | Water/g | thiol/g | AA/g | IPN-50/g | Water/g | thiol/g | Water | V-50/g | Water/g |
| Example L51 | 109.58 | — | 56.45 | 6.09 | 9.33 | — | 31.05 | — | — | 0.240 | 37.26 |
| Example L52 | 104.49 | — | 53.83 | 11.61 | 8.90 | — | 33.67 | — | — | 0.229 | 37.27 |
| Example L53 | 99.86 | — | 51.44 | 16.64 | 8.50 | — | 36.06 | — | — | 0.219 | 37.28 |
| Example L54 | 107.15 | — | 55.20 | 6.12 | 11.73 | — | 32.30 | — | — | 0.284 | 37.22 |
| Example L55 | 102.15 | — | 52.62 | 11.67 | 11.18 | — | 34.88 | — | — | 0.271 | 37.23 |
| Example L56 | 97.59 | — | 50.27 | 16.73 | 10.68 | — | 37.23 | — | — | 0.259 | 37.24 |
| Example L57 | 93.42 | — | 48.13 | 21.35 | 10.23 | — | 39.37 | — | — | 0.248 | 37.25 |
| Example L58 | 107.15 | — | 55.20 | 6.12 | 11.73 | — | 32.30 | — | — | 0.114 | 37.39 |
| Example L59 | 104.59 | — | 53.88 | 8.97 | 11.45 | — | 33.62 | — | — | 0.111 | 37.39 |
| Example L60 | 102.15 | — | 52.62 | 11.67 | 11.18 | — | 34.88 | — | — | 0.108 | 37.39 |
| Example L61 | 107.33 | — | 55.29 | 3.16 | 14.51 | — | 32.21 | — | — | 0.337 | 37.16 |
| Example L62 | 104.69 | — | 53.93 | 6.16 | 14.16 | — | 33.57 | — | — | 0.328 | 37.17 |
| Example L63 | 99.77 | — | 51.40 | 11.74 | 13.49 | — | 36.10 | — | — | 0.313 | 37.19 |
| Example L64 | 95.30 | — | 49.09 | 16.82 | 12.89 | — | 38.41 | — | — | 0.299 | 37.20 |
| Example L65 | 91.21 | — | 46.99 | 21.46 | 12.33 | — | 40.52 | — | — | 0.286 | 37.21 |
| Example L66 | 109.84 | — | 56.58 | 3.14 | 12.02 | — | 30.92 | — | — | 0.117 | 37.38 |
| Example L67 | 107.15 | — | 55.20 | 6.12 | 11.73 | — | 32.30 | — | — | 0.114 | 37.39 |
| Example L68 | 104.59 | — | 53.88 | 8.97 | 11.45 | — | 33.62 | — | — | 0.111 | 37.39 |
| Example L69 | 102.15 | — | 52.62 | 11.67 | 11.18 | — | 34.88 | — | — | 0.108 | 37.39 |
| Example L70 | 111.99 | — | 57.69 | 6.05 | 6.96 | — | 29.81 | — | — | 0.079 | 37.42 |
| Example L71 | 106.82 | — | 55.03 | 11.55 | 6.64 | — | 32.47 | — | — | 0.075 | 37.43 |

TABLE 8-4

| | Charged amount | | | | | | | | | | |
|---|---|---|---|---|---|---|---|---|---|---|---|
| | Charged into reactor | | | Dropwise-added monomer | | | | Dropwise-added transfer agent | | Dropwise-added initiator | |
| | | | | PAG | | | | PAG | | | |
| | IPN-50/g | AA/g | Water/g | thiol/g | AA/g | IPN-50/g | Water/g | thiol/g | Water | V-50/g | Water/g |
| Example L72 | 102.10 | — | 52.60 | 16.56 | 6.34 | — | 34.90 | — | — | 0.072 | 37.43 |
| Example L73 | 109.58 | — | 56.45 | 6.09 | 9.33 | — | 31.05 | — | — | 0.096 | 37.40 |
| Example L74 | 106.98 | — | 55.11 | 8.91 | 9.11 | — | 32.39 | — | — | 0.094 | 37.41 |
| Example L75 | 104.49 | — | 53.83 | 11.61 | 8.90 | — | 33.67 | — | — | 0.092 | 37.41 |
| Example L76 | 99.86 | — | 51.44 | 16.64 | 8.50 | — | 36.06 | — | — | 0.088 | 37.41 |
| Example L77 | 107.15 | — | 55.20 | 6.12 | 11.73 | — | 32.30 | — | — | 0.114 | 37.39 |
| Example L78 | 102.15 | — | 52.62 | 11.67 | 11.18 | — | 34.88 | — | — | 0.108 | 37.39 |
| Example L79 | 97.59 | — | 50.27 | 16.73 | 10.68 | — | 37.23 | — | — | 0.104 | 37.40 |
| Example L80 | 104.69 | — | 53.93 | 6.16 | 14.16 | — | 33.57 | — | — | 0.131 | 37.37 |
| Example L81 | 99.77 | — | 51.40 | 11.74 | 13.49 | — | 36.10 | — | — | 0.125 | 37.38 |
| Example L82 | 95.30 | — | 49.09 | 16.82 | 12.89 | — | 38.41 | — | — | 0.120 | 37.38 |
| Example L83 | 91.21 | — | 46.99 | 21.46 | 12.33 | — | 40.52 | — | — | 0.114 | 37.39 |
| Example L84 | 87.45 | — | 45.05 | 25.72 | 11.83 | — | 42.45 | — | — | 0.110 | 37.39 |
| Example L85 | 109.58 | — | 56.45 | 6.09 | 9.33 | — | 31.05 | — | — | 0.096 | 37.40 |
| Example L86 | 104.49 | — | 53.83 | 11.61 | 8.90 | — | 33.67 | — | — | 0.092 | 37.41 |
| Example L87 | 99.86 | — | 51.44 | 16.64 | 8.50 | — | 36.06 | — | — | 0.088 | 37.41 |
| Example L88 | 95.30 | — | 49.09 | 16.82 | 12.89 | — | 38.41 | — | — | 0.120 | 37.38 |
| Example L89 | 95.30 | — | 49.09 | 16.82 | 12.89 | — | 38.41 | — | — | 0.120 | 37.38 |
| Example L90 | 109.58 | — | 56.45 | 6.09 | 9.33 | — | 31.05 | — | — | 0.096 | 37.40 |
| Example L91 | 104.49 | — | 53.83 | 11.61 | 8.90 | — | 33.67 | — | — | 0.092 | 37.41 |
| Example L92 | 99.86 | — | 51.44 | 16.64 | 8.50 | — | 36.06 | — | — | 0.088 | 37.41 |
| Example L93 | 107.15 | — | 55.20 | 6.12 | 11.73 | — | 32.30 | — | — | 0.114 | 37.39 |
| Example L94 | 102.15 | — | 52.62 | 11.67 | 11.18 | — | 34.88 | — | — | 0.108 | 37.39 |
| Example L95 | 97.59 | — | 50.27 | 16.73 | 10.68 | — | 37.23 | — | — | 0.104 | 37.40 |

TABLE 8-5

| | Charged amount | | | | | | | | | | |
|---|---|---|---|---|---|---|---|---|---|---|---|
| | Charged into reactor | | | Dropwise-added monomer PAG | | | | Dropwise-added transfer agent PAG | | Dropwise-added initiator | |
| | IPN-50/g | AA/g | Water/g | thiol/g | AA/g | IPN-50/g | Water/g | thiol/g | Water | V-50/g | Water/g |
| Example L96 | 54.79 | 0.00 | 28.23 | 6.09 | 9.33 | 54.79 | 59.27 | 0.00 | 0.00 | 0.0962 | 37.40 |
| Example L97 | 0.00 | 0.00 | 80.00 | 6.23 | 9.55 | 112.21 | 64.00 | 0.00 | 0.00 | 0.0985 | 47.90 |
| Example L98 | 109.58 | 0.00 | 56.45 | 6.09 | 9.33 | 0.00 | 31.05 | 0.00 | 0.00 | 0.0962 | 37.40 |
| Example L99 | 109.58 | 0.00 | 56.45 | 6.09 | 9.33 | 0.00 | 31.05 | 0.00 | 0.00 | 0.0962 | 37.40 |
| Example L100 | 482.16 | 0.00 | 248.39 | 26.79 | 41.05 | 0.00 | 151.61 | 0.00 | 0.00 | 0.4232 | 49.58 |
| Example L101 | 494.20 | 0.00 | 254.59 | 13.73 | 42.08 | 0.00 | 145.41 | 0.00 | 0.00 | 0.4338 | 49.57 |
| Example L102 | 459.77 | 0.00 | 236.85 | 51.09 | 39.14 | 0.00 | 163.15 | 0.00 | 0.00 | 0.4036 | 49.60 |
| Example L103 | 156.78 | 0.00 | 80.77 | 8.47 | 9.74 | 0.00 | 41.73 | 0.00 | 0.00 | 0.1105 | 52.39 |
| Example L104 | 149.77 | 0.00 | 77.15 | 12.48 | 12.75 | 0.00 | 45.35 | 0.00 | 0.00 | 0.1315 | 52.37 |
| Example L105 | 139.74 | 0.00 | 71.99 | 19.96 | 15.30 | 0.00 | 50.51 | 0.00 | 0.00 | 0.1482 | 52.35 |
| Example L106 | 133.42 | 0.00 | 68.73 | 23.54 | 18.04 | 0.00 | 53.77 | 0.00 | 0.00 | 0.1674 | 52.33 |
| Example L107 | 159.10 | 0.00 | 81.96 | 6.02 | 9.88 | 0.00 | 40.54 | 0.00 | 0.00 | 0.1121 | 52.39 |
| Example L108 | 136.62 | 0.00 | 70.38 | 23.42 | 14.96 | 0.00 | 52.12 | 0.00 | 0.00 | 0.1449 | 52.36 |
| Example L109 | 97.59 | 0.00 | 50.27 | 16.73 | 10.68 | 0.00 | 37.23 | 0.00 | 0.00 | 0.2588 | 37.24 |
| Example L110 | 106.82 | 0.00 | 55.03 | 11.55 | 6.64 | 0.00 | 32.47 | 0.00 | 0.00 | 0.0753 | 37.42 |
| Example L111 | 95.30 | 0.00 | 49.09 | 16.82 | 12.89 | 0.00 | 38.41 | 0.00 | 0.00 | 0.1196 | 37.38 |

Productions methods I-1 and I-2 in Tables are as follows.
"Production Method I-1"

An aqueous solution including a monomer and PAG thiol, each at a specific amount, was prepared as a monomer/PAG thiol solution. An initiator aqueous solution at a specific amount was prepared as an initiator solution.

A monomer and water, each at a specific amount, were charged into a glass reactor equipped with a Dimroth condenser, a Teflon (registered trademark) stirrer including a stirring blade and a stirring seal, and a nitrogen gas inlet tube, and a temperature sensor. The mixture was heated to a specific temperature while nitrogen gas was introduced thereinto at 100 to 200 mL/min under stirring at 300 rpm. Successively, the monomer/PAG thiol solution and the initiator solution, each at a specific amount, were added dropwise into the reactor for specific times, respectively. After completion of the dropwise addition, the mixture was maintained for 1 hour at a specific temperature, thereby completing the polymerization reaction. After the reaction solution was cooled to a room temperature, if necessary, a 30% NaOH aqueous solution was added thereto, thereby adjusting the pH. As a result, an aqueous solution of a polymer was obtained.

The obtained polymer was the following mixture: a polymer segment was bonded to each end of the polyalkylene glycol chain (1) with a sulfur atom-containing group therebetween; such a polymer segment mainly included a polymer (1) containing a carboxyl group derived from the unsaturated carboxylic acid monomer (methacrylic acid) and the polyalkylene glycol chain (2) derived from the unsaturated polyalkylene glycol monomer (ethylene oxide (EO) adduct of 3-methyl-3-butene-1-ol); and a small amount of a polymer (3) repeatedly including the constitutional units of the polymer (1) was included.

"Production Method I-2"

A monomer aqueous solution at a specific amount was prepared as a monomer solution. A PAG thiol solution at a specific amount was prepared. An initiator aqueous solution at a specific amount was prepared as an initiator solution.

A monomer and water, each at a specific amount, were charged into a glass reactor equipped with a Dimroth condenser, a Teflon (registered trademark) stirrer including a stirring blade and a stirring seal, a nitrogen gas inlet tube, and a temperature sensor. The mixture was heated to a specific temperature while nitrogen gas was introduced thereinto at 100 to 200 mL/min under stirring at 300 rpm. Successively, the monomer solution, the PAG thiol solution, and the initiator solution, each at a specific amount, were added dropwise into the reactor for specific times, respectively. After completion of the dropwise addition, the mixture was maintained for 1 hour at a specific temperature, thereby completing the polymerization reaction. After the reaction solution was cooled to a room temperature, if necessary, a 30% NaOH aqueous solution was added thereto, thereby adjusting the pH. As a result, an aqueous solution of a polymer was obtained.

The obtained polymer was the following mixture: a polymer segment was bonded to each end of the polyalkylene glycol chain (1) with a sulfur atom-containing group therebetween; such a polymer segment mainly included a polymer (1) containing a carboxyl group derived from the unsaturated carboxylic acid monomer (acrylic acid) and the polyalkylene glycol chain (2) derived from the unsaturated polyalkylene glycol monomer (ethylene oxide (EO) adduct of 3-methyl-3-butene-1-ol; and a small amount of a polymer (3) repeatedly including the constitutional units of the polymer (1) was included.

Examples C1 to C7

Under the polymerization conditions shown in Tables 9-1 to 9-2, polymers were produced. Analysis results of the respective polymers are as shown in Table 9-1.

In these Examples, the proportion of each polymer is expressed as a mass ratio on the AA basis (in the case where the unsaturated carboxylic monomer is perfectly neutralized with NaOH) and the total proportion of the thiol-modified monomer and that of the thiol-modified monomer mixture are not 100% because they are calculated at the outside rate.

TABLE 9-1

| | | Initiator | | | | | | | |
|---|---|---|---|---|---|---|---|---|---|
| | | PAG thiol | | PEG monomer | | mol % relative to monomer | Proportion (wt) | | |
| | Production method | kind | AOmol | Kind | Kind | | SAA | PEG monomer | PAG thiol |
| Example C1 | I-1 | T-12 | 105.8 | MVC25 | V-50 | 0.20% | 17.5 | 82.5 | 10 |
| Example C2 | I-1 | T-38 | 92 + 4 | MVC25 | V-50 | 0.20% | 17.5 | 82.5 | 10 |
| Example C3 | I-1 | T-39 | 92 + 4 | MVC25 | V-50 | 0.20% | 17.5 | 82.5 | 10 |
| Example C4 | I-1 | T-34 | 43.0 | MVC10 | V-50 | 0.20% | 22.5 | 77.5 | 6 |
| Example C5 | I-1 | T-15 | 286.4 | MVC50 | V-50 | 0.20% | 10 | 90 | 10 |
| Example C6 | I-1 | T-12 | 105.8 | HEVE24 | VA-044 | 0.40% | 17.5 | 82.5 | 15 |
| Example C7 | I-1 | T-15 | 286.4 | HEVE49 | VA-044 | 0.40% | 10 | 90 | 15 |

| | Reaction time Monomer dropwise addition/ Initiator dropwise addition/ Temperature/ °C. | Maturing time | Polymer No. | GPC | | | Polymer Pure content | Analysis method |
|---|---|---|---|---|---|---|---|---|
| | | | | Mw | Mp | Mn | | |
| Example C1 | 80 | 3/3.5/1 | C-15 | 50228 | 44388 | 27303 | 95.4% | G-3 |
| Example C2 | 80 | 3/3.5/1 | C-16 | 47717 | 42169 | 25938 | 95.2% | G-3 |
| Example C3 | 80 | 3/3.5/1 | C-17 | 47867 | 42302 | 26020 | 95.6% | G-3 |
| Example C4 | 80 | 3/3.5/1 | C-18 | 28866 | 26422 | 13902 | 96.2% | G-3 |
| Example C5 | 80 | 3/3.5/1 | C-19 | 49312 | 52133 | 24099 | 88.8% | G-3 |
| Example C6 | 50 | 4/4.5/1 | C-20 | 49203 | 43482 | 26746 | 92.5% | G-3 |
| Example C7 | 50 | 4/4.5/1 | C-21 | 51778 | 54740 | 25304 | 87.0% | G-3 |

TABLE 9-2

| | Charged amount | | | | | | | | | | | | |
|---|---|---|---|---|---|---|---|---|---|---|---|---|---|
| | Dropwise-added monomer | | | | | | Dropwise-added transfer agent | | Dropwise-added initiator | | Charged into reactor | | |
| | SAA/g | AA/g | PEG monomer/g | PAG thiol/g | Water/g | NaOH/g | PAG thiol/g | Water/g | Initiator/g | Water/g | PEG monomer/g | NaOH/g | Water/g |
| Example C1 | 0.00 | 15.83 | 0.00 | 11.80 | 37.34 | 0.00 | 0.00 | 0.00 | 0.164 | 37.34 | 97.37 | 0.05 | 50.16 |
| Example C2 | 0.00 | 15.83 | 0.00 | 11.80 | 37.34 | 0.00 | 0.00 | 0.00 | 0.164 | 37.34 | 97.37 | 0.05 | 50.16 |
| Example C3 | 0.00 | 15.83 | 0.00 | 11.80 | 37.34 | 0.00 | 0.00 | 0.00 | 0.164 | 37.34 | 97.37 | 0.05 | 50.16 |
| Example C4 | 0.00 | 21.39 | 0.00 | 7.44 | 37.96 | 0.00 | 0.00 | 0.00 | 0.263 | 37.24 | 96.16 | 0.05 | 49.54 |
| Example C5 | 0.00 | 8.90 | 0.00 | 11.61 | 33.67 | 0.00 | 0.00 | 0.00 | 0.092 | 37.41 | 104.49 | 0.05 | 53.83 |
| Example C6 | 0.00 | 15.11 | 0.00 | 16.91 | 39.60 | 0.00 | 0.00 | 0.00 | 0.376 | 37.12 | 92.98 | 0.05 | 47.90 |
| Example C7 | 0.00 | 8.50 | 0.00 | 16.64 | 36.06 | 0.00 | 0.00 | 0.00 | 0.210 | 37.29 | 99.86 | 0.05 | 51.44 |

Comparative Examples F1 to F4 and L1 to L4, and Reference Examples L5 and L6

Comparative Polymers

Then, comparative polymers in Comparative Examples obtained by polymerizing (meth)acrylic acid with a polyethylene glycol monomer (hereinafter, also referred to as a "PEG monomer") in the absence of PAG thiol are mentioned below.

Comparative Examples F1 to F4

Polymers were produced under the polymerization conditions shown in Tables 10-1 to 10-2. Analysis results of each polymer are as shown in Table 10-1.

TABLE 10-1

| | Production method | PAG thiol Kind | PAG thiol EO mol | PEG monomer Kind | Initiator Kind | Proportion(wt) SMAA | Proportion(wt) PGM-E | Proportion(wt) PAG thiol | Temperature/ °C. |
|---|---|---|---|---|---|---|---|---|---|
| Comparative Example F1 | F-4 | — | — | PGM25E | APS | 20 | 80 | — | 80 |
| Comparative Example F2 | F-4 | — | — | PGM25E | APS | 12.5 | 87.5 | — | 80 |
| Comparative Example F3 | F-4 | — | — | PGM25E | APS | 9.5 | 90.5 | — | 80 |
| Comparative Example F4 | F-4 | — | — | PGM10E | APS | 25 | 75 | — | 70 |

| | Reaction time Monomer dropwise addition/ Initiator dropwise addition/ Maturing time | Polymer No. | GPC Mw | GPC Mp | GPC Mn | Polymer Pure content | Calculation method |
|---|---|---|---|---|---|---|---|
| Comparative Example F1 | 4/5/1 | F-1 | 24200 | 18600 | 12600 | 95.3% | G-3 |
| Comparative Example F2 | 4/5/1 | F-2 | 21700 | 14500 | 12100 | 94.5% | G-3 |
| Comparative Example F3 | 4/5/1 | F-3 | 37500 | 33200 | 18300 | 94.3% | G-3 |
| Comparative Example F4 | 4/5/1 | F-4 | 22200 | 11500 | 8600 | 99.4% | G-3 |

TABLE 10-2

| | Charged amount Dropwise-added monomer | | | | | | |
|---|---|---|---|---|---|---|---|
| | SMAA/g | MAA/g | PEG monomer/g | MPA/g | Water/g | NaOH at the outside rate/ g (100%) | Total |
| Comparative Example F1 | 0.93 | 73.29 | 371.72 | 4.06 | 112.50 | — | 562.50 |
| Comparative Example F2 | 0.57 | 45.10 | 400.30 | 4.03 | 112.50 | — | 562.50 |
| Comparative Example F3 | 0.43 | 34.17 | 412.76 | 2.64 | 112.50 | — | 562.50 |
| Comparative Example F4 | 5.84 | 88.36 | 350.29 | 5.50 | 112.50 | 0.00 | 562.50 |

| | Charged amount | | | | | | | |
|---|---|---|---|---|---|---|---|---|
| | Dropwise-added initiator | | | Charged into reactor | | | | |
| | Initiator/g | Water/g | Total | PEG monomer/g | Acid monomer/g | Water/g | Total | Total |
| Comparative Example F1 | 5.1283 | 82.37 | 87.50 | — | — | 350.00 | 350.00 | 1000.00 |
| Comparative Example F2 | 5.1886 | 82.31 | 87.50 | — | — | 350.00 | 350.00 | 1000.00 |
| Comparative Example F3 | 5.1446 | 82.36 | 87.50 | — | — | 350.00 | 350.00 | 1000.00 |
| Comparative Example F4 | 4.3386 | 83.16 | 87.50 | 0.00 | 0.00 | 350.00 | 350.00 | 1000.00 |

In Tables, "APS" represents ammonium persulfate (produced by Wako Pure Chemical Industries, Ltd.). Also in the following Tables, the abbreviation represents the same. In these Tables, the proportion of each polymer is expressed as a mass ratio on the SMAA basis (in the case where the unsaturated carboxylic acid monomer is completely neutralized with NaOH).

The production method F-4 in Tables is as follows.

"Production Method F-4"

An aqueous solution including a monomer and a chain transfer agent, each at a specific amount, was prepared as a monomer/chain transfer agent solution. An initiator aqueous solution at a specific amount was prepared as an initiator solution.

Water at a specific amount was charged into a glass reactor equipped with a Dimroth condenser, a Teflon (registered trademark) stirrer including a stirring blade and a stirring seal, and a nitrogen gas inlet tube, and a temperature sensor. The water was heated to a specific temperature while nitrogen gas was introduced thereinto at 100 to 200 mL/min under stirring at 200 rpm. Successively, the monomer solution and the initiator solution, each at a specific amount, were added dropwise into the reactor for 4 hours and 5 hours, respectively. After completion of the dropwise addition, the mixture was maintained for 1 hour at a specific temperature, thereby completing the polymerization reaction. After the reaction solution was cooled to a room temperature, if necessary, a 30% NaOH aqueous solution was added thereto, thereby adjusting the pH. As a result, an aqueous solution of a comparative polymer was obtained.

The obtained comparative polymer was a polymer which included a carboxyl group derived from the unsaturated carboxylic acid monomer (methacrylic acid) and the polyalkylene glycol chain (2) derived from the unsaturated polyalkylene glycol monomer (methoxypolyethylene glycol methacrylate), but not included the polyalkylene glycol chain (1).

Comparative Examples L1 to L4 and Reference Examples L5 and L6

Polymers were produced under the polymerization conditions shown in Tables 11-1 to 11-2. Analysis results of each polymer are as shown in Table 11-1.

TABLE 11-1

| | | PAG thiol | | PEG | | Proportion(wt) | | | |
|---|---|---|---|---|---|---|---|---|---|
| | Production method | Kind | EO mol | monomer Kind | Initiator Kind | SAA | IPN-50 | PAG thiol | Temperature/ °C. |
| Comparative Example L1 | I-3 | — | — | IPN-50 | $H_2O_2$ | 7.5 | 92.5 | — | 58 |
| Comparative Example L2 | I-3 | — | — | IPN-50 | $H_2O_2$ | 7.5 | 92.5 | — | 58 |
| Comparative Example L3 | I-3 | — | — | IPN-50 | $H_2O_2$ | 7.5 | 92.5 | — | 58 |
| Comparative Example L4 | I-3 | — | — | IPN-50 | $H_2O_2$ | 15 | 85 | — | 58 |
| Reference Example L5 | I-3 | — | — | IPN-50 | APS | 3.8 | 96.2 | 0 | 63 |
| Reference Example L6 | I-3 | — | — | IPN-50 | APS | 5.5 | 94.5 | 0 | 83 |

| | Reaction time Monomer dropwise addition/ Initiator (Transfer agent) dropwise addition/ Maturing time | Polymer No. | GPC | | | Polymer Pure content | Calculation method |
|---|---|---|---|---|---|---|---|
| | | | Mw | Mp | Mn | | |
| Comparative Example L1 | 3/3.5/1 | L-1 | 37855 | 42074 | 19341 | 81.4% | G-3 |
| Comparative Example L2 | 3/3.5/1 | L-2 | 33157 | 33600 | 17598 | 76.6% | G-3 |
| Comparative Example L3 | 3/3.5/1 | L-3 | 29804 | 28872 | 16686 | 77.1% | G-3 |
| Comparative Example L4 | 3/3.5/1 | L-4 | 36514 | 42909 | 18010 | 89.7% | G-3 |
| Reference Example L5 | 6/6.15/0.33 | L-5 | 52882 | 61962 | 23032 | 69.8% | G-3 |
| Reference Example L6 | 5/5.17/0.33 | L-6 | 36861 | 38112 | 17561 | 85.2% | G-3 |

TABLE 11-2

| | Charged amount | | | | | | | |
|---|---|---|---|---|---|---|---|---|
| | Charged into reactor | | | | Dropwise-added monomer | | | |
| | | | | | PAG | | | |
| | IPN-50/g | AA/g | Water/g | Total | thiol/g | AA/g | Water/g | Total |
| Comparative Example L1 | 517.83 | 0.94 | 267.24 | 786.00 | — | 31.24 | 32.76 | 64.00 |
| Comparative Example L2 | 517.83 | 0.94 | 267.24 | 786.00 | — | 31.24 | 32.76 | 64.00 |
| Comparative Example L3 | 517.83 | 0.94 | 267.24 | 786.00 | — | 31.24 | 32.76 | 64.00 |

TABLE 11-2-continued

| | Charged amount | | | | | | | |
|---|---|---|---|---|---|---|---|---|
| | Dropwise-added transfer agent | | | | Initiator charged into reactor 30% | | | |
| | L-AS/g | MPA/g | Water/g | Total | H$_2$O$_2$/g | Water/g | Total | Total |
| Comparative Example L1 | 0.59 | 0.93 | 98.48 | 100.00 | 1.525 | 48.47 | 50.00 | 1000.00 |
| Comparative Example L2 | 0.59 | 1.18 | 98.23 | 100.00 | 1.525 | 48.47 | 50.00 | 1000.00 |
| Comparative Example L3 | 0.59 | 1.43 | 97.98 | 100.00 | 1.525 | 48.47 | 50.00 | 1000.00 |
| Comparative Example L4 | 0.99 | 2.55 | 96.46 | 100.00 | 2.170 | 47.83 | 50.00 | 1000.00 |

| | Charged amount | | | | | | | |
|---|---|---|---|---|---|---|---|---|
| | Charged into reactor | | | | Dropwise-added monomer PAG | | | |
| | IPN-50/g | AA/g | Water/g | Total | thiol/g | AA/g | Water/g | Total |
| Reference Example L5 | 533.84 | — | 300.29 | 834.13 | — | 16.16 | 10.77 | 26.93 |
| Reference Example L6 | 526.52 | — | 351.01 | 877.53 | — | 23.48 | 5.87 | 29.35 |

| | Charged amount | | | | | | | |
|---|---|---|---|---|---|---|---|---|
| | Dropwise-added transfer agent | | | | Dropwise-added initiator | | | |
| | L-AS/g | MPA/g | Water/g | Total | APS/g | Water/g | Total | Total |
| Reference Example L5 | 0.60 | — | 68.34 | 68.94 | 2.088 | 67.91 | 70.00 | 1000.00 |
| Reference Example L6 | 0.00 | — | 0.00 | 0.00 | 1.776 | 91.34 | 93.12 | 1000.00 |

In these Tables, the proportion of each polymer is expressed as a mass ratio on the SAA basis (in the case where the unsaturated carboxylic acid monomer is completely neutralized with NaOH).

The production method 1-3 in Tables is as follows.
"Production Method I-3"

A monomer aqueous solution at a specific amount was prepared as a monomer solution. An initiator aqueous solution at a specific amount was prepared as an initiator solution charged into a reactor. An initiator/transfer agent aqueous solution at a specific amount was prepared as an initiator/chain transfer agent solution added dropwise.

A monomer and water, each at a specific amount, were charged into a glass reactor equipped with a Dimroth condenser, a Teflon (registered trademark) stirrer including a stirring blade and a stirring seal, a nitrogen gas inlet tube, and a temperature sensor. The mixture was heated to a specific temperature while nitrogen gas was introduced thereinto at 100 to 200 mL/min under stirring at 200 rpm. Then, the total amount of H$_2$O$_2$ aqueous solution at a specific amount was added and the mixture was heated to a specific temperature. Successively, the monomer solution and the initiator transfer agent solution, each at a specific amount, were added dropwise into the reactor for 3 hours and 3.5 hours, respectively. After completion of the dropwise addition, the mixture was maintained for 1 hour at a specific temperature, thereby completing the polymerization reaction. After the reaction solution was cooled to a room temperature, if necessary, a 30% NaOH aqueous solution was added thereto, thereby adjusting the pH. As a result, an aqueous solution of a comparative polymer was obtained.

The obtained comparative polymer was a polymer which included a carboxyl group derived from the unsaturated carboxylic acid monomer (acrylic acid) and the polyalkylene glycol chain (2) derived from the unsaturated polyalkylene glycol monomer (ethylene oxide (EO) adduct of 3-methyl-3-butene-1-ol), but not included the polyalkylene glycol chain (1).

Dispersant, Admixture for Cement

Test Examples 1 to 139

Test Examples 1 to 139 are mentioned below. In Test Examples 1 to 128, the polymers of the present invention obtained in Examples, and the comparative polymers obtained in Comparative Examples were evaluated for dispersibility.

"Evaluation Method of Dispersibility: Mortar Test"

A mortar test was performed under the conditions of a temperature of 20° C.±1° C. and a relative humidity of 60%±10%.

The mortar had the following proportion: C/S/W=550/1350/220 (g).

C: Ordinary Portland Cement (product of TAIHEIYO CEMENT CORP.)
S: Standard sand for cement strength test (product of Japan Cement Association)
W: Polymer of the present invention or comparative polymer, and deionized aqueous solution of defoaming agent As W, a polymer aqueous solution including a polymer at an amount shown in Tables 12-1 to 12-3 and Tables 13-1 and 13-3 was weighed and thereinto a defoaming agent MA-404 (product of Pozzolith Bussan Co., Ltd.) which accounts for 10% by weight relative to the polymer solid content was added as it is. Further, deionized water was added thereinto, thereby preparing a mixture at a specific amount. Then, the mixture was sufficiently uniformly dissolved in each other. The addition amount of each polymer in Tables 12-1 to 12-3 and Tables 13-1 and 13-3 was expressed as % by weight of the polymer solid content relative to the cement weight.

A hobert type mortar mixer (model number N-50: HOBART (JAPAN) K.K.) was equipped with a stainless beater (stirring blade), and C and W were charged into the mixer and mixed at the first speed for 30 minutes. While the mixture was further mixed at the first speed, S was charged for 30 seconds. After the addition of S was completed, the mixture was mixed for 30 seconds with two screws. Then, the mixing was stopped and the mortar was scratched and dropped for 15 seconds. Then, the mortar was kept still for 75 seconds. After the standstill for 75 seconds, the mixing was further performed for 60 seconds at the second speed, thereby preparing mortar.

The mortar was transferred from the mixing container to a 1 L polyethylene container and stirred 20 times with a spatula. Then, immediately, a half of the prepared mortar was filled into a flow corn (which is defined in JIS R5201-1997) placed on a flow table (which is defined in JIS R5201-1997), and then, the charged mortar was hit 15 times with a stick for hitting. Further, the remaining mortar was charged up to the top end of the flow corn, and then the charged mortar was hit 15 times with the stick for hitting. Finally, the top surface of the charged mortar in the flow corn was flattened by the remaining mortar. Immediately, the flow corn was lifted perpendicularly and two diameters, i.e., the diameter at the longest part (the longest diameter) and the diameter perpendicular to the longest diameter, of the spread mortar were measured, and the average of the two diameters was defined as a 0 hit flow value. After the 0 hit flow value was measured, immediately the flow corn was provided with 15 times of falling motion for 15 seconds, and the two diameters, i.e., the diameter at the longest part (the longest diameter) and the diameter perpendicular to the longest diameter, of the spread mortar were measured, and the average of the two diameters was defined as a 15 fit flow value. Further, the air content in the mortar was measured according to need.

The higher the 15 hit flow value are, the more excellent dispersibility the mortar has. If the mortar is prepared without a dispersant such as the polymer under this condition, the mortar was insufficiently mixed, failing to have fluidity. The 0 hit flow value was about 105 mm and the 15 hit flow value was about 145 mm.

"Measuring Method of Air Content in Mortar"

The mortar about 200 mL was charged into 500 mL-glass graduated cylinder and the charged mortar was hit with a round bar in 8 mm diameter. The cyclinder was slightly vibrated by hand, thereby removing coarse air bubbles therefrom. Further, the mortar about 200 mL was added and air bubbles were similarly removed, and then measured for volume and weight. The air content was calculated base on the density of the respective materials.

TABLE 12-1

| Test Example | Example (E)/ Comparative Example (C) | Control Series | Dosage of polymer | | Dosage of polymer wt %/C | Measuring time/ min | Flow value/ mm | | Air content/ vol % | Mortar temperature/ ° C. |
| --- | --- | --- | --- | --- | --- | --- | --- | --- | --- | --- |
| | | | No. | Polymer | | | 0-hit | 15-hit | | |
| Test Example 1 | E | 2 | BM-28 | B-38 | 0.090 | 6 | 160 | 225 | 3.10% | 20.5 |
| Test Example 2 | E | 2 | BM-35 | B-45 | 0.090 | 6 | 168 | 232 | 3.24% | 21.0 |
| Test Example 3 | E | 2 | BM-34 | B-46 | 0.090 | 6 | 183 | 242 | 3.27% | 21.0 |
| Test Example 4 | E | 2 | BM-31 | B-48 | 0.090 | 6 | 168 | 232 | 3.15% | 21.0 |
| Test Example 5 | E | 2 | BM-33 | B-49 | 0.090 | 6 | 169 | 230 | 3.26% | 20.7 |
| Test Example 6 | E | 2 | BM-32 | B-51 | 0.090 | 6 | 159 | 223 | 2.84% | 21.8 |
| Test Example 7 | E | 2 | BM-29 | B-52 | 0.090 | 6 | 169 | 230 | 3.00% | 20.7 |
| Test Example 8 | C | 2 | BM-27 | F-1 | 0.090 | 6 | 153 | 216 | 3.04% | 21.1 |
| Test Example 9 | E | 5 | BM-69 | B-54 | 0.090 | 6 | 179 | 239 | 3.12% | 18.7 |
| Test Example 10 | E | 5 | BM-67 | B-56 | 0.090 | 6 | 190 | 244 | 3.33% | 18.3 |
| Test Example 11 | E | 5 | BM-68 | B-57 | 0.090 | 6 | 191 | 241 | 3.28% | 18.1 |
| Test Example 12 | C | 5 | BM-66 | F-1 | 0.090 | 6 | 165 | 228 | 3.06% | 18.8 |
| Test Example 13 | E | 6 | BM-74 | B-48 | 0.090 | 6 | 156 | 222 | 3.51% | 21.7 |
| Test Example 14 | E | 6 | BM-75 | B-56 | 0.090 | 6 | 170 | 232 | 3.18% | 21.7 |
| Test Example 15 | E | 6 | BM-76 | B-56 | 0.072 | 6 | 141 | 205 | 3.93% | 21.8 |
| Test Example 16 | E | 6 | BM-72 | B-59 | 0.090 | 6 | 162 | 229 | 3.01% | 20.6 |
| Test Example 17 | E | 6 | BM-73 | B-60 | 0.090 | 6 | 164 | 230 | 3.05% | 20.9 |
| Test Example 18 | C | 6 | BM-71 | F-1 | 0.090 | 6 | 139 | 205 | 3.14% | 20.8 |
| Test Example 19 | E | 7 | BM-79 | B-61 | 0.090 | 6 | 197 | 253 | 3.02% | 21.1 |
| Test Example 20 | E | 7 | BM-80 | B-61 | 0.080 | 6 | 172 | 238 | 3.73% | 21.0 |
| Test Example 21 | E | 7 | BM-83 | B-61 | 0.075 | 6 | 161 | 227 | 3.45% | 21.6 |
| Test Example 22 | E | 7 | BM-81 | B-62 | 0.090 | 6 | 150 | 214 | 3.57% | 21.2 |
| Test Example 23 | E | 7 | BM-82 | B-63 | 0.090 | 6 | 124 | 187 | 3.45% | 21.8 |
| Test Example 24 | C | 7 | BM-77 | F-1 | 0.090 | 6 | 149 | 213 | 3.41% | 21.7 |
| Test Example 25 | C | 7 | BM-78 | F-1 | 0.100 | 6 | 168 | 231 | 3.11% | 21.3 |
| Test Example 26 | E | 8 | BM-90 | B-60 | 0.080 | 6 | 141 | 208 | 4.27% | 21.6 |
| Test Example 27 | E | 8 | BM-91 | B-61 | 0.078 | 6 | 162 | 231 | 3.47% | 21.8 |
| Test Example 28 | E | 8 | BM-86 | B-64 | 0.078 | 6 | 153 | 221 | 4.15% | 21.4 |

TABLE 12-1-continued

| Test Example | Example (E)/ Comparative Example (C) | Control Series | No. | Polymer | Dosage of polymer wt %/C | Measuring time/ min | Flow value/mm 0-hit | Flow value/mm 15-hit | Air content/ vol % | Mortar temperature/ ° C. |
|---|---|---|---|---|---|---|---|---|---|---|
| Test Example 29 | E | 8 | BM-87 | B-64 | 0.080 | 6 | 159 | 225 | 4.46% | 21.9 |
| Test Example 30 | E | 8 | BM-88 | B-65 | 0.080 | 6 | 141 | 210 | 4.70% | 22.0 |
| Test Example 31 | E | 8 | BM-89 | B-65 | 0.090 | 6 | 152 | 222 | 4.30% | 21.9 |
| Test Example 32 | C | 8 | BM-84 | F-1 | 0.090 | 6 | 146 | 213 | 3.91% | 21.9 |
| Test Example 33 | C | 8 | BM-85 | F-1 | 0.100 | 6 | 166 | 229 | 3.67% | 21.6 |
| Test Example 34 | C | 8 | BM-92 | F-1 | 0.100 | 6 | 164 | 229 | 3.69% | 21.8 |
| Test Example 35 | E | 9 | BM-98 | B-51 | 0.080 | 6 | 130 | 197 | 3.43% | 23.0 |

TABLE 12-2

| Test Example | Example (E)/ Comparative Example (C) | Control Series | No. | Polymer | Dosage of polymer wt %/C | Measuring time/ min | Flow value/mm 0-hit | Flow value/mm 15-hit | Air content/ vol % | Mortar temperature/ ° C. |
|---|---|---|---|---|---|---|---|---|---|---|
| Test Example 36 | E | 9 | BM-102 | B-52 | 0.080 | 6 | 139 | 204 | 3.73% | 23.5 |
| Test Example 37 | E | 9 | BM-104 | B-54 | 0.080 | 6 | 153 | 220 | 3.34% | 23.1 |
| Test Example 38 | E | 9 | BM-105 | B-55 | 0.080 | 6 | 137 | 202 | 3.23% | 23.4 |
| Test Example 39 | E | 9 | BM-108 | B-56 | 0.080 | 6 | 159 | 217 | 3.64% | 23.4 |
| Test Example 40 | E | 9 | BM-99 | B-58 | 0.080 | 6 | 106 | 165 | 3.55% | 22.6 |
| Test Example 41 | E | 9 | BM-100 | B-59 | 0.080 | 6 | 140 | 204 | 3.43% | 23.0 |
| Test Example 42 | E | 9 | BM-101 | B-60 | 0.080 | 6 | 141 | 205 | 3.38% | 22.8 |
| Test Example 43 | E | 9 | BM-94 | B-61 | 0.090 | 6 | 182 | 244 | 3.06% | 23.1 |
| Test Example 44 | E | 9 | BM-95 | B-61 | 0.080 | 6 | 158 | 226 | 3.45% | 23.2 |
| Test Example 45 | E | 9 | BM-97 | B-64 | 0.080 | 6 | 153 | 219 | 3.63% | 23.5 |
| Test Example 46 | C | 9 | BM-93 | F-1 | 0.090 | 6 | 154 | 218 | 3.65% | 22.8 |
| Test Example 47 | C | 9 | BM-96 | F-1 | 0.080 | 6 | 125 | 189 | 3.74% | 23.4 |
| Test Example 48 | C | 9 | BM-109 | F-1 | 0.100 | 6 | 190 | 244 | 3.20% | 23.6 |
| Test Example 49 | C | 9 | BM-106 | F-2 | 0.080 | 6 | 115 | 181 | 4.15% | 23.3 |
| Test Example 50 | C | 9 | BM-107 | F-3 | 0.080 | 6 | 103 | 154 | 3.59% | 23.4 |
| Test Example 51 | E | 10 | BM-117 | B-61 | 0.080 | 6 | 149 | 234 | 4.73% | 22.8 |
| Test Example 52 | E | 10 | BM-112 | B-68 | 0.080 | 6 | 154 | 220 | 4.32% | 22.3 |
| Test Example 53 | E | 10 | BM-113 | B-69 | 0.080 | 6 | 163 | 232 | 4.60% | 22.1 |
| Test Example 54 | E | 10 | BM-115 | B-70 | 0.080 | 6 | 164 | 234 | 3.51% | 22.4 |
| Test Example 55 | C | 10 | BM-110 | F-1 | 0.100 | 6 | 170 | 242 | 3.92% | 21.8 |
| Test Example 56 | C | 10 | BM-111 | F-1 | 0.080 | 6 | 142 | 213 | 5.23% | 22.2 |
| Test Example 57 | C | 10 | BM-118 | F-1 | 0.090 | 6 | 154 | 225 | 4.46% | 22.9 |
| Test Example 58 | E | 11-2 | BM-119 | B-74 | 0.080 | 6 | 170 | 232 | 4.68% | 22.6 |
| Test Example 59 | E | 11-2 | BM-121 | B-75 | 0.080 | 6 | 166 | 228 | 4.30% | 22.6 |
| Test Example 60 | E | 11-2 | BM-122 | B-76 | 0.080 | 6 | 159 | 224 | 4.19% | 21.1 |
| Test Example 61 | C | 11-2 | BM-134 | F-1 | 0.080 | 6 | 156 | 220 | 4.66% | 21.7 |
| Test Example 62 | E | 12 | BM-142 | B-79 | 0.080 | 6 | 165 | 231 | 3.21% | 21.2 |
| Test Example 63 | C | 12 | BM-138 | F-1 | 0.080 | 6 | 155 | 226 | 5.41% | 20.7 |
| Test Example 64 | E | 13 | BM-150 | B-68 | 0.080 | 6 | 178 | 227 | 3.58% | 19.6 |
| Test Example 65 | E | 13 | BM-151 | B-68 | 0.065 | 6 | 145 | 207 | 4.51% | 20.2 |
| Test Example 66 | E | 13 | BM-152 | B-69 | 0.065 | 6 | 146 | 213 | 4.59% | 21.9 |
| Test Example 67 | E | 13 | BM-153 | B-70 | 0.065 | 6 | 146 | 215 | 4.26% | 21.4 |
| Test Example 68 | E | 13 | BM-155 | B-85 | 0.065 | 6 | 140 | 208 | 4.41% | 21.8 |
| Test Example 69 | E | 13 | BM-156 | B-86 | 0.065 | 6 | 140 | 209 | 5.09% | 22.1 |
| Test Example 70 | E | 13 | BM-157 | B-87 | 0.065 | 6 | 137 | 207 | 4.44% | 22.0 |
| Test Example 71 | C | 13 | BM-148 | F-1 | 0.080 | 6 | 145 | 208 | 4.21% | 20.4 |
| Test Example 72 | C | 13 | BM-149 | F-1 | 0.065 | 6 | 127 | 195 | 4.54% | 22.0 |

TABLE 12-3

| Test Example | Example (E)/ Comparative Example (C) | Series | Control No. | Polymer | Dosage of polymer wt %/C | Measuring time/ min | Flow value/ mm 0-hit | Flow value/ mm 15-hit | Air content/ vol % | Mortar temperature/ °C | Difference in flow value 6 min-45 min/ mm |
|---|---|---|---|---|---|---|---|---|---|---|---|
| Test Example 73-1 | E | 3 | BM-50 | B-45 | 0.085 | 6 | 163 | 225 | 3.13% | 20.1 | — |
| Test Example 73-2 | E | 3 | BM-51 | B-45 | 0.085 | 15 | 142 | 206 | — | 19.0 | — |
| Test Example 73-3 | E | 3 | BM-52 | B-45 | 0.085 | 30 | 138 | 204 | — | 18.4 | — |
| Test Example 73-4 | E | 3 | BM-53 | B-45 | 0.085 | 45 | 133 | 199 | — | 18.0 | 26 |
| Test Example 74-1 | E | 3 | BM-54 | B-46 | 0.080 | 6 | 159 | 224 | 3.52% | 20.1 | — |
| Test Example 74-2 | E | 3 | BM-55 | B-46 | 0.080 | 15 | 135 | 201 | — | 19.5 | — |
| Test Example 74-3 | E | 3 | BM-56 | B-46 | 0.080 | 30 | 129 | 193 | — | 18.7 | — |
| Test Example 74-4 | E | 3 | BM-57 | B-46 | 0.080 | 45 | 122 | 189 | — | 18.1 | 35 |
| Test Example 75-1 | E | 3 | BM-58 | B-48 | 0.085 | 6 | 157 | 220 | 2.93% | 20.5 | — |
| Test Example 75-2 | E | 3 | BM-59 | B-48 | 0.085 | 15 | 135 | 200 | — | 19.8 | — |
| Test Example 75-3 | E | 3 | BM-60 | B-48 | 0.085 | 30 | 129 | 192 | — | 19.0 | — |
| Test Example 75-4 | E | 3 | BM-61 | B-48 | 0.085 | 45 | 121 | 188 | — | 18.4 | 32 |
| Test Example 76-1 | C | 3 | BM-40 | F-1 | 0.090 | 6 | 159 | 221 | 3.00% | 20.0 | — |
| Test Example 76-2 | C | 3 | BM-41 | F-1 | 0.090 | 15 | 137 | 199 | — | 19.2 | — |
| Test Example 76-3 | C | 3 | BM-42 | F-1 | 0.090 | 30 | 126 | 189 | — | 18.5 | — |
| Test Example 76-4 | C | 3 | BM-43 | F-1 | 0.090 | 45 | 120 | 182 | — | 17.8 | 39 |
| Test Example 77 | E | 11-1 | BM-123 | B-71 | 0.080 | 6 | 149 | 213 | 4.67% | 21.0 | — |
| Test Example 78 | E | 11-1 | BM-124 | B-72 | 0.080 | 6 | 149 | 214 | 4.40% | 21.0 | — |
| Test Example 79-1 | E | 11-1 | BM-125 | B-73 | 0.080 | 6 | 148 | 210 | 4.48% | 21.4 | — |
| Test Example 79-2 | E | 11-1 | BM-127 | B-73 | 0.080 | 30 | 124 | 186 | — | 20.6 | 25 |
| Test Example 80-1 | C | 11-1 | BM-131 | F-2 | 0.140 | 6 | 151 | 214 | 3.26% | 21.5 | — |
| Test Example 80-2 | C | 11-1 | BM-133 | F-2 | 0.140 | 30 | 127 | 189 | — | 20.7 | 25 |

TABLE 13-1

| Test Example | Example (E)/ Comparative Example (C) | Series | Control No. | Polymer | Dosage of polymer wt %/C | Measuring time/ min | Flow value/ mm 0-hit | Flow value/ mm 15-hit | Air content/ vol % | Mortar temperature/ °C |
|---|---|---|---|---|---|---|---|---|---|---|
| Test Example 81 | E | a | IM-48 | I-60 | 0.080 | 6 | 139 | 212 | 3.94% | 22.1 |
| Test Example 82 | E | a | IM-49 | I-61 | 0.080 | 6 | 140 | 213 | 3.84% | 22.1 |
| Test Example 83 | E | a | IM-44 | I-67 | 0.080 | 6 | 149 | 224 | 3.55% | 21.9 |
| Test Example 84 | E | a | IM-45 | I-68 | 0.080 | 6 | 143 | 215 | 3.98% | 21.8 |
| Test Example 85 | E | a | IM-46 | I-69 | 0.080 | 6 | 136 | 208 | 3.62% | 21.6 |
| Test Example 86 | E | a | IM-50 | I-70 | 0.080 | 6 | 138 | 210 | 4.29% | 22.4 |
| Test Example 87 | C | a | IM-38 | L-1 | 0.080 | 6 | 131 | 206 | 4.14% | 21.7 |
| Test Example 88 | C | a | IM-42 | L-3 | 0.080 | 6 | 126 | 199 | 3.63% | 22.3 |
| Test Example 89 | C | a | IM-40 | L-4 | 0.080 | 6 | 131 | 203 | 4.16% | 22.1 |
| Test Example 90 | E | b | IM-106 | I-67 | 0.080 | 6 | 144 | 216 | 3.38% | 20.2 |
| Test Example 91 | E | b | IM-104 | I-79 | 0.080 | 6 | 144 | 213 | 3.33% | 20.4 |
| Test Example 92 | E | b | IM-105 | I-80 | 0.080 | 6 | 141 | 210 | 3.01% | 20.5 |
| Test Example 93 | E | b | IM-96 | I-81 | 0.080 | 6 | 140 | 211 | 3.55% | 20.2 |
| Test Example 94 | E | b | IM-100 | I-85 | 0.080 | 6 | 146 | 219 | 3.03% | 21.5 |
| Test Example 95 | E | b | IM-99 | I-90 | 0.080 | 6 | 147 | 220 | 3.27% | 20.8 |
| Test Example 96 | E | b | IM-109 | I-91 | 0.080 | 6 | 149 | 215 | 2.65% | 20.4 |
| Test Example 97 | C | b | IM-94 | F-1 | 0.080 | 6 | 139 | 206 | 3.29% | 19.0 |
| Test Example 98 | C | b | IM-95 | L-3 | 0.080 | 6 | 138 | 209 | 3.32% | 19.8 |
| Test Example 99 | E | c | IM-119 | I-85 | 0.080 | 6 | 152 | 223 | 3.19% | 22.8 |
| Test Example 100 | E | c | IM-117 | I-90 | 0.080 | 6 | 151 | 219 | 3.39% | 22.3 |
| Test Example 101 | E | c | IM-112 | I-91 | 0.080 | 6 | 140 | 205 | 3.22% | 21.3 |
| Test Example 102 | E | c | IM-113 | I-92 | 0.080 | 6 | 141 | 208 | 3.63% | 21.6 |
| Test Example 103 | E | c | IM-114 | I-93 | 0.080 | 6 | 133 | 203 | 3.61% | 22.2 |
| Test Example 104 | E | c | IM-116 | I-94 | 0.080 | 6 | 141 | 208 | 3.69% | 21.8 |
| Test Example 105 | E | c | IM-115 | I-95 | 0.080 | 6 | 141 | 210 | 3.30% | 21.7 |
| Test Example 106 | E | c | IM-118 | I-96 | 0.080 | 6 | 151 | 221 | 3.94% | 22.1 |
| Test Example 107 | C | c | IM-111 | L-3 | 0.080 | 6 | 135 | 202 | 3.57% | 22.2 |
| Test Example 108 | E | d | IM-124 | I-85 | 0.080 | 6 | 152 | 222 | 3.64% | 21.2 |
| Test Example 109 | E | d | IM-125 | I-86 | 0.080 | 6 | 142 | 212 | 3.31% | 22.0 |
| Test Example 110 | E | d | IM-123 | I-96 | 0.080 | 6 | 155 | 225 | 3.07% | 21.3 |
| Test Example 111 | E | d | IM-126 | I-97 | 0.080 | 6 | 157 | 228 | 3.37% | 21.5 |
| Test Example 112 | E | d | IM-127 | I-98 | 0.080 | 6 | 155 | 225 | 3.29% | 21.4 |

TABLE 13-1-continued

| Test Example | Example (E)/ Comparative Example (C) | Control Series | No. | Polymer | Dosage of polymer wt %/C | Measuring time/ min | Flow value/mm 0-hit | Flow value/mm 15-hit | Air content/ vol % | Mortar temperature/ °C |
|---|---|---|---|---|---|---|---|---|---|---|
| Test Example 113 | E | d | IM-128 | I-99 | 0.080 | 6 | 148 | 218 | 3.40% | 22.1 |
| Test Example 114 | C | d | IM-120 | L-3 | 0.080 | 6 | 142 | 213 | 3.36% | 22.3 |
| Test Example 115 | C | d | IM-121 | L-3 | 0.090 | 6 | 147 | 220 | 3.38% | 21.6 |

TABLE 13-2

| Test Example | Example (E)/ Comparative Example (C) | Control Series | No. | Polymer | Dosage of polymer wt %/C | Measuring time/ min | Flow value/mm 0-hit | Flow value/mm 15-hit | Air content/ vol % | Mortar temperature/ °C |
|---|---|---|---|---|---|---|---|---|---|---|
| Test Example 116 | C | d | IM-122 | L-3 | 0.100 | 6 | 160 | 230 | 3.40% | 21.7 |
| Test Example 117 | E | e | IM-131 | I-100 | 0.080 | 6 | 147 | 212 | 3.13% | 19.3 |
| Test Example 118 | E | e | IM-132 | I-101 | 0.080 | 6 | 143 | 206 | 3.43% | 19.3 |
| Test Example 119 | E | e | IM-133 | I-102 | 0.080 | 6 | 134 | 196 | 3.30% | 21.2 |
| Test Example 120 | E | e | IM-134 | I-103 | 0.080 | 6 | 144 | 203 | 3.18% | 20.5 |
| Test Example 121 | E | e | IM-135 | I-104 | 0.080 | 6 | 145 | 211 | 3.23% | 20.9 |
| Test Example 122 | E | e | IM-136 | I-105 | 0.080 | 6 | 139 | 208 | 2.77% | 21.4 |
| Test Example 123 | E | e | IM-137 | I-97 | 0.080 | 6 | 148 | 216 | 3.25% | 21.3 |
| Test Example 124 | C | e | IM-129 | L-3 | 0.080 | 6 | 134 | 198 | 3.78% | 20.0 |
| Test Example 125 | E | f | IM-139 | I-100 | 0.070 | 6 | 140 | 209 | 3.98% | 21.2 |
| Test Example 126 | E | f | IM-140 | I-106 | 0.070 | 6 | 138 | 207 | 3.61% | 20.9 |
| Test Example 127 | E | f | IM-142 | I-97 | 0.070 | 6 | 140 | 210 | 4.08% | 21.6 |
| Test Example 128 | C | f | IM-138 | L-3 | 0.080 | 6 | 140 | 210 | 3.43% | 21.6 |

TABLE 13-3

| Test Example | Example (E)/ Comparative Example (C) | Control Series | No. | Polymer | Dosage of polymer wt %/C | Measuring time/ min | Flow value/mm 0-hit | Flow value/mm 15-hit | Air content/ vol % | Mortar temperature/ °C |
|---|---|---|---|---|---|---|---|---|---|---|
| Test Example 129 | E | g | SM-8 | C-15 | 0.065 | 6 | 140 | 207 | 3.48% | 21.7 |
| Test Example 130 | E | g | SM-9 | C-16 | 0.065 | 6 | 140 | 209 | 3.35% | 21.8 |
| Test Example 131 | E | g | SM-10 | C-17 | 0.065 | 6 | 138 | 207 | 3.40% | 22.0 |
| Test Example 132 | E | g | SM-11 | C-19 | 0.070 | 6 | 139 | 206 | 3.42% | 21.9 |
| Test Example 133 | E | g | SM-12 | C-20 | 0.070 | 6 | 142 | 212 | 3.38% | 22.0 |
| Test Example 134 | E | g | SM-13 | C-21 | 0.070 | 6 | 141 | 205 | 3.45% | 21.9 |
| Test Example 135 | C | g | SM-14 | F-1 | 0.080 | 6 | 145 | 208 | 3.88% | 22.0 |
| Test Example 136 | C | g | SM-15 | L-1 | 0.080 | 6 | 140 | 203 | 3.43% | 22.1 |
| Test Example 137 | C | g | SM-16 | L-4 | 0.080 | 6 | 143 | 207 | 3.38% | 22.2 |
| Test Example 138 | E | h | SM-25 | C-18 | 0.110 | 6 | 140 | 207 | 3.98% | 21.3 |
| Test Example 139 | C | h | SM-26 | F-4 | 0.135 | 6 | 141 | 207 | 4.23% | 21.2 |

In Tables 12-1 to 13-3, "E" means an example corresponding to Example, and "C" means an example corresponding to Comparative Example. In the following Tables, "E" and "C" represent the same, respectively.

In Tables 12-1 to 12-3 and Tables 13-1 to 13-3, with regard to Examples and Comparative Examples shown by the same number in the column "Series", the measurement was performed on the same day and under the same conditions. The mortar experiment is easily influenced by cement lot and the like, and therefore, only among Examples and Comparative Examples shown by the same series number, the comparison is permitted.

As clearly shown in Tables 12-1 to 12-3 and 13-1 to 13-3, the mortars which were prepared using the polymers of the present invention showed a higher 15 hit flow value (15 hit mortar flow value) in comparison to the mortars which were prepared using the comparative polymers that were conventional copolymers for admixtures for cement, at the same amount as in the polymers of the present invention. Even if a smaller amount of the polymer of the present invention was used, the mortar showed almost the same or higher 15 hit flow value. That is, a larger amount of the comparative polymer needs to be used to prepare a mortar which shows almost the same 15 hit flow value as those in the mortar prepared using the polymer of the present invention. Therefore, it is shown that the polymers of the present invention exhibit more excellent dispersibility in comparison to the comparative polymers.

Table 12-3 shows measurement results of a retention capability over time of the mortar fluidity (hereinafter, also referred to simply as a retention capability) measured by maintaining the mixed mortar for a specific time. As clearly shown in Table 12-3, according to the polymers of the present invention, the mixing amount of the polymer was smaller because of its high initial dispersibility, and further, almost the same or higher retention capability was exhibited in comparison to the comparative polymers. Such results show that the polymers of the present invention have high dispersibility and a high retention capability.

Test Examples 129 to 189

In Test Examples 129 to 189, the polymers of the present invention obtained in Examples and the comparative polymers obtained in Comparative Example were evaluated for performances by the following concrete test.

"Concrete Test Method"

Using the polymers of the present invention obtained in Examples and the comparative polymers obtained in Comparative Examples as an admixture for cement, concretes Nos. 1 to 7 shown in Table 14 were prepared and mixed.

As an admixture for cement, the polymers of the present invention obtained in Examples or the comparative polymers obtained in Comparative Examples were used. The mixing amount of the admixture relative to the cement weight was calculated based on a solid content of the admixture and expressed as % (% by weight) in Table 14. As the AE agent, MA202 (product of Pozzolith Bussan Co., Ltd.) was mixed to account for 0.5% relative to the cement weight, thereby adjusting the air content to about 5%.

Method of Mixing Concrete

Concretes Nos. 1 to 7 were produced in the following procedures. In accordance with the proportion shown in Table 14, cement (C) and sand (S) were charged into a 50 L forced action mixer and the mixture was dry-mixed for 10 seconds. After that, water and an admixture for cement (W) were added and the mixture was further mixed for a specific time shown in Table 14, and then stone (G) was added.

Evaluation Method and Evaluation Standards

In accordance with Japanese Industrial Standard (JIS A1101-2005, 1128-2005, 6204-2006), the concretes which were prepared according to the concrete proportions, respectively, were measured for a slump value and a slump flow value. Tables 15-1 to 15-7 show the results.

The higher the slump value and the slump flow value are, the higher fluidity the concrete has. If concretes which show almost the same slump value or slump flow value are compared, the one which includes a smaller amount of the admixture is more excellent in cement dispersibility and has a higher water-reducing property.

TABLE 14

| Concrete No. | W/C | s/a | Air | W | C | G | S | Material of S | | Mixing time (second) |
| | | | | | | | | River sand from Kakegawa | Mountain sand from Kimitsu | |
| --- | --- | --- | --- | --- | --- | --- | --- | --- | --- | --- |
| 1 | 30 | 47 | 30 | 172 | 573 | 866 | 736 | 7 | 3 | 60 |
| 2 | 45 | 47 | 45 | 172 | 382 | 930 | 791 | 7 | 3 | 90 |
| 3 | 30 | 47 | 30 | 172 | 573 | 866 | 739 | 8 | 2 | 60~80 |
| 4 | 45 | 47 | 45 | 172 | 382 | 930 | 804 | 3 | 7 | 90 |
| 5 | 53 | 47 | 45 | 170 | 320 | 960 | 822 | 8 | 2 | 90 |
| 6 | 45 | 47 | 45 | 172 | 382 | 866 | 798 | 8 | 2 | 60 |
| 7 | 53 | 48 | 45 | 170 | 320 | 942 | 842 | 8 | 2 | 90 |

C means Cement - Ordinary Portland Cement produced by TAIHEIYO CEMENT CORP.
G means Coarse aggregate - Hard sandstone from Oume (specific gravity of 2.65)
S means Fine aggregate - River sand from Kakegawa (Oigawa water system, specific gravity of 2.52), and Mountain sand from Kimitsu (specific gravity of 2.59)
E means Mixture of an admixture for cement, an AE (air-entraining agent), and water

TABLE 15-1

Concrete mixture No. 1, W/C = 30%

| | Example (E)/ Comparative Example (C) | Admixture for concrete | | Results of test | | |
| | | Example sample | Dosage/wt % relative to C | MA-404/wt % relative to C | Temperature/ °C. | Flow value/ mm | Air content/ vol % |
| --- | --- | --- | --- | --- | --- | --- | --- |
| Test Example 129 | E | B-87 | 0.14 | 0.004 | 20 | 545 | 1.1 |
| Test Example 130 | E | B-86 | 0.13 | 0.004 | 20 | 735 | 0.9 |
| Test Example 131 | E | B-85 | 0.13 | 0.004 | 20.5 | 610 | 1.1 |
| Test Example 132 | E | B-84 | 0.13 | 0.004 | 20.5 | 520 | 1.2 |
| Test Example 133 | C | F-1 | 0.165 | 0.004 | 19.5 | 413 | 1.3 |
| Test Example 134 | C | L-4 | 0.16 | 0.004 | 21 | 725 | 0.6 |
| Test Example 135 | C | L-4 | 0.15 | 0.004 | 20.5 | 645 | 0.8 |
| Test Example 136 | C | L-4 | 0.14 | 0.004 | 20.5 | 510 | 0.7 |

TABLE 15-2

Concrete mixture No. 2, W/C = 45%

| | Example/ | Admixture for concrete | | Results of test | | | |
|---|---|---|---|---|---|---|---|
| Comparative Example | Example sample | Dosage/wt % relative to C | MA-202/wt % relative to C | Temperature/ °C. | Slump/ cm | Flow value/ mm | Air content/ vol % |
| Test Example 137 | E | B-86 | 0.09 | 0.005 | 20 | 21 | 351 | 4.9 |
| Test Example 138 | E | B-87 | 0.09 | 0.005 | 19 | 19.5 | 323 | 5.3 |
| Test Example 139 | C | F-1 | 0.11 | 0.005 | 19.5 | 19.5 | 333 | 4.8 |
| Test Example 140 | C | L-4 | 0.105 | 0.005 | 20 | 18.5 | 323 | 4.9 |
| Test Example 141 | C | L-2 | 0.105 | 0.005 | 20 | 18 | 320 | 5.6 |

TABLE 15-3

Concrete mixture No. 3, W/C = 30%

| | Example (E)/ | Admixture for concrete | | Results of test | | | |
|---|---|---|---|---|---|---|---|
| | Comparative Example (C) | sample | Dosage/wt % relative to C | MA-404/wt % relative to C | Mortar mixing (second) | Temperature/ °C. | Flow value/ mm | Air content/ vol % |
| Test Example 142 | E | B-126 | 0.22 | 0.006 | 80 | 21.0 | 560 | 1.2 |
| Test Example 143 | E | B-128 | 0.22 | 0.006 | 80 | 21.0 | 570 | 1.0 |
| Test Example 144 | E | B-127 | 0.22 | 0.006 | 80 | 21.0 | 605 | 0.7 |
| Test Example 145 | E | B-123 | 0.22 | 0.006 | 60 | 21.0 | 663 | 0.4 |
| Test Example 146 | E | B-125 | 0.22 | 0.006 | 60 | 21.0 | 675 | 0.5 |
| Test Example 147 | E | B-124 | 0.22 | 0.006 | 60 | 21.0 | 680 | 0.5 |
| Test Example 148 | E | B-125 | 0.22 | 0.006 | 60 | 21.0 | 725 | 0.2 |
| Test Example 149 | C | F-4 | 0.22 | 0.008 | 70 | 21.0 | 528 | 0.4 |
| Test Example 150 | C | F-4 | 0.225 | 0.008 | 70 | 21.0 | 595 | 0.8 |
| Test Example 151 | C | F-4 | 0.25 | 0.008 | 60 | 21.0 | 653 | 0.8 |

TABLE 15-4

Concrete mixture No. 4, W/C = 45%

| | Example (E)/ | Admixture for concrete | | Results of test | | | |
|---|---|---|---|---|---|---|---|
| | Comparative Example (C) | sample | Dosage/wt % relative to C | MA-404/wt % relative to C | Mortar mixing (second) | Temperature/ °C. | Flow value/ mm | Air content/ vol % |
| Test Example 152 | E | B-120 | 0.130 | 0.004 | 19.5 | 22.0 | 390 | 0.6 |
| Test Example 153 | E | B-124 | 0.130 | 0.004 | 19.0 | 22.0 | 395 | 0.5 |
| Test Example 154 | E | B-125 | 0.130 | 0.004 | 18.5 | 22.0 | 395 | 0.9 |
| Test Example 155 | E | B-126 | 0.130 | 0.004 | 19.0 | 22.5 | 405 | 0.6 |
| Test Example 156 | E | B-128 | 0.130 | 0.004 | 18.5 | 23.0 | 423 | 0.7 |
| Test Example 157 | E | B-120 | 0.130 | 0.004 | 18.5 | 22.0 | 440 | 0.6 |
| Test Example 158 | C | F-4 | 0.130 | 0.006 | 19.5 | 21.5 | 360 | 0.4 |
| Test Example 159 | C | F-4 | 0.140 | 0.006 | 19.5 | 22.0 | 390 | 0.7 |
| Test Example 160 | C | F-4 | 0.150 | 0.006 | 19.5 | 22.0 | 448 | 0.3 |

TABLE 15-5

Concrete mixture No. 5, W/C = 53%

| | Example (E)/ Comparative Example (C) | Admixture for concrete | | | | | Results of test | | | |
|---|---|---|---|---|---|---|---|---|---|---|
| | | Example sample | Dosage/ wt % relative to C | Reference Example sample | Dosage/wt % relative to C | MA-404/wt % relative to C | Temperature/ °C. | Slump/ cm | Flow value/ mm | Air content/ vol % |
| Test Example 161 | E | B-128 | 0.065 | L-5 | 0.065 | 0.004 | 19.5 | 21.5 | 368 | 0.8 |
| Test Example 162 | E | B-116 | 0.065 | L-5 | 0.065 | 0.004 | 19.5 | 20 | 373 | 1.2 |
| Test Example 163 | E | B-132 | 0.065 | L-5 | 0.065 | 0.004 | 20 | 20 | 380 | 0.9 |
| Test Example 164 | E | B-131 | 0.065 | L-5 | 0.065 | 0.004 | 20 | 20 | 383 | 0.9 |
| Test Example 165 | E | B-129 | 0.065 | L-5 | 0.065 | 0.004 | 19.5 | 19 | 385 | 1.2 |
| Test Example 166 | C | F-4 | 0.065 | L-5 | 0.065 | 0.004 | 20 | 20 | 345 | 1.7 |
| Test Example 167 | C | L-2 | 0.065 | L-5 | 0.065 | 0.004 | 20 | 20.5 | 360 | 0.9 |

TABLE 15-6

Concrete mixture No. 6, W/C = 45%

| | Example (E)/ Comparative Example (C) | Admixture for concrete | | | Results of test | | | |
|---|---|---|---|---|---|---|---|---|
| | | Example sample | Dosage/wt % relative to C | MA-404/wt % relative to C | Temperature/ °C. | Slump/ cm | Flow value/ mm | Air content/ vol % |
| Test Example 168 | E | I-118 | 0.11 | 0.0035 | 20.0 | 22.5 | 363 | 5.3 |
| Test Example 169 | E | I-68 | 0.11 | 0.0035 | 19.0 | 24.0 | 453 | 4.4 |
| Test Example 170 | E | I-55 | 0.11 | 0.0035 | 20.0 | 22.0 | 370 | 5.6 |
| Test Example 171 | E | I-63 | 0.11 | 0.0035 | 20.0 | 22.0 | 358 | 4.8 |
| Test Example 172 | E | I-64 | 0.11 | 0.0035 | 20.0 | 21.0 | 334 | 5.3 |
| Test Example 173 | E | I-65 | 0.11 | 0.0035 | 20.0 | 21.5 | 348 | 5.0 |
| Test Example 174 | E | I-67 | 0.11 | 0.0035 | 20.0 | 22.5 | 373 | 5.1 |
| Test Example 175 | E | I-68 | 0.11 | 0.0035 | 20.0 | 24.5 | 520 | 4.3 |
| Test Example 176 | E | I-69 | 0.11 | 0.0035 | 19.0 | 22.5 | 370 | 5.3 |
| Test Example 177 | E | I-60 | 0.11 | 0.0035 | 19.0 | 24.0 | 493 | 3.8 |
| Test Example 178 | E | I-61 | 0.11 | 0.0035 | 19.0 | 23.5 | 415 | 4.3 |
| Test Example 179 | E | I-70 | 0.11 | 0.0035 | 19.0 | 22.0 | 358 | 4.4 |
| Test Example 180 | C | L-4 | 0.11 | 0.0035 | 20.5 | 19.0 | 305 | 3.9 |

TABLE 15-7

Concrete mixture No. 7, W/C = 53%

| | Example (E)/ Comparative Example (C) | Admixture for concrete | | | | | Results of test | | | |
|---|---|---|---|---|---|---|---|---|---|---|
| | | Example sample | Dosage/ wt % relative to C | Reference Example sample | Dosage/wt % relative to C | MA-404/wt % relative to C | Temperature/ °C. | Slump/ cm | Flow value/ mm | Air content/ vol % |
| Test Example 181 | E | I-81 | 0.0675 | L-5 | 0.0675 | 0.004 | 19 | 20.0 | 341 | 1.0 |
| Test Example 182 | E | I-82 | 0.0675 | L-5 | 0.0675 | 0.004 | 20 | 18.8 | 305 | 0.9 |
| Test Example 183 | E | I-83 | 0.0675 | L-5 | 0.0675 | 0.004 | 20 | 17.0 | 284 | 0.9 |
| Test Example 184 | E | I-90 | 0.0675 | L-5 | 0.0675 | 0.004 | 20 | 17.0 | 281 | 0.8 |
| Test Example 185 | E | I-85 | 0.0675 | L-5 | 0.0675 | 0.004 | 20 | 20.0 | 329 | 1.1 |
| Test Example 186 | E | I-100 | 0.0675 | L-5 | 0.0675 | 0.004 | 20 | 19.5 | 328 | 0.8 |
| Test Example 187 | E | I-101 | 0.0675 | L-5 | 0.0675 | 0.004 | 20 | 19.8 | 363 | 0.6 |
| Test Example 188 | E | I-102 | 0.0675 | L-5 | 0.0675 | 0.004 | 19 | 20.0 | 343 | 1.0 |
| Test Example 189 | C | L-2 | 0.0675 | L-5 | 0.0675 | 0.004 | 20 | 19.5 | 318 | 0.5 |

Evaluation Results

As clearly shown in Tables 15-1 to 15-7, according to the concretes prepared using the polymers of the present invention obtained in Examples, each concrete could disperse and flow the cement to show a specific slump value even at a smaller amount of the admixture, which shows that each concrete has an excellent water-reducing property, in comparison to the concretes prepared using the comparative polymers obtained in Comparative Examples.

INDUSTRIAL APPLICABILITY

The polyalkylene glycol chain-containing thiol polymer of the present invention has the above-mentioned configuration. Therefore, the polymer can exhibit higher dispersibility than that of conventional copolymers used as an admixture for cement, obtained by copolymerizing an unsaturated carboxylic acid monomer with an unsaturated polyalkylene glycol monomer. Therefore, such a polymer of the present invention is preferably used in a dispersant, particularly an admixture for cement. If a cement composition including the admixture for cement of the present invention is prepared, the mixing amount of the admixture can be reduced. Therefore, excellent characteristics of cement are not deteriorated. Thus, the novel polymer of the present invention and the dispersant, particularly the admixture for cement including such a polymer significantly contribute to civil engineering and construction fields where concrete is handled, and the like.

The invention claimed is:

1. A polyalkylene glycol chain-containing thiol polymer, wherein the polymer comprises a polyalkylene glycol chain and a polymer segment bonded to at least one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer.

2. The polyalkylene glycol chain-containing thiol polymer according to claim 1,
wherein the polyalkylene glycol chain-containing thiol polymer is obtainable by polymerizing an unsaturated monomer component including an unsaturated carboxylic acid monomer and an unsaturated polyalkylene glycol monomer in the presence of a compound including a polyalkylene glycol chain and a mercapto group and/or a disulfide bond in one molecule.

3. A production method of the polyalkylene glycol chain-containing thiol polymer of claim 1,
comprising a step of polymerizing an unsaturated monomer component including an unsaturated carboxylic acid monomer and an unsaturated polyalkylene glycol monomer in the presence of a compound including a polyalkylene glycol chain and a mercapto group and/or a disulfide bond in one molecule.

4. A polymer mixture comprising the polyalkylene glycol chain-containing thiol polymer of claim 1,
wherein the polymer mixture comprises any two or more of the following polymers (i) to (iv):
a polymer (i),
wherein the polymer includes a polyalkylene glycol chain and a polymer segment bonded to one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer;
a polymer (ii),
wherein the polymer includes repeating polymer units added in block,
the polymer units each includes a polyalkylene glycol chain and a polymer segment bonded to one end of the polyalkylene glycol chain with a sulfur atom-containing group therebetween,
the polymer segment includes a constitutional unit derived from an unsaturated monomer component, and the unsaturated monomer component includes an unsaturated carboxylic acid monomer and an unsaturated polyalkylene glycol monomer;
a polymer (iii),
wherein the polymer includes a polyalkylene glycol chain and polymer segments bonded to both ends of the polyalkylene glycol chain, one segment to each end, with a sulfur-containing group therebetween,
the polymer segment includes a constitutional unit derived from an unsaturated monomer component, and
the unsaturated monomer component includes an unsaturated carboxylic acid monomer and an unsaturated polyalkylene glycol monomer; and
a polymer (iv),
wherein the polymer includes two polyalkylene glycol chains and a polymer segment connecting the two polyalkylene glycol chains to each other with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer.

5. The polyalkylene glycol chain-containing thiol polymer mixture according to claim 4,
further comprising a polymer obtainable by polymerizing a monomer component including an unsaturated carboxylic acid monomer and a polyalkylene glycol monomer.

6. A polyalkylene glycol chain-containing thiol polymer obtained by polymerizing an unsaturated monomer component including an unsaturated carboxylic acid monomer and/or an unsaturated polyalkylene glycol monomer in the presence of a thiol-modified monomer having a structure represented by the following formula (1) or (2):

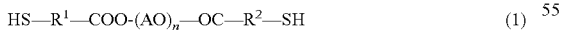  (1)

  (2)

in the formula (1) or (2),
$R^1$ and $R^2$ being the same or different and each representing an organic residue;
AO being the same or different and each representing one or more different oxyalkylene groups containing 2 to 18 carbon atoms;
n representing an average number of moles of oxyalkylene group and being an integer of 80 to 500; and
$R^3$ representing a hydrogen atom or an organic residue or the a thiol-modified monomer mixture comprising:
a thiol-modified monomer having a structure represented by the following formula (3) and/or (4); and
a polymeric product of the thiol-modified monomer,

  (3)

  (4)

in the formula (3) or (4),
$R^1$ and $R^2$ being the same or different and each representing an organic residue,
AG representing an organic residue including at least one alkylene glycol group containing 2 to 18 carbon atoms, and
$R^3$ representing a hydrogen atom or an organic residue.

7. A dispersant comprising a polyalkylene glycol chain-containing thiol polymer, wherein the polymer comprises a polyalkylene glycol chain and a polymer segment bonded to at least one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer, or the polyalkylene glycol chain-containing thiol polymer mixture of claim 4.

8. An admixture for cement, comprising a polyalkylene glycol chain-containing thiol polymer, wherein the polymer comprises a polyalkylene glycol chain and a polymer segment bonded to at least one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer or the polyalkylene glycol chain-containing thiol polymer mixture of claim 4.

9. A cement composition comprising:
cement; and
a polyalkylene glycol chain-containing thiol polymer, wherein the polymer comprises a polyalkylene glycol chain and a polymer segment bonded to at least one end of the polyalkylene glycol chain with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer, or the polyalkylene glycol chain-containing thiol polymer mixture of claim 4.

10. A production method of the polyalkylene glycol chain-containing thiol polymer of claim 2,
comprising a step of polymerizing an unsaturated monomer component including an unsaturated carboxylic acid monomer and an unsaturated polyalkylene glycol monomer in the presence of a compound including a polyalkylene glycol chain and a mercapto group and/or a disulfide bond in one molecule.

11. A polymer mixture comprising the polyalkylene glycol chain-containing thiol polymer of claim 2,
wherein the polymer mixture comprises any two or more of the following polymers (i) to (iv):
a polymer (i),
wherein the polymer includes a polyalkylene glycol chain and a polymer segment bonded to one end of the polyalkylene glycol chain with a sulfur atom-containing group therebetween,
the polymer segment includes a constitutional unit derived from an unsaturated monomer component, and the unsaturated monomer component includes an unsaturated carboxylic acid monomer and an unsaturated polyalkylene glycol monomer;
a polymer (ii),
wherein the polymer includes repeating polymer units added in block,
the polymer units each includes a polyalkylene glycol chain and a polymer segment bonded to one end of the polyalkylene glycol chain with a sulfur atom-containing group therebetween,
the polymer segment includes a constitutional unit derived from an unsaturated monomer component, and the unsaturated monomer component includes an unsaturated carboxylic acid monomer and an unsaturated polyalkylene glycol monomer;
a polymer (iii),
wherein the polymer includes a polyalkylene glycol chain and polymer segments bonded to both ends of the polyalkylene glycol chain, one segment to each end, with a sulfur-containing group therebetween,
the polymer segment includes a constitutional unit derived from an unsaturated monomer component, and
the unsaturated monomer component includes an unsaturated carboxylic acid monomer and an unsaturated polyalkylene glycol monomer; and
a polymer (iv),
wherein the polymer includes two polyalkylene glycol chains and a polymer segment connecting the two polyalkylene glycol chains to each other with a sulfur atom-containing group therebetween,
the polymer segment includes a constitutional unit derived from an unsaturated monomer component, and
the unsaturated monomer component includes an unsaturated carboxylic acid monomer and an unsaturated polyalkylene glycol monomer.

12. The polyalkylene glycol chain-containing thiol polymer according to claim 1, wherein the sulfur atom-containing group is  —S—$R^{11}$—COO—, —S—$R^{11}$—CO—, —S—$R^{11}$—CO—NH—, —S—$R^{11}$—CO—NH—CH2—CH2—, —S—$R^{11}$—, —S—$R^{11}$—O, —S—$R^{11}$—N—, or —S—$R^{11}$—S—, wherein $R^{11}$ represents a divalent organic residue.

13. The polyalkylene glycol chain-containing thiol polymer according to claim 7, wherein the sulfur atom-containing group is  —S—$R^{11}$—COO—, —S—$R^{11}$—CO—, —S—$R^{11}$—CO—NH—, —S—$R^{11}$—CO—NH—CH2—CH2, —S—$R^{11}$—, —S—$R^{11}$—O, —S—$R^{11}$—N—, or —S—$R^{11}$—S—, wherein $R^{11}$ represents a divalent organic residue.

14. The polyalkylene glycol chain-containing thiol polymer according to claim 8, wherein the sulfur atom-containing group is  —S—$R^{11}$—COO—, —S—$R^{11}$—CO—, —S—$R^{11}$—CO—NH—, —S—$R^{11}$—CO—NH—CH2—CH2—, —S—$R^{11}$—, —S—$R^{11}$—O, —S—$R^{11}$—N—, or —S—$R^{11}$—S—, wherein $R^{11}$ represents a divalent organic residue.

15. The polyalkylene glycol chain-containing thiol polymer according to claim 2,
wherein the compound including a polyalkylene glycol chain and a mercapto group and/or a disulfide bond in one molecule is the compound represented by the following formula (II) and/or the compound represented by the following formula (12):

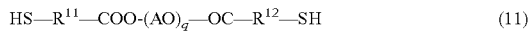  (11)

  (12)

in the formula (II) or (12),
$R^{11}$ and $R^{12}$ are the same or different and each represent a divalent organic residue;
$R^{13}$ represents a hydrogen atom or a hydrocarbon group containing 1 to 20 carbon atoms;
AO are the same or different and each represent one or more different oxyalkylene groups containing 2 to 18 carbon atoms, wherein the two or more different oxyalkylene groups may be introduced into the chain randomly or in block;
q represents the average number of moles of oxyalkylene group added and q is an integer of 10 to 500,
wherein the use amount of the compound represented by the above formula (II) and/or the compound represented by the above formula (12) is 4 to 50% by weight to 100% of the total amount of the monomer ingredient.

16. The polyalkylene glycol chain-containing thiol polymer according to claim 1, wherein the polyalkylene glycol chain-containing thiol polymer is represented by the following formula (5):

  (5)

in the formula (5), PAG represents a polyalkylene glycol chain; BL represents a polymer segment including a constitutional unit derived from an unsaturated monomer component containing an unsaturated carboxylic acid monomer and an unsaturated polyalkylene glycol monomer; and Z represents a sulfur atom-containing group,
wherein the length of the polyalkylene glycol chain represented by PAG is 80 to 500 as an average number of moles of alkylene oxide added.

17. The polyalkylene glycol chain-containing thiol polymer according to claim 7, wherein the polyalkylene glycol chain-containing thiol polymer is represented by the following formula (5):

  (5)

in the formula (5), PAG represents a polyalkylene glycol chain; BL represents a polymer segment including a constitutional unit derived from an unsaturated monomer component containing an unsaturated carboxylic acid monomer and an unsaturated polyalkylene glycol monomer; and Z represents a sulfur atom-containing group,
wherein the length of the polyalkylene glycol chain represented by PAG is 80 to 500 as an average number of moles of alkylene oxide added.

18. The polyalkylene glycol chain-containing thiol polymer according to claim 8, wherein the polyalkylene glycol chain-containing thiol polymer is represented by the following formula (5):

  (5)

in the formula (5), PAG represents a polyalkylene glycol chain; BL represents a polymer segment including a constitutional unit derived from an unsaturated monomer component containing an unsaturated carboxylic acid monomer and an unsaturated polyalkylene glycol monomer; and Z represents a sulfur atom-containing group,
wherein the length of the polyalkylene glycol chain represented by PAG is 80 to 500 as an average number of moles of alkylene oxide added.

* * * * *

UNITED STATES PATENT AND TRADEMARK OFFICE
CERTIFICATE OF CORRECTION

PATENT NO. : 8,188,167 B2
APPLICATION NO. : 12/532618
DATED : May 29, 2012
INVENTOR(S) : Noboru Sakamoto et al.

Page 1 of 1

It is certified that error appears in the above-identified patent and that said Letters Patent is hereby corrected as shown below:

In the Claims:

Claim 6, column 107, lines 55 and 56 "$(AO)_n$," should read --$(AO)_n$--.

Claim 6, column 107, line 67, "the a thiol-modified" should read --a thiol-modified--.

Claim 12, column 109, lines 37 and 38, "—S—$R^{11}$—CO—NH—CH2—CH2—," should read -- —S—$R^{11}$—CO—NH—$CH_2$—$CH_2$—, --.

Claim 12, column 109, line 38, "—S—$R^{11}$—O," should read -- —S—$R^{11}$—O—,--.

Claim 13, column 109, lines 44 and 45, "—S—$R^{11}$—CO—NH—CH2—CH2," should read -- —S—$R^{11}$—CO—NH—$CH_2$—$CH_2$—,--.

Claim 13, column 109, line 45, "—S—$R^{11}$—CO," should read -- —S—$R^{11}$—O—,--.

Claim 14, column 109, lines 51 and 52, "—S—$R^{11}$—CO—NH—CH2—CH2—" should read -- —S—$R^{11}$—CO—NH—$CH_2$—$CH_2$— --.

Claim 14, column 109, line 52, "—S—$R^{11}$—O" should read -- —S—$R^{11}$—O— --.

Claim 15, column 109, lines 59 and 63, "(II)" should read --(11)--.

Claim 15, column 109, lines 61 and 62, "$(AO)_q$" should read --$(AO)_q$--.

Claim 15, column 110, line 13, "(II)" should read --(11)--.

Signed and Sealed this
Twenty-eighth Day of August, 2012

David J. Kappos
*Director of the United States Patent and Trademark Office*